United States Patent
Subramanian et al.

(10) Patent No.: US 11,785,384 B2
(45) Date of Patent: *Oct. 10, 2023

(54) ACOUSTIC WAVE MANIPULATION

(71) Applicant: THE UNIVERSITY OF SUSSEX, Brighton (GB)

(72) Inventors: Sriram Subramanian, Brighton (GB); Gianluca Memoli, Brighton (GB); Bruce Drinkwater, Bristol (GB); Mihai Caleap, Bristol (GB); Deepak Ranjan Sahoo, Swansea (GB)

(73) Assignee: The University of Sussex, Brighton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,367

(22) Filed: Jan. 17, 2022

(65) Prior Publication Data

US 2022/0303681 A1    Sep. 22, 2022

Related U.S. Application Data

(63) Continuation of application No. 17/127,555, filed on Dec. 18, 2020, now Pat. No. 11,228,838, which is a (Continued)

(30) Foreign Application Priority Data

Feb. 9, 2017 (GB) ...................................... 1702131
Jan. 8, 2018 (GB) ...................................... 1800286

(51) Int. Cl.
*G10K 11/26* (2006.01)
*H04R 3/12* (2006.01)
(Continued)

(52) U.S. Cl.
CPC ........... *H04R 3/12* (2013.01); *G01N 29/0654* (2013.01); *G01N 29/262* (2013.01); *G10K 11/26* (2013.01);
(Continued)

(58) Field of Classification Search
CPC ............. G01N 29/0654; G01N 29/221; G01N 29/262; G01N 2201/106; H04R 1/403;
(Continued)

(56) References Cited

U.S. PATENT DOCUMENTS 3,725,826 A    4/1973  Chiron et al.
4,506,759 A    3/1985  Fatovic
(Continued)

FOREIGN PATENT DOCUMENTS

CN    106297762 A    1/2017
CN    106856090 A    6/2017
(Continued)

OTHER PUBLICATIONS

International Preliminary Report on Patentability for International Patent Application No. PCT/GB2018/050373, dated Aug. 22, 2019, 12 pages.
(Continued)

*Primary Examiner* — Melur Ramakrishnaiah
(74) *Attorney, Agent, or Firm* — Withrow & Terranova, P.L.L.C.; Vincent K. Gustafson

(57) ABSTRACT

A device for manipulating an incident acoustic wave to generate an acoustic output is described wherein the device comprises a plurality of unit cells arranged into an array, at least some of said unit cells being configured to introduce time delays to an incident acoustic wave at the respective positions of the unit cells within the array of unit cells, such that said plurality of unit cells define an array of time delays to thereby define a spatial delay distribution for manipulat-
(Continued)

ing an incident acoustic wave to generate an acoustic output. The array of time delays may be re-configured to vary the spatial delay distribution of the device in order to generate different acoustic outputs. Also described are methods for designing or configuring such devices.

20 Claims, 21 Drawing Sheets

Related U.S. Application Data continuation of application No. 16/483,907, filed as application No. PCT/GB2018/050373 on Feb. 9, 2018, now Pat. No. 10,873,812.

(51) Int. Cl.
    *G01N 29/06*     (2006.01)
    *G01N 29/26*     (2006.01)
    *H04R 1/02*     (2006.01)
    *H04R 1/34*     (2006.01)
    *H04R 1/40*     (2006.01)

(52) U.S. Cl.
    CPC ............. *H04R 1/025* (2013.01); *H04R 1/345* (2013.01); *H04R 1/403* (2013.01); *G01N 2291/106* (2013.01); *H04R 2201/401* (2013.01); *H04R 2400/11* (2013.01)

(58) Field of Classification Search
    CPC .......... H04R 3/12; H04R 1/025; H04R 1/345; H04R 2400/11; H04R 2201/003; H04R 2201/401; G10K 11/26
    USPC ......................................................... 381/335
    See application file for complete search history.

(56) References Cited

U.S. PATENT DOCUMENTS

| | | | |
|---|---|---|---|
| 4,541,687 A | 9/1985 | Brooks | |
| 5,477,736 A | 12/1995 | Lorraine | |
| 5,546,360 A | 8/1996 | Deegan | |
| 6,554,826 B1* | 4/2003 | Deardorff | A61N 7/02 |
| | | | 181/176 |
| 7,561,320 B2 | 7/2009 | Wang et al. | |
| 8,717,659 B2 | 5/2014 | Zheludev et al. | |
| 9,390,702 B2 | 7/2016 | Mathur | |
| 9,437,183 B2 | 9/2016 | Semperlotti et al. | |
| 9,525,944 B2 | 12/2016 | Clemen, Jr. | |
| 10,043,508 B2 | 8/2018 | Park et al. | |
| 10,116,804 B2 | 10/2018 | Cheatham, III et al. | |
| 10,160,061 B2 | 12/2018 | Helvajian et al. | |
| 10,284,176 B1* | 5/2019 | Solal | H03H 9/6483 |
| 10,755,538 B2 | 8/2020 | Carter et al. | |
| 10,873,812 B2 | 12/2020 | Subramanian et al. | |
| 2012/0163129 A1* | 6/2012 | Antoine | B06B 1/0292 |
| | | | 367/138 |
| 2013/0112496 A1 | 5/2013 | Neogi et al. | |
| 2013/0338499 A1 | 12/2013 | Kameishi et al. | |
| 2014/0060960 A1 | 3/2014 | Walker et al. | |
| 2015/0316511 A1 | 11/2015 | Guo | |
| 2016/0027427 A1* | 1/2016 | Yang | G10K 11/172 |
| | | | 181/286 |
| 2016/0044417 A1 | 2/2016 | Clemen, Jr. | |
| 2016/0111080 A1 | 4/2016 | Robertson | |
| 2016/0189702 A1 | 6/2016 | Blanc et al. | |
| 2016/0376192 A1 | 12/2016 | Mitchell et al. | |
| 2017/0069303 A1 | 3/2017 | Song et al. | |
| 2017/0085981 A1 | 3/2017 | Mathur | |
| 2017/0112671 A1 | 4/2017 | Goldstein | |
| 2018/0047259 A1 | 2/2018 | Carter et al. | |
| 2018/0090124 A1 | 3/2018 | Bowers et al. | |
| 2018/0166062 A1 | 6/2018 | Hoffberg | |
| 2018/0257076 A1 | 9/2018 | Weitz et al. | |
| 2018/0351656 A1 | 12/2018 | Shi et al. | |
| 2018/0374466 A1 | 12/2018 | Kim et al. | |
| 2019/0005938 A1 | 1/2019 | Naya et al. | |
| 2019/0035374 A1 | 1/2019 | Martin et al. | |
| 2019/0364362 A1 | 11/2019 | Subramanian et al. | |
| 2021/0195332 A1 | 6/2021 | Subramanian et al. | |

FOREIGN PATENT DOCUMENTS

| | | | |
|---|---|---|---|
| CN | 108847211 A | 11/2018 | |
| CN | 110012397 A | 7/2019 | |
| JP | S57155893 A | 9/1982 | |
| JP | S57155894 A | 9/1982 | |
| KR | 20160099745 A | 8/2016 | |
| KR | 20170011943 A | 2/2017 | |
| KR | 101928141 B1 | 12/2018 | |
| WO | 0209486 A2 | 1/2002 | |
| WO | 2006055798 A1 | 5/2006 | |
| WO | 2008023991 A1 | 2/2008 | |
| WO | 2008135922 A1 | 11/2008 | |
| WO | 2012106327 A1 | 8/2012 | |
| WO | 2014207440 A1 | 12/2014 | |
| WO | 2015039622 A1 | 3/2015 | |
| WO | 2015129969 A1 | 9/2015 | |
| WO | 2015157199 A1 | 10/2015 | |
| WO | WO-2016022826 A1 * | 2/2016 | ............... G01V 1/02 |
| WO | 2016118533 A1 | 7/2016 | |
| WO | 2016173502 A1 | 11/2016 | |
| WO | 2016196476 A1 | 12/2016 | |
| WO | 2017011064 A1 | 1/2017 | |
| WO | 2017027234 A1 | 2/2017 | |
| WO | 2017075187 A2 | 5/2017 | |
| WO | 2017093690 A1 | 6/2017 | |
| WO | 2017093693 A1 | 6/2017 | |
| WO | 2017139126 A1 | 8/2017 | |
| WO | 2017160364 A1 | 9/2017 | |
| WO | 2017180436 A1 | 10/2017 | |
| WO | 2017187216 A1 | 11/2017 | |
| WO | 2018017558 A1 | 1/2018 | |
| WO | 2018029460 A1 | 2/2018 | |
| WO | 2018146489 A1 | 8/2018 | |
| WO | 2018178764 A1 | 10/2018 | |
| WO | 2019072746 A1 | 4/2019 | |
| WO | 2019141794 A1 | 7/2019 | |
| WO | 2020023820 A1 | 1/2020 | |
| WO | 2020028838 A1 | 2/2020 | |
| WO | 2020169498 A1 | 8/2020 | |
| WO | 2020169711 A1 | 8/2020 | |
| WO | 2020208380 A1 | 10/2020 | |
| WO | 2020210690 A1 | 10/2020 | |
| WO | 2021247519 A1 | 12/2021 | |

OTHER PUBLICATIONS

Non-Final Office Action for U.S. Appl. No. 17/127,555, dated May 13, 2021, 10 pages.
Notice of Allowance for U.S. Appl. No. 17/127,555, dated Sep. 8, 2021, 9 pages.
Ghaffarivardavagh, R. et al., "Ultra-open acoustic metamaterial silencer based on Fano-like interference," Physical Review B 99, 024302, Jan. 2019, American Physical Society, 10 pages.
Search Report under Section 17(5) for United Kingdom Patent Application No. GB1905258.8 dated Jul. 29, 2019, 9 pages.
International Search Report (Form PCT/ISA/210) for International Application No. PCT/GB2020/050948 dated Sep. 7, 2020, 5 pages.
Written Opinion (Form PCT/ISA/237) for International Application No. PCT/GB2020/050948 dated Sep. 7, 2020, 11 pages.
Combined Search and Examination Report under Sections 17 and 18(3) for United Kingdom Patent Application No. GB2116381.1, dated Feb. 15, 2022, 14 pages.
Airoldi, L. et al., "Design of tunable acoustic metamaterials through periodic arrays of resonant shunted piezos," New Journal of Physics, vol. 13, 2011, IOP Publishing Ltd and Deutsche Physikalische Gesellschaft, 22 pages.

(56) References Cited

OTHER PUBLICATIONS

Al Jahdali, R. et al., "High transmission acoustic focusing by impedance-matched acoustic meta-surfaces," Applied Physics Letters, vol. 108, No. 031902, 2016, AIP Publishing LLC, 6 pages.

Author Unknown, "Fabricating MEMS and Nanotechnology," MNX, 2019, https://www.mems-exchange.org/MEMS/fabrication.html, 10 pages.

Author Unknown, "MEMS and Nanotechnology Applications," MNX, 2019, https://www.mems-exchange.org/MEMS/applications.html, 2 pages.

Author Unknown, "What is MEMS Technology," MNX, 2019, https://www.mems-exchange.org/MEMS/what-is.html, 3 pages.

Author Unknown, "Global MEMS & Sensors for Mobile Phones and Tablets: 2014 Report," PR Newswire, Jul. 14, 2014, https://www.prnewswire.com/news-releases/global-mems-sensors-for-mobile-phones-and-tablets-2014-report-267041421.html, 7 pages.

Author Unknown, "High Speed Visible DLP® chips," Texas Instruments, 2019, https://www.ti.com/dlp-chip/advanced-light-control/high-speed-visible/overview.html, 2 pages.

Bogue, R. et al., ""Recent developments in MEMS sensors: a review of applications, marketsand technologies,"" Sensor Review, vol. 33, No. 4, 2013, Emerald Group Publishing Limited, pp. 300-304.

Carter, T. et al., "UltraHaptics: Multi-Point Mid-Air Haptic Feedback for Touch Surfaces," 2013, ACM, 10 pages.

Cranston, D. et al., "A review of high intensity focused ultrasound in relation to the treatment of renal tumours and other malignancies," Ultrasonics Sonochemistry, vol. 27, 2015, Elsevier B.V., pp. 654-658.

Cui, T. et al., "Coding metamaterials, digital metamaterials and programmable metamaterials," Light: Science & Applications, vol. 3, e218, 2014, CIOMP, 9 pages.

Cummer, S. et al., "Controlling sound with acoustic metamaterials," Nature Reviews Materials, Article No. 16001, 2016, Macmillan Publishers Limited, 13 pages.

Devore, R. et al., "Image Compression Through Wavelet Transform Coding," IEEE Transactions on Information Theory, vol. 38, No. 2, Mar. 1992, IEEE, pp. 719-746.

Gelat, P. et al., "A comparison of methods for focusing the field of a HIFU array transducer through human ribs," Physics in Medicine and Biology, vol. 59, 2014, IOP Publishing, pp. 3139-3171.

Geng, J., "Three-dimensional display technologies," Advances in Optics and Photonics, vol. 5, 2013, OSA, pp. 456-535.

Ghodssi, R. et al., "Thick Buried Oxide in Silicon (TBOS): An Integrated Fabrication Technology for Multi-Stack Wafer-Bonded MEMS Processes," presented at Transducers '99, the 10th International Conference on Solid-State Sensors and Actuators, Sendai, Japan, Jun. 7-10, 1999, 4 pages.

Giovampaola, C. et al., "Digital metamaterials," Nature Materials, vol. 13, Dec. 2014, Macmillan Publishers Limited, pp. 1115-1121.

Jiang, X. et al., "Convert acoustic resonances to orbital angular momentum," Accepted Manuscript, 2016, Chorus, 6 pages.

Lalonde, R. et al., "Field Conjugate Acoustic Lenses for Ultrasound Hyperthermia," IEEE Transactions on Ultrasonics, Ferroelectrics, and Frequency Control, vol. 40, No. 5, Sep. 1993, IEEE, pp. 592-602.

Lane, C. et al., "The Inspection of Anisotropic Single-Crystal Components Using a 2-D Ultrasonic Array," IEEE Transactions on Ultrasonics, Ferroelectrics, and Frequency Control, vol. 57, No. 12, Dec. 2010, IEEE, pp. 2742-2752.

Larouche, S. et al., "Reconciliation of generalized refraction with diffraction theory," Optics Letters, vol. 37, No. 12, Jun. 15, 2012, Optical Society of America, pp. 2391-2393.

Li, Y. et al., "Experimental Realization of Full Control of Reflected Waves with Subwavelength Acoustic Metasurfaces," Physical Review Applied, vol. 2, Article 064002, 2014, American Physical Society, 11 pages.

Li, Y. et al., "Metascreen-Based Acoustic Passive Phased Array," Physical Review Applied, vol. 4, No. 024003, American Physical Society, 7 pages.

Li, Y. et al., "Reflected wavefront manipulation based on ultrathin planar acoustic metasurfaces," Scientific Reports, vol. 3, Article No. 2546, 2013, 6 pages.

Li, Y. et al., "Theory of metascreen-based acoustic passive phased array," New Journal of Physics, vol. 18, 2016, IOP Publishing Ltd and Deutsche Physikalische Gesellschaft, 20 pages.

Li, Y. et al., ""Three-dimensional collimatedself-accelerating beam through acoustic metascreen,"" Scientific Reports, vol. 5, No. 17612, 2015, 7 pages.

Liang, Z. et al., "Extreme Acoustic Metamaterial by Coiling Up Space," Physical Review Letters, vol. 108, Mar. 16, 2012, American Physical Society, 5 pages.

Lipsman, N. et al., "MR-guided focused ultrasound thalamotomy for essential tremor: a proof-of-concept study," Lancet Neurology, vol. 12, Issue 5, May 2013, Elsevier Ltd., pp. 462-468.

Ma, G. et al., "Acoustic metamaterials: From local resonances to broad horizons," Science Advances, vol. 2, No. 2, e1501595, Feb. 26, 2016, 17 pages.

Marcellin, M. et al., "An overview of quanitization in JPEG 2000," Signal Processing: Image Communication, vol. 17, 2002, Elsevier Science B.V., pp. 73-84.

Marzo, A. et al., "Holographic acoustic elements for manipulation of levitated objects," Nature Communications, vol. 6, No. 8661, 2015, Macmillan Publishers Limited, 7 pages.

Marzo, A. et al., "Holographic acoustic elements for manipulation of levitated objects—Supplementary Material," Nature Communications, vol. 6, No. 8661, 2015, Macmillan Publishers Limited, 14 pages.

Mei, J. et al., "Controllable transmission and total reflection through an impedance-matched acoustic metasurface," New Journal of Physics, vol. 16, 2014, IOP Publishing Ltd Deutsche Physikalische Gesellschaft, 12 pages.

Memoli, G. et al., "Metamaterial bricks and quantization of metasurfaces," Nature Communications, vol. 8, a14608, 2017, 9 pages.

Miki, N. et al., "Multi-stack silicon-direct wafer bonding for 3D MEMS manufacturing," Sensors and Actuators A, vol. 103, 2003, Elsevier Science B.V., pp. 194-201.

Padgett, M. et al., "Holographic optical tweezers and their relevance to lab on chip devices," Lab Chip, vol. 11, 2011, The Royal Society of Chemistry, pp. 1196-1205.

Popa, B. et al., "Tunable active acoustic metamaterials," Physical Review B, vol. 88, 2013, American Physical Society, 8 pages.

Sackmann, E. et al., "The present and future role of microfluidics in biomedical research," Nature, vol. 507, Mar. 13, 2004, Macmillan Publishers Limited, 9 pages.

Scansen, D., "How MEMS Enable Smartphone Features," Engineering.com, Aug. 6, 2013, https://www.engineering.com/ElectronicsDesign/ElectronicsDesignArticles/ArticleID/6124/How-MEMS-Enable-Smartphone-Features.aspx#disqus_thread, 4 pages.

Silva, A. et al., "Performing Mathematical Operations with Metamaterials," Science, vol. 343, Jan. 10, 2014, American Association for the Advancement of Science, pp. 160-163.

Thalhammer, G. et al., "Speeding up liquid crystal SLMs using overdrive with phase change reduction," Optics Express, vol. 21, No. 2, 2013, Optical Society of America, 19 pages.

Wooh, S. et al., "Influence of phased array element size on beam steering behavior," Ultrasonics, vol. 36, 1998, Elsevier Science B.V., pp. 737-749.

Xie, Y. et al., "Wavefront modulation and subwavelength diffractive acoustics with an acoustic metasurface," Nature Communications, vol. 5, No. 5553, Macmillan Publishers Limited, 5 pages.

Yang, J. et al., "Acoustic beamforming of a parametric speaker comprising ultrasonic transducers," Sensors and Actuators A, vol. 125, 2005, Elsevier B.V., pp. 91-99.

Yu, N. et al., "Light Propogation with Phase Discontinuities: Generalized Laws of Reflection and Refraction," Science, vol. 334, Oct. 21, 2011, American Association for the Advancement of Science, pp. 333-337.

Zhu, X. et al., "Implementation of dispersion-free slow acoustic wave propogation and phase engineering with helical-structured metamaterials," Nature Communications, vol. 7, May 2016, 7 pages.

(56) References Cited

OTHER PUBLICATIONS

Search Report for United Kingdom Patent Application No. GB1702131.2, dated Mar. 10, 2017, 5 pages.
Non-Final Office Action for U.S. Appl. No. 16/483,907, dated Jan. 27, 2020, 10 pages.
Notice of Allowance for U.S. Appl. No. 16/483,907, dated Aug. 10, 2020, 9 pages.
International Search Report and Written Opinion for International Patent Application No. PCT/GB2018/050373, dated Jul. 16, 2018, 15 pages.
Examination Report under Section 18(3) for United Kingdom Patent Application No. GB2116381.1, dated Sep. 22, 2022, 3 pages.
Examination Report for European Patent Application No. 20721688.8, dated Jun. 6, 2023, 7 pages.
Non-Final Office Action for U.S. Appl. No. 17/602,928, dated Jun. 23, 2023, 14 pages.

* cited by examiner

Fig. 4A
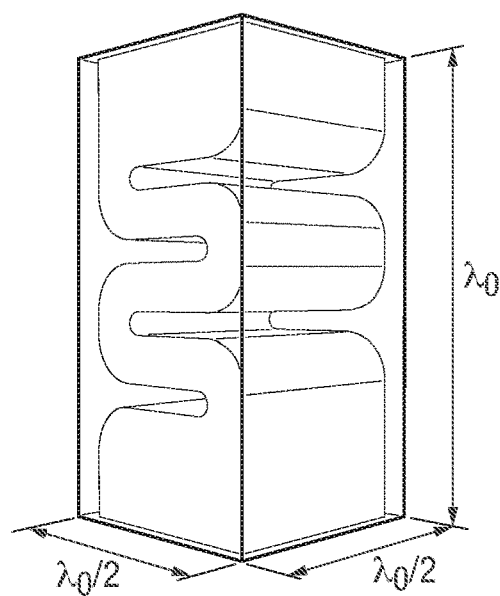
Fig. 5
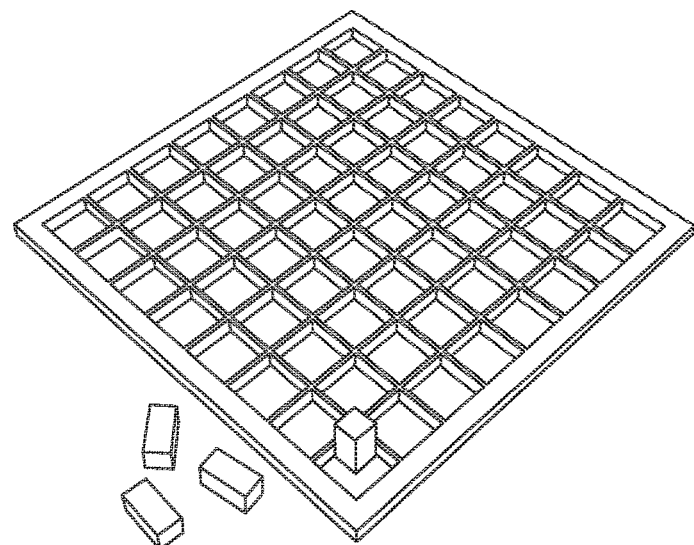
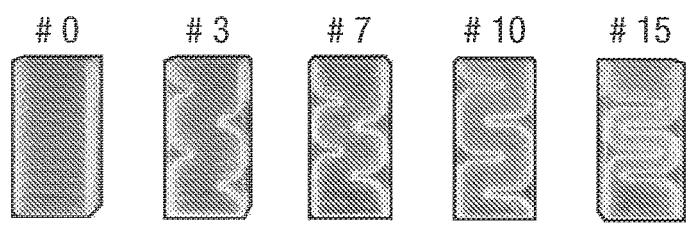

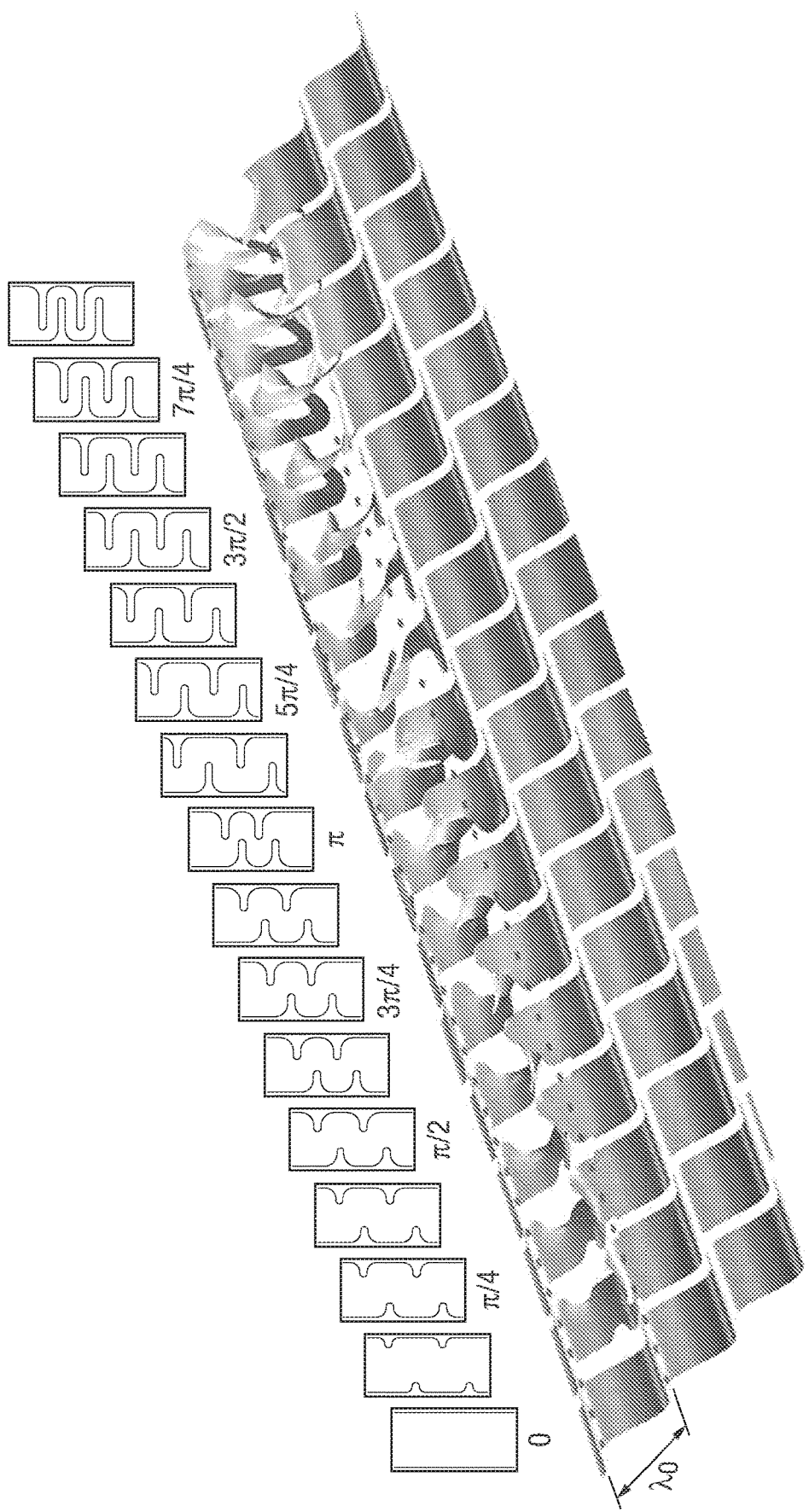

Fig. 6
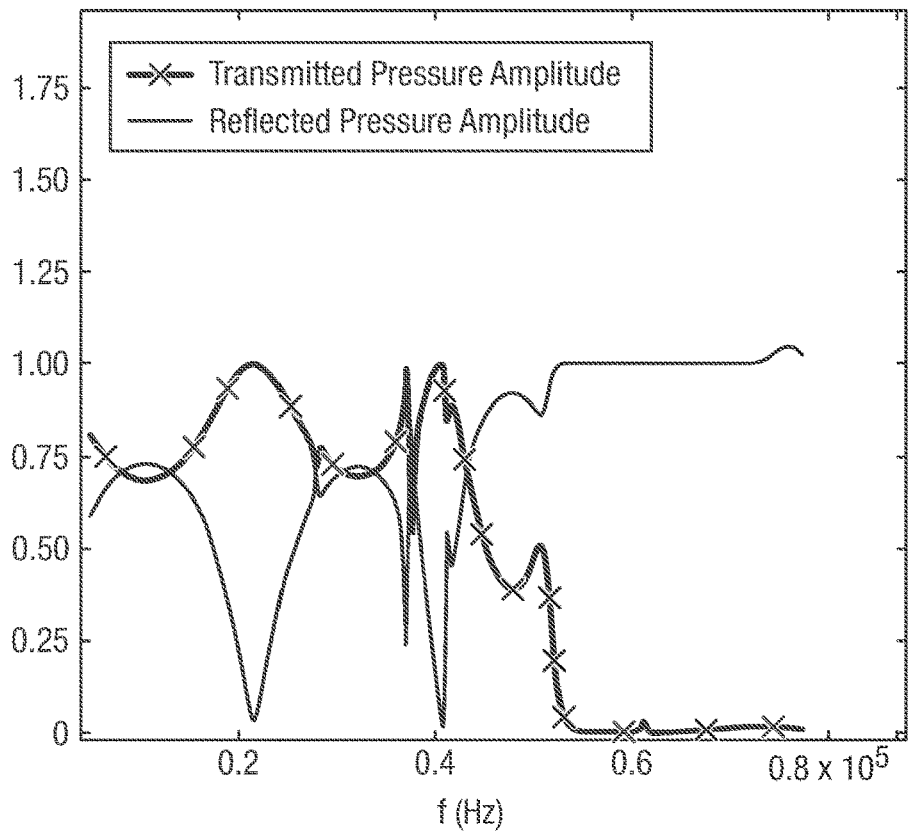
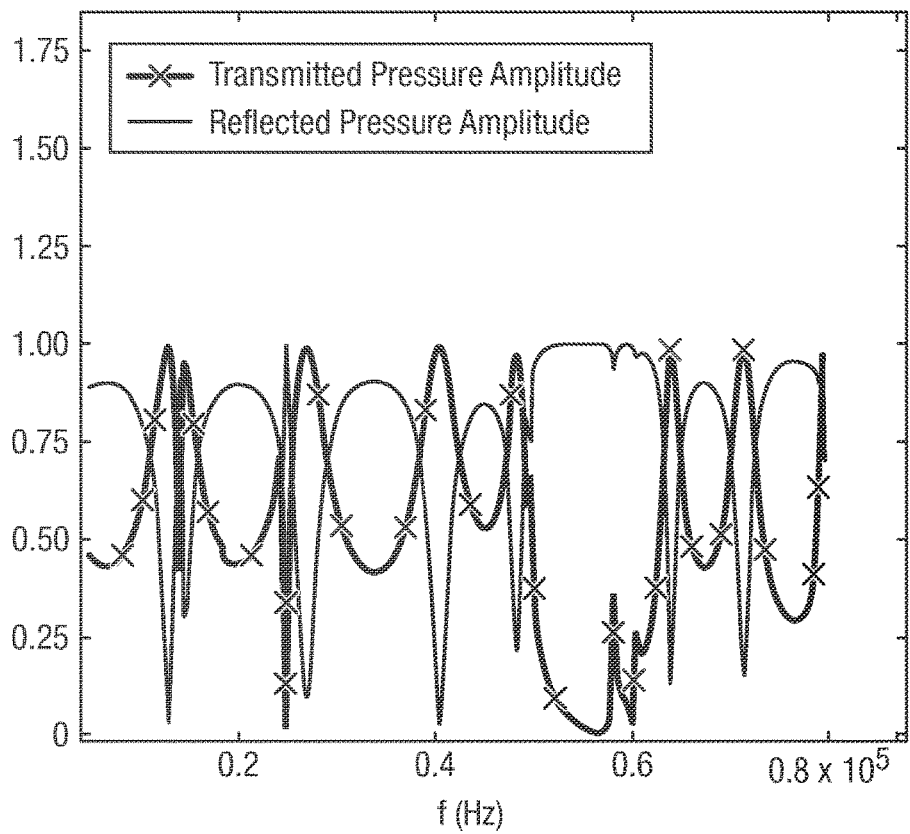

| | | | |
|---|---|---|---|
| ▨ | #0 | ▨ | #8 |
| ▨ | #1 | ▨ | #9 |
| ▨ | #2 | ▨ | #10 |
| ▨ | #3 | ▨ | #11 |
| ▨ | #4 | ▨ | #12 |
| ▨ | #5 | ▨ | #13 |
| ▨ | #6 | ▨ | #14 |
| ▨ | #7 | ▨ | #15 |

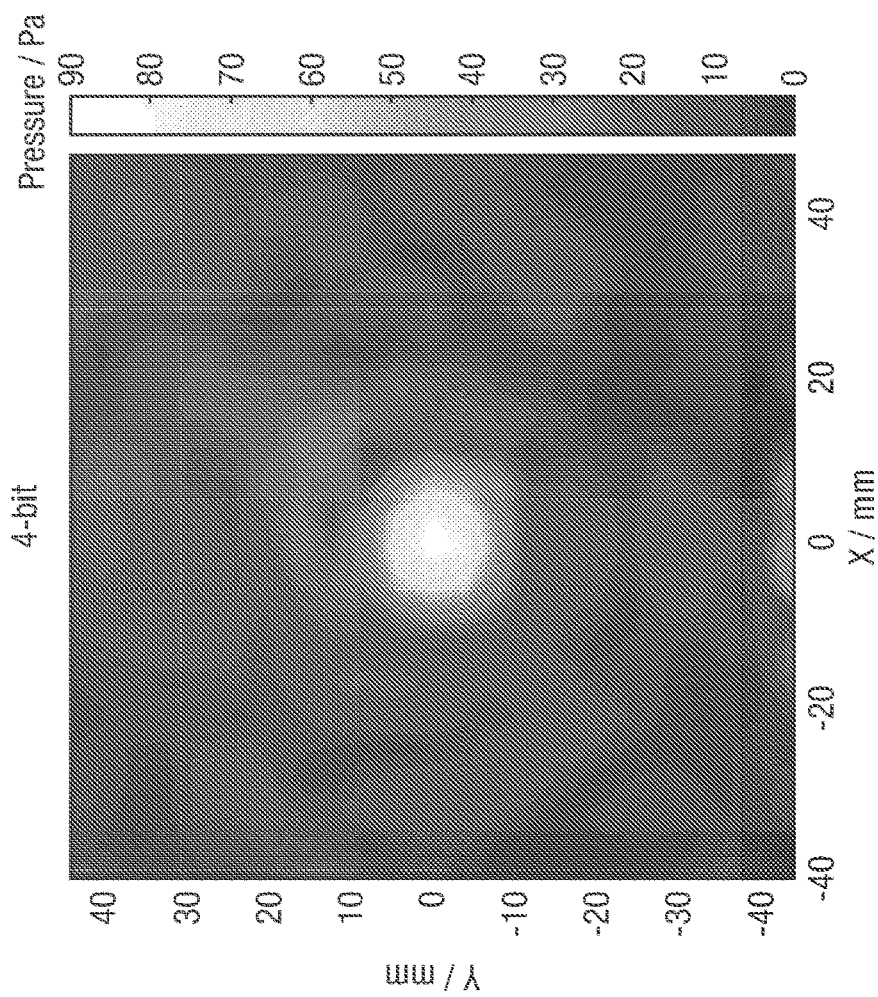
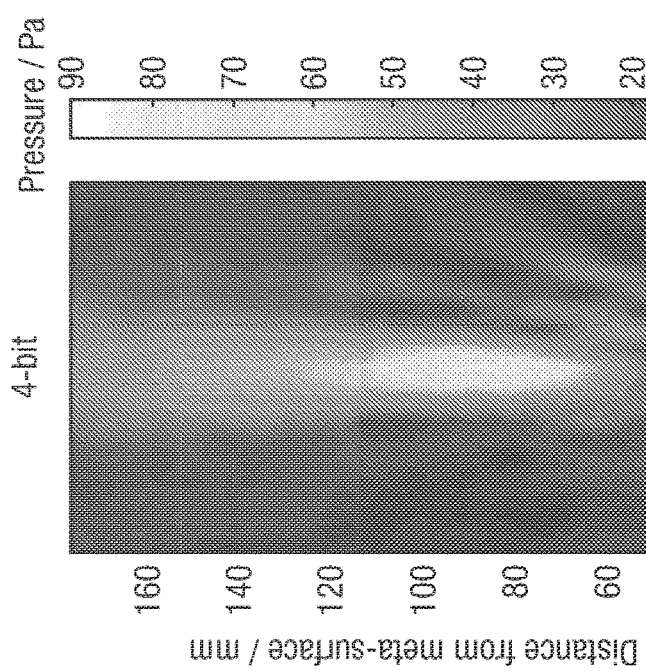
Fig. 9 (cont.)

Fig. 10
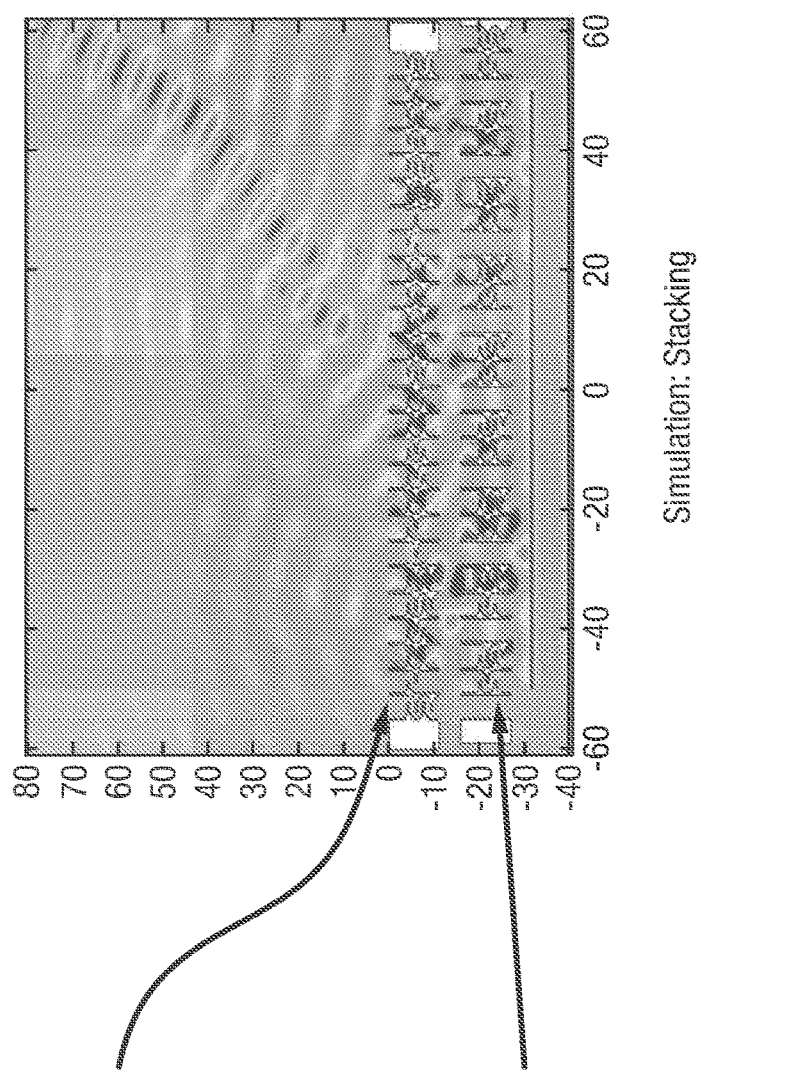
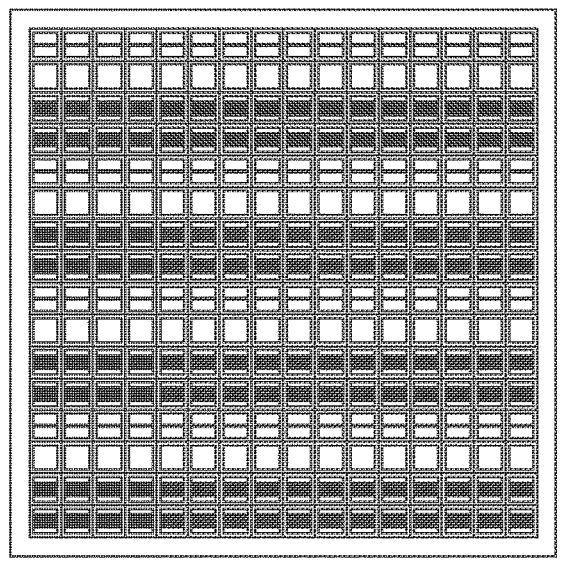 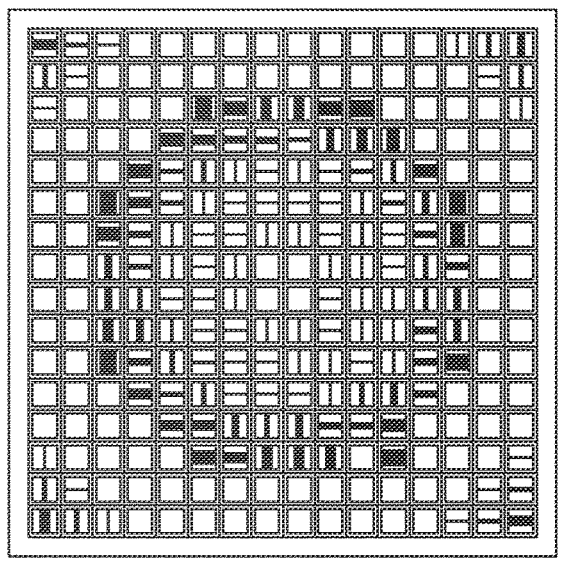

Measurements: Vertical Plane

ACOUSTIC WAVE MANIPULATION

CROSS-REFERENCE TO RELATED APPLICATIONS

This application is a continuation of U.S. patent application Ser. No. 17/127,555 filed on Dec. 18, 2020 and subsequently issuing as U.S. Pat. No. 11,228,838, which is a continuation of U.S. patent application Ser. No. 16/483,907 filed on Aug. 6, 2019 and subsequently issuing as U.S. Pat. No. 10,873,812 on Dec. 22, 2020, which is a 35 U.S.C. § 371 national phase filing of International Application No. PCT/GB2018/050373 filed on Feb. 9, 2018, and claims the benefit of United Kingdom Patent Application No. 1702131.2 filed on Feb. 9, 2017, and United Kingdom Patent Application No. 1800286.5 filed on Jan. 8, 2018, wherein the contents of the foregoing applications and U.S. patents are hereby incorporated by reference herein in their respective entireties.

TECHNICAL FIELD

The present invention relates generally to devices for manipulating acoustic waves.

BACKGROUND

The ability to manipulate acoustic waves may be important in various fields including, but not limited to, noise control, power charging, loudspeaker design, position/motion sensing, ultrasound imaging and therapy, non-destructive testing of engineering structures, haptic control utilising focussed acoustic waves (i.e. haptic user interfaces) and acoustic particle manipulation e.g. acoustic levitation. These applications generally require more precise control of acoustic waves.

Current approaches for manipulating acoustic waves rely on fixed lenses, performing only a single function, or a phased array of transducers wherein the amplitudes and phases of the individual transducers within the array are independently controlled. For instance, the amplitudes and phases may be controlled either by controlling the relative positions of the transducers within the array, within a fixed geometry, or by introducing a phase delay by triggering the individual transducers at different points in time. The latter approach is generally the preferred implementation for consumer electronic devices. However, phased arrays are typically bulky and expensive to control or manufacture, and are not easily scalable as the cost and complexity of the associated electronics generally scales with the number of channels.

Despite these limitations, phased arrays are in widespread use.

For example, sparse arrays of phased transducers are used to treat a variety of tumours or functional brain disorders in High Frequency Focussed Ultrasound techniques by inducing a localised heating effect. Such arrays are also used in industrial applications where focussing and steering of acoustic or ultrasonic waves may be used to find small cracks in metallic components having complex and highly anisotropic geometries.

It is desired to provide improved techniques for manipulating acoustic waves.

SUMMARY

According to a first aspect of the present invention, there is provided a device for manipulating an incident acoustic wave to generate an acoustic output comprising: a plurality of unit cells arranged into an array, at least some of the unit cells being configured to introduce time delays to an incident acoustic wave at the respective positions of the unit cells within the array of unit cells, such that the plurality of unit cells define an array of time delays to thereby define a spatial delay distribution for manipulating an incident acoustic wave to generate an acoustic output, wherein the array of time delays defined by the plurality of unit cells is re-configurable to vary the spatial delay distribution in order to generate different acoustic outputs.

The present invention (in any of its aspects and embodiments) relates generally to a novel approach for manipulating acoustic waves using a device comprising a plurality of unit cells each capable of encoding a particular time delay (or set of time delays).

It will be appreciated that the unit cells that are configured to introduce time delays have the effect of slowing down acoustic waves passing through the device. Each unit cell may be configured to introduce a particular time delay to an acoustic wave passing through the unit cell.

For instance, the physical structure of the unit cells may be designed so as to cause the acoustic waves to travel an extended effective path length, $L_{eff}$, so that it takes longer for the acoustic waves to transit the unit cell than it would if the acoustic waves travelled directly from one side of the unit cell to the other. Thus, in preferred embodiments, the respective time delay for each of the unit cells is determined by the path length through the unit cell. Each of the unit cells may therefore have an associated path length. By changing the path length at a particular location, or e.g. using unit cells with different path lengths, the spatial delay distribution of the device can thus be changed.

Additionally, or alternatively, in some embodiments the unit cells may be configured so that the speed of sound, c, within the unit cell is changed (i.e. reduced) relative to the speed of sound in the ambient medium. In general, the time delay introduced by the unit cells may be of the order $\Delta t \sim L_{eff}/c$. Depending on the design of the unit cells, the time delay may depend on the frequency of the incident acoustic wave or may be essentially frequency independent.

For instance, preferably, the unit cells are filled in use with the same fluid (e.g. air or water) within which they are operating. That is, preferably the unit cells are substantially open to allow the surrounding fluid to pass into or through the unit cells. However, in some embodiments, it is contemplated that a different fluid may be provided within the unit cells, e.g. to further modify the properties of the incident acoustic wave.

U.S. Pat. No. 6,554,826 (TxSonics-LTD) describes an alternative approach wherein an acoustic lens is provided comprising an internal medium having voltage dependent acoustic properties which can be controlled by applying suitable voltages to various electrode surfaces. However, at least compared to embodiments of the present invention, e.g. where the time delays for the unit cells are determined (at least in part) by the respective acoustic path lengths within the unit cells, this approach may be relatively inefficient (for instance, transmission rates may be limited) and have a more limited range of operation (for instance, the approach described in U.S. Pat. No. 6,554,826 is only linear in certain operating ranges).

It will be appreciated that the effect of the time delays is that for an incident acoustic wave at a particular frequency the unit cells will introduce a phase delay, wherein the phase delay angle is given by $\Delta \varphi = k \cdot L_{eff}$, where k is the wavenumber of the incident wave. That is, the phase delays are generally frequency dependent. Thus, it will be understood that where reference is made herein to a "time delay", this may alternatively be considered as a "phase delay" that depends on the frequency of the incident acoustic wave and that the time delay and phase delay values may be related to each other depending on the operating frequency or frequencies.

The different unit cells within the array may be configured so as to introduce different time delays. An acoustic wave incident on and passing through the device may thus be subject to various different time delays at the positions of the unit cells within the array. In particular, the unit cells are arranged together in an array such that the positions of the unit cells and their associated time (or phase) delays define a spatial delay distribution across the surface of the device. It is this spatial delay distribution that determines how an acoustic wave incident on the array of unit cells will interact with and be manipulated by the device.

The surface of the device is thus effectively spatially quantised according to the positions and dimensions of the unit cells. The dimensions of the unit cells effectively define the resolution at which the surface is quantised in the spatial domain. In the preferred embodiments, as explained further below, the unit cells may each encode one or more discrete time or phase delay values, so that the delay distribution is also quantised in the time or phase domain. It will be appreciated that the time or phase delay for a particular unit cell may be zero, and that the array(s) may also contain spaces or empty cells.

By controlling the positions and/or time delays of the (individual) unit cells within the array, the device may be selectively configured to perform various manipulations of the incident acoustic waves, and by changing the positions and/or time delays of the unit cells within the array, the device may be re-configured to perform a different manipulation.

It will be appreciated that the devices according to embodiments of the present invention may therefore provide a flexible and/or low-cost approach for manipulating acoustic waves to generate essentially arbitrary acoustic outputs. This re-configurability may be facilitated by a modular structure of the device, which is formed by an arrangement of unit cells. For instance, in embodiments, the positions of the different unit cells within the array and/or the time delays associated with the unit cells may be varied in order to control the acoustic output of the device. In some embodiments, the techniques described herein may facilitate simplifying the design and control of acoustic devices and systems.

For instance, it will be appreciated that the devices according to embodiments of the present invention may provide various benefits compared to current transducer-based approaches. Other approaches for manipulating acoustic waves are described e.g. in U.S. Pat. No. 5,546,360 (Deegan) and U.S. Pat. No. 5,477,736 (General Electric Company) which both describe providing an acoustic lens including an electro rheological fluid. However, in both cases, it is not possible to provide local changes in the spatial delay distribution and the devices described in these documents may therefore be relatively limited, at least compared to embodiments of the present invention. A similar approach is described in U.S. 2013/0112496 (University of North Texas). U.S. 2014/0060960 (University of North Texas) describes yet another approach wherein a tunable polymer-based sonic structure periodic structure (i.e. a sonic crystal) is provided.

The unit cells may generally take various suitable forms. For example, each of the plurality of unit cells will typically (and preferably does) comprise a central channel extending from one side of the unit cell to the other to allow acoustic waves to pass through the unit cell. However, the central channel may be structured, and the interactions of the incident acoustic waves with this structure may increase the effective path length for the acoustic waves travelling through the unit cell, and thereby introduce a time delay. Particularly, the unit cells may each comprise a collection of structures with which the incident acoustic wave is caused to interact, with the size of the structures typically being smaller than the wavelength of the incident acoustic wave. For example, the central channel may have a substantially labyrinthine or meandered structure that determines the respective time delay for the unit cell. In other embodiments, the unit cells may comprise a multi-slit, helical, coiled or Helmholtz-resonator type structure. The structure may generally be symmetric about a plane of symmetry through the central channel (but need not be).

According to embodiments of the present invention, the unit cells may generally comprise of "acoustic metamaterials". Acoustic metamaterials are generally characterised by their effective mass density and bulk modulus. The structure of an acoustic metamaterial may be engineered to perform various manipulations, and may for instance be engineered to have negative effective parameters leading to interesting effects such as negative refraction and sub-diffraction focussing. In this context, the metamaterials effectively slow down or speed up the sound waves hence altering the effective speed of sound and/or path length within the material. Current studies of acoustic metamaterials are typically limited to audible frequencies up to 20 kHz, and are designed to illustrate a specific principle, or to fit a specific purpose e.g. a lens with a fixed focus. That is, acoustic metamaterials are typically currently only used to create relatively limited, static structures. By contrast, the present invention presents flexible solutions for manipulating potentially arbitrary acoustic waves.

According to a first aspect of the present invention, the unit cells allow the device to be re-configured in order to vary the distribution of time delays across the device.

Two main embodiments for re-configuring the array of time delays will now be described.

In the first main embodiment, the plurality of unit cells comprises a plurality of pre-configured unit cells, each pre-configured unit cell being configured to introduce a fixed time or phase delay to the incident acoustic wave.

According to the first main embodiment, the array of time delays may thus be re-configured by changing the type and/or position of at least some of the pre-configured unit cells within the array of unit cells.

That is, at least some of the plurality of unit cells within the array may be pre-configured unit cells encoding a fixed time or phase delay. For instance, the plurality of unit cells may comprise a plurality of different types of unit cell, with the different types of unit cell encoding a different time or phase delay (e.g. having a different associated path length). Each type of unit cell may be unique. The device may thus be readily re-configured by physically re-arranging the unit cells within the array into a different arrangement of delay values. For instance, the unit cells may be manually re-arranged by a user. However, it is also contemplated that the unit cells (or their arrangement) may be mechanically re-arranged by a machine or according to a control signal. In any case, by selecting the appropriate arrangement of the pre-configured unit cells, the spatial delay distribution of the device may easily be controlled and re-configured as desired. According to this embodiment, the pre-configured unit cells essentially act as building blocks for the device according to the present invention.

The unit cells may generally be self-supporting. However, in embodiments, individual unit cells may be configured to be releasably mounted within a support structure. Thus, the device may further comprise a frame or mounting structure, wherein the plurality of unit cells may be releasably mounted on or within the frame or mounting structure. For example, the pre-configured unit cells may be inserted into respective positions within a grid structure in order to define the array. In other embodiments the unit cells may be configured for mutual interconnection with each other. Particularly, the unit cells may be releasably interconnectable with one another. For instance, the unit cells may be configured such that different unit cells may be clipped together, or otherwise interconnected, in order to define the array. In this case a separate frame or mounting structure may not be required.

In embodiments, a number of unit cells may be joined together into a 'block'.

Thus, the array of unit cells may comprise a plurality of blocks of unit cells, each block comprising a fixed arrangement of unit cells. In particular, a (or each) block of unit cells may comprise a fixed arrangement of pre-configured unit cells arranged so as to provide a pre-determined manipulation of an incident acoustic wave. A (or each) block of unit cells may, for example, comprise an array of unit cells, such as a square or rectangular array of 3×3 or 9×9 unit cells. However, it will be appreciated that a (or each) block of unit cells may generally comprise any suitable fixed arrangement of unit cells. For instance, a (or each) block of unit cells may comprise a three-dimensional array of unit cells, such as a cubic array of 3×3×3 unit cells.

Thus, instead of choosing the positions and/or delay values of the individual unit cells within the array, in embodiments, a set of blocks may be used to construct the array. For example, each block of unit cells may comprise a fixed and pre-determined arrangement of unit cells such that each block may act to provide a certain pre-defined transformation or manipulation of an incident acoustic wave. Thus, a block may be designated e.g. as a 'steering' block, as a 'focussing' block, or as a 'half-wave' block. It will be appreciated that the use of such blocks may facilitate mechanical assembly of the device.

As mentioned above, according to the first main embodiment the unit cells (or blocks of unit cells) may essentially act as a set of building blocks from which the array can be created. A suitable kit of unit cells or blocks may be sold together to a user depending on their required specification.

In embodiments, the first aspect may also extend to a kit of parts for forming a device substantially as described herein according to the first main embodiment of the first aspect, the kit comprising a plurality of different types of unit cell or blocks of unit cells, and a frame or mounting structure for mounting the plurality of different types of unit cell or blocks of unit cells in an array.

Accordingly, a kit of parts for forming a device substantially as described herein according to the first main embodiment of the first aspect may be provided comprising a plurality of different types of unit cell or blocks of unit cells, wherein the plurality of different types of unit cell or blocks of unit cells may be mutually interconnected to define an array of unit cells.

The pre-configured unit cells may each be configured to encode a specific time delay and/or a specific phase delay.

For instance, in embodiments, the unit cells are each designed to encode a specific phase delay at a particular operating frequency of interest. That is, the structure of the unit cells may be designed to introduce a desired phase delay at a selected frequency. For the selected frequency, a typical set of pre-configured unit cells may be arranged to span the phase delay range 0 to $2\pi$ in discrete intervals. For instance, the pre-configured unit cells may be configured to span the phase delay range 0 to $2\pi$ in uniform intervals of (e.g.) $\pi/8$. Thus, in that case, 16 unique pre-configured unit cells may be available for forming the device. It has been found that using 16 unique phase delays allows the reproduction of essentially any desired acoustic wave with a precision of about 0.1 dB. However, in general, there may be fewer or greater unique types of unit cells, as desired. For instance, in embodiments, 8 different types of unit cells may be provided and this may be sufficient for the same precision of about 0.1 dB. In embodiments, the unit cells may span the phase delay range 0 to $2\pi$ in non-uniform intervals. This may reduce the number of unit cells needed to reproduce a desired field, particularly where the unit cells may be stacked i.e. added together. A kit, as may be provided to a user, may comprise a variety of types of unit cells. For example, a kit may comprise at least one of each different type of unit cell within the set, or the unit cells within the kit may be determined or substantially optimised (using the techniques presented herein) to include only the, or the minimum or optimum number of, unit cells required for a particular application, e.g. based on a desired acoustic output and/or accuracy.

It will be appreciated that the unit cells may alternatively, or additionally, be designed to encode a specific time delay. Particularly, the unit cells may be designed to introduce a fixed time delay that is essentially independent of the operating frequency. The phase delays in this case will depend on the operating frequency or frequencies. The arrangement of unit cells within the array may thus be selected based on the time delays and a specified or selected frequency in order to give the desired phase delays.

In a second main embodiment of the first aspect, the plurality of unit cells comprise a plurality of re-configurable unit cells that may each be selectively (controllably) re-configured to cause the unit cell to introduce different time (or phase) delays. Optionally, each of the plurality of re-configurable unit cells may be selectively and/or independently re-configured. However, in other embodiments, a block or group of re-configurable unit cells may be re-configured together. In some embodiments, the unit cells may be capable of being re-configured substantially continuously between a range of phase delay values. However, preferably, a (and each) re-configurable unit cell may be selectively re-configured between a set of two or more discrete phase delay values, such as two, four, eight or sixteen discrete phase delay values. In some preferred embodiments, the or each re-configurable unit cell may be selectively re-configured between only two discrete time delay values.

For instance, according to the second main embodiment, the array may comprise a fixed arrangement of unit cells wherein each unit cell within the array may be re-configured to cause a different time delay in order to change the delay distribution of the device and generate different acoustic output fields.

It will be appreciated that the approach of the second main embodiment lends itself to electronic control. For instance, using computer control, the delay distribution of the device may be re-configured practically in real-time to change the form of the acoustic output field. It will also be appreciated that the electronic control requirements for re-configuring the device may be relatively simple e.g. compared to the electronic control requirements for a conventional phased array transducer particularly because the electronic control of the device may be separated and independent from the power requirements of any acoustic source used to generate the incident acoustic waves.

The device may thus further comprise one or more electrodes or electrode layers for providing control signals for re-configuring the re-configurable unit cells. The re-configurable unit cells may be connected to the one or more electrodes or electrode layers and the control signals may be provided via the one or more electrodes or electrode layers to the re-configurable unit cells. The device may further comprise (or may be connected in use to) an electronic controller and/or processor for re-configuring the arrangement. The controller and/or processor may generate electronic control signals for re-configuring the unit cells.

It will be appreciated that a (or each) re-configurable unit cell may take various suitable forms. However, typically, each of the re-configurable unit cells may comprise one or more moveable elements moveable between a plurality of positions in order to vary the time delay introduced by the re-configurable unit cell. For instance, the unit cells may each comprise one or more bars or flaps that can be selectively moved into a central channel of the unit cell in order to introduce a meandered structure and to thereby introduce an additional time delay, as described above.

It is contemplated that the device may comprise a mixture of pre-configured and re-configurable unit cells. The device may thus comprise at least one (or a plurality of) pre-configured unit cells according to the first main embodiment and at least one (or a plurality of) re-configurable unit cells according to the second main embodiment. It is also contemplated that at least some of the re-configurable unit cells may be removable, or that some of the unit cells may be fixed in position and introduce a fixed time delay.

In general, the unit cells described herein may be formed according to any suitable and desired manufacturing techniques. For instance, in embodiments, it is contemplated that the unit cells may each be formed as individual structures, e.g. using an additive ("bottom-up") manufacturing technique such as 3D printing, and then assembled on-demand into an array structure as desired. For example, each unit cell may be fabricated monolithically as a single structure comprising an acoustic channel suitably designed to encode a desired time delay.

As another example, the unit cells may be fabricated using microfluidic techniques such as etching or stereo-lithography.

However, in some preferred embodiments, the unit cells may be fabricated as, or from, a stack of (relatively thin) layers. That is, the unit cells may (each) comprise a plurality of layers that are stacked together to define the desired structure to encode a particular time delay. The structure of a or each unit cell (and hence the associated time delay) may thus be defined by a plurality of layers in combination.

This technique may be used to fabricate individual pre-configured unit cells encoding a fixed time delay, e.g. for use with the first main embodiment of the first aspect of the invention.

This layered construction technique also presents a way of constructing re-configurable unit cells of the type described above in relation to the second main embodiment of the first aspect of the invention. For example, because the unit cells are formed from a plurality of individual layers, it is possible to move (e.g. slide) one or more of the layers of a unit cell relative to the other layers of that unit cell and thereby change the structure of the unit cell to adjust the time delay that is introduced.

This layered construction for the unit cell is also considered to be novel and advantageous in its own right, i.e. regardless of whether or not the device comprises a plurality of unit cells that can be re-positioned or re-configured to vary the spatial delay distribution of the device as per the first aspect of the invention described above. Furthermore, instead of using a plurality of stacked layers to construct individual unit cells, it would also be possible with suitably designed layers to construct acoustic surfaces comprising an array (plurality) of unit cells. For example, each layer may comprise a portion (or "slice") of each of the unit cells within the array. Thus, when the layers are stacked together to form an acoustic surface, the array of unit cells (and the structures of each of the unit cells within the array) may be defined by the plurality of layers in combination. Various other suitable arrangements are also possible.

Accordingly, from a second aspect of the present invention, there is provided a device for manipulating an incident acoustic wave to generate an acoustic output comprising: a plurality of unit cells arranged into an array, at least some of said unit cells being configured to introduce time delays to an incident acoustic wave at the respective positions of the unit cells within the array of unit cells, such that said plurality of unit cells define an array of time delays to thereby define a spatial delay distribution for manipulating an incident acoustic wave to generate an acoustic output, wherein the structures of the unit cells within the array are defined by a plurality of layers in combination.

That is, the array of unit cells generally comprises a plurality of layers that are stacked together such that structures of the unit cells within the array are defined by the plurality of layers in combination.

By utilising a layered construction for the unit cells (whether individually or for the array of unit cells as a whole) it is believed that various advantages may be provided, at least in some embodiments, in terms of both manufacturability and acoustic performance.

For instance, a layered construction may typically be both faster and cheaper compared to traditional additive fabrication processes such as 3D printing. For example, each of the layers may be fabricated using existing "top-down" MEMS fabrication techniques where bulk micro-machining processes (e.g. laser cutting, chemical wet etching, photolithography, etc.) can be used to pattern each of the layers as desired. For instance, such processes may be used to selectively remove material from the layer in order to define a pattern of one or more openings in each layer. Each layer may therefore have an essentially two-dimensional (or 'binary') structure defined by these openings (and the lack of openings). By appropriately stacking a plurality of these layers together, e.g. with the openings suitably aligned or overlapping on adjacent layers, it is possible to construct a three-dimensional structure. That is, a three-dimensional unit cell structure may be fabricated by stacking together a plurality of essentially two-dimensional (planar) layers. The openings in each of the layers may thus define in combination an open channel extending through the unit cell through which acoustic waves may propagate.

Furthermore, in embodiments, these techniques may be able to provide higher resolution features than would typically be possible e.g. when using an additive approach such as 3D printing which would be limited by the resolution of the printer, and for current technologies would be limited to features on the scale of tens of microns. For instance, and by contrast to traditional additive manufacturing techniques, existing techniques for fabricating two-dimensional layers (e.g. MEMS or microfluidic techniques) may be used to define (sub) micron features on each of the layers. The structure of a unit cell formed in this way may therefore include relatively smaller features, e.g. suitable for manipulating shorter wavelengths. Thus, the layered construction, wherein a unit cell is fabricated from a plurality of layers that are then stacked together to define the structure of the unit cell may provide an approach for fabricating sub-wavelength structures that is scalable across a wider range of different operating wavelengths, e.g. even for relatively shorter operating wavelengths.

The layered construction may therefore open up a relatively larger amount of control over the propagation of acoustic waves within the unit cells, in a relatively compact and efficient manner. For instance, because it is relatively easier to incorporate smaller features into the channel structure, it may be possible to produce a larger range of different types of unit cells (with different time delays).

It will be understood that the unit cells of a device according to the second aspect may generally, and preferably do, comprise any of the features of the unit cells described above in relation to the first aspect (at least to the extent that they are not mutually exclusive).

For instance, where a unit cell, or an array of unit cells, is fabricated from a stack of layers, a (structured) channel may be formed that extends through each unit cell and that determines the associated time delay for that unit cell, e.g. in the same manner described above. The channel may generally extend from one side of the unit cell to the other (e.g. in the direction of propagation of the incident acoustic waves, e.g. the "z-direction").

For example, and preferably, each of the layers may comprise one or more openings such that when the layers are stacked together the openings in adjacent layers are aligned or overlapped so as to define a channel extending through the unit cell. Thus, by appropriately designing or selecting the size and position of the openings provided on each of the layers that are to be stacked together to define a unit cell, the shape of the channel for that unit cell may be controlled as desired. In embodiments, the channel may be substantially labyrinthine or meandered to define an extended effective path length for determining the time delay that is introduced by the unit cell.

The shape of the channel may be defined in essentially two dimensions (with the channel then being extended, or extruded, into the third dimension to define the unit cell). That is, the channel may be folded in two dimensions (only) (whereas the shape of the channel is essentially unchanged in the third dimension). Thus, the channel may have a substantially labyrinthine or meandered two-dimensional cross-section (e.g. in one of the planes parallel to the direction of propagation of the incident acoustic waves, e.g. the "x-z" or "y-z" plane).

However, it will be appreciated that the use of a layered construction technique also allows for more complex (three dimensional) channel geometries to be created. For example, the channel may be folded in three dimensions, e.g. to define a helical, or otherwise three-dimensional labyrinth or meander structure within the unit cell. The use of such three-dimensional channels may provide various advantages both from an acoustic and manufacturability perspective. Particularly, by folding the channel in a third dimension, so that a longer physical path length can be created in a smaller volume, it may be possible to reduce the number of the layers in the stack needed to introduce a desired time delay. Thus, the device may be further miniaturised, e.g. to yield (ultra) sub-wavelength thickness.

It will be appreciated that the array of unit cells of the device may generally be arranged in a plane or surface (which is typically flat or two-dimensional, but may in some cases be curved). For instance, the array of unit cells may typically define a plane or surface that is substantially normal to the propagation direction of an acoustic input wave provided to the device.

The plurality of layers that form the unit cell(s) may be stacked either parallel or perpendicularly to the plane and/or surface of the array.

For example, where the array extends generally in a "horizontal" (first) plane, the unit cells may be built up by stacking a plurality of layers horizontally (in the first plane), e.g. normal to the propagation direction of the acoustic input wave. Thus, each of the layers may comprise one or more openings, with the openings in adjacent layers then being aligned or overlapped to define a channel extending from one side of the unit cell (e.g. from the bottom layer) to the other side (e.g. the top layer). In this case, it will be appreciated that because the channel shape is defined by a plurality of layers together, the channel may be limited (in the "vertical" direction extending through the unit cell) to features having a resolution corresponding to the thickness of the layers.

Thus, it is also contemplated that the unit cells may be fabricated by stacking together a plurality of "vertical" layers, i.e. layers that extend perpendicularly to the (first) plane and/or surface of the array, e.g. parallel to the propagation direction of the acoustic input wave. For example, in this case, each layer may comprise a channel structure extending from one side of the layer to the other (parallel to the propagation direction of the acoustic input wave), with the layers then being stacked together to extend the channel structure into the third dimension to define a three-dimensional structure. This may allow more flexibility in the channel shape since the channel shape may be defined (e.g. with a relatively high resolution) in the plane of (each) of the layers. For example, in this way, it may be possible to fabricate curved channels, with the curved channel shape being patterned on each layer and the layers then being stacked together to extend the curved channel into the third dimension to define the unit cell.

In embodiments (of both the first and second aspects of the invention), an or each individual unit cell may be fabricated from a plurality of layers. That is, the layered construction described above may be used to fabricate a single unit cell. However, as mentioned above, it is also contemplated that a (single) acoustic surface comprising a plurality of unit cells may be fabricated from a plurality of layers. In this case, each layer may comprise a portion or slice of each of the unit cells within the acoustic surface. For instance, in embodiments, the device may comprise an acoustic surface comprising a plurality of unit cells arranged into an array, wherein the acoustic surface is constructed from a plurality of layers that are stacked together to define the unit cells within the array. It is also contemplated that only a portion of an acoustic surface of the device may be constructed in this way. For example, blocks of unit cells may be fabricated as a plurality of layers, and individual blocks of unit cells may then assembled together to define an acoustic surface.

The thickness(es) of the layers may generally be set as desired (at least within practical limits), e.g. depending on the desired resolution and operating frequency and/or overall thickness (height) of the unit cell. For instance, depending on the application, the thickness of (each) layer may be less than 500 microns, such as less than 300 microns, or less than 100 microns. The layers within a given unit cell may each have the same thickness or may have different thicknesses relative to each other (providing an additional means for designing the channel structure). It will be appreciated that the unit cells may comprise any number of layers as desired. For example, typically, the unit cells may comprise 5, 6, 7, 8, 9, 10, 11, 12 or more layers stacked together. In order to provide a planar (e.g. flat) surface, typically all of the unit cells will have the same thickness, and may therefore each comprise the same number of layers. However, various arrangements are possible.

Because the layered construction may allow relatively higher resolution (e.g. smaller) features to be defined, it will be appreciated that the layered construction may allow significant flexibility in the type of structures that can be generated. Thus, it is possible to fabricate in this way a large number of different types of unit cells encoding different time delays. For instance, as mentioned earlier, a set of unit cells may be fabricated spanning the phase delay range 0 to $2\pi$ in uniform intervals. However, the layered construction may allow for fabricating unit cells having essentially arbitrary phase delays. This may therefore open up more possibilities for non-uniform quantisation, wherein each unit cell is designed to encode a specific desired phase delay value e.g. that substantially matches a desired analogue phase delay value required to generate a given output. Thus, the unit cells formed in this way may provide a fuller 'palette' of time (phase) delay values that can be used to reproduce a desired acoustic field (e.g. allowing for a higher bit rate quantisation of the phase delay values within the device).

In general, where a layered construction is used for the unit cells, the layers may be stacked together in various suitable ways. For instance, various suitable wafer bonding techniques may be used to bond the layers together including (among others) e.g. fusion/direct bonding, anodic bonding, eutectic bonding and/or adhesive bonding. However, the layers within each unit cell (or surface) need not be (directly) bonded together and in some cases the layers may be spaced apart e.g. and held within a mounting structure or frame.

The layers within each unit cell (or each block or array of unit cells) may be stacked together to define a fixed structure. For example, the layers within a single unit cell (or a block of unit cells) may be fixed together to define a pre-configured unit cell (or block) for use with the first main embodiment of the first aspect of the invention. Similarly, in embodiments of the second aspect, a fixed array may be generated wherein the stack of layers define a fixed (pre-determined) spatial array distribution.

However, the layers within each unit cell (or within a surface) need not (all) be fixed together. That is, in embodiments, at least some of the layers are able to move (e.g. slide) relative to the other layers. In this way, it is possible for the unit cells and/or array of unit cells to be re-configured. For instance, the width of the channel and/or the opening of the channel for a unit cell may be controlled by appropriately moving (at least some of) the layers relative to each other. Thus, in embodiments, where the structure of a unit cell is defined by a plurality of layers stacked together, the unit cell may be re-configured to introduce a different time (or phase) delay by moving or sliding the layers relative to one another to change the structure of the unit cell. It will be appreciated that this approach generally lends itself to electronic and/or computer control. The device may thus further comprise one or more electrodes or electrode layers for providing control signals for moving the layers. For example, one or more piezoelectric actuators may be provided for controlling the relative positions of the layers and hence the shape of the channel. A CMOS chip can then be used to control the voltage on each actuator, thus controlling e.g. each of the unit cells in the array. In this way, it may be possible to realise a highly dynamic and miniaturised spatial sound modulation device.

Also provided is a method of fabricating a unit cell or array of unit cells from a plurality of layers. For instance, typically, the method may comprise: determining a respective pattern for each of a plurality of layers required to fabricate a given unit cell or array of unit cells; forming a plurality of layers incorporating the determined patterns; and stacking the plurality of layers together to form the unit cell or array of unit cells. The layers may be formed using any suitable techniques. For instance, as explained above, the layers may suitably be formed using existing MEMS fabrication techniques. For example, the layers may be patterned by using laser cutting, wet etching, or photolithography techniques to create one or more openings in the layers.

At least according to embodiments of the first aspect described above, the array of time delays defined by the plurality of unit cells may be re-configured to vary the spatial delay distribution in order to generate different acoustic outputs. However, various other embodiments are also contemplated for adjusting the device to generate different acoustic outputs.

Accordingly, from a third general aspect of the present invention, there is provided device for manipulating an incident acoustic wave to generate an acoustic output comprising: a plurality of unit cells arranged into an array, at least some of said unit cells being configured to introduce time delays to an incident acoustic wave at the respective positions of the unit cells within the array of unit cells, such that said plurality of unit cells define an array of time delays to thereby define a spatial delay distribution for manipulating an incident acoustic wave to generate an acoustic output, wherein the device is adjustable in order to generate different acoustic outputs.

As described above, the device may be adjusted by adjusting the array of time delays provided by the unit cells. However, it is also contemplated that the device (as a whole) may be adjusted to generate different acoustic outputs. For instance, different areas of the device (array) may be configured to perform acoustic manipulations. By moving the device (e.g. relative to an acoustic source) so that different areas of the device are 'illuminated' by the incident acoustic wave the acoustic output of the device can thus be varied. For example, the device may be physically rotated (rotatable) between a plurality of different positions wherein the portion of the array of unit cells that is illuminated at each position is associated with a different acoustic manipulation. An apparatus may thus be provided comprising an acoustic manipulation device substantially as described herein and an adjustable platform for moving e.g. rotating the device in order to generate different acoustic outputs. Other arrangements would of course be possible. For instance, the device need not be rotatably moved but may be caused to move in any suitable and desired manner.

Similarly, instead of moving the device itself e.g. relative to an acoustic source, a "masking" or "covering" element may be used to selectively cover certain areas of the device (and leave other regions exposed) so as to vary the acoustic output. This will be explained further below.

Also, it will be appreciated that the device of the third aspect may comprise any (or all) of the features described above in relation to the first and second aspects. For instance, the unit cells may generally comprise unit cells of any of the types described above. For example, the unit cells may comprise either pre-configured or re-configurable unit cells. Furthermore, the unit cells may either be fabricated using a layered construction technique or otherwise.

In general, the devices described herein may be operated at a range of different frequencies. However, in embodiments, the device may be substantially optimised or configured for operation at a certain operating wavelength, $\lambda_0$. For instance, and in general, and as described above, according to any of the aspects described herein (and both the first and second main embodiments of the first aspect), the unit cells within the device may be configured so as to introduce a desired phase delay, or phase delays, for incident acoustic waves at a certain operating wavelength, $\lambda_0$. For example, the dimensions of the unit cells, and the structures thereof, may be designed so as to introduce a desired phase delay at the particular operating wavelength or wavelengths for which the device is optimised. Furthermore, the unit cells may be designed to have a relatively high transmission (e.g. substantially 100%) at the operating wavelength, $\lambda_0$.

Of course, the device may still be used at wavelengths other than the intended design wavelength. However, in that case the phase delays introduced by the unit cells will generally be different. For example, a unit cell that is configured to introduce a first phase delay at a first operating frequency may introduce a different phase delay at a second operating frequency. However, there may be another unit cell that introduces the same first phase delay at the second operating frequency. Based on knowledge of the operating frequency, it may therefore be possible to select the appropriate unit cells for use at that frequency, even where that frequency is not the frequency for which the unit cells were originally configured. For instance, a suitable lookup table may be constructed and used to associate the unit cells with the appropriate phase delays at the selected frequency or frequencies. Alternatively, the unit cells may be configured to introduce a fixed time delay that is substantially independent of frequency. A desired phase delay can then be achieved by using the appropriate time delay for the selected frequency or frequencies. Alternatively, cells designed to operate at different frequencies may be arranged together in a "block" which will work over the range of frequencies defined by the single cells.

In some embodiments, the device may be designed or configured for operation in the ultrasonic range. For instance, the device may be substantially optimised or configured for operation at an operating wavelength, $\lambda_0$, within the ultrasonic range. For example, the device may be optimised or configured for operation at a frequency of about 40 kHz. However, it will be appreciated that the device may suitably be designed or configured for operation in any frequency range and the operating frequency or frequencies may e.g. be in the audible frequency range (for instance, to manipulate a loudspeaker output) or in the MHz range (for instance, where the device is intended to be used in a liquid medium).

In some embodiments, the unit cells may be configured to transmit acoustic waves substantially only at the operating wavelength, $\lambda_0$, for which the device has been designed to operate at. That is, the transmission of the incident acoustic wave may be substantially zero at wavelengths other than the operating wavelength.

Preferably, however, the device may be configured to also operate at frequencies other than the designated operating wavelength, $\lambda_0$. Thus, it is contemplated that although the device and/or unit cells may be optimised or configured for operation at a particular operating wavelength, $\lambda_0$, by appropriate design of the unit cells, the unit cells may also be configured to transmit and/or manipulate acoustic waves at wavelengths other than the designated operating wavelength, $\lambda_0$.

That is, although the unit cells may be designed for operation at a particular operating wavelength, this does not mean that the device cannot be used at other wavelengths.

In particular, where the unit cells are optimised or configured for operating at an operating frequency, $f_0(=c/\lambda_0)$, the unit cells may suitably be designed to also transmit acoustic waves at all frequencies, $f_j$, satisfying the relationship: $f_j=f_0-jc_0/L_{eff}$, wherein j is an integer, $c_0$ is the speed of sound through the unit cell and $L_{eff}$ is the effective path length through the unit cell that determines the phase delay introduced by the unit cell (($\varphi=e^{ikL_{eff}}$ for an incident acoustic wave of wavenumber k). In this way, a device having a multi-frequency response may be provided.

Furthermore, it has been found that the operating frequency and bandwidth of a unit cell may generally be related to the transmission of acoustic waves through the unit cell (essentially because the unit cells may act as resonant structures). That is, the transmission (or reflection) efficiency of each of the unit cells may provide a further parameter for controlling or adjusting the output of the acoustic manipulation device, particularly to provide a different frequency response. Thus, in embodiments, instead of configuring a unit cell with a relatively high (e.g. substantially 100%) efficiency at the operating frequency, the transmission or reflection efficiency of the unit cell(s) may be selected or adjusted in order to vary the acoustic output of the device. For instance, each of the unit cells may have an associated amplitude (e.g. or intensity) value representing the relative amplitude (e.g. intensity), or change in amplitude (e.g. intensity), introduced by that unit cell to an incident acoustic wave of a particular frequency (e.g. at the operating frequency of the device) passing through the unit cell. Thus, by appropriately selecting or configuring the amplitude (e.g. intensity) values for a unit cell it is possible to change the acoustic manipulation provided by that unit cell. For example, the amplitude (e.g. intensity) value for a unit cell may be selected or configured e.g. to increase or optimise the operating bandwidth for that unit cell.

It will be appreciated that this amplitude (e.g. intensity) optimisation may generally be performed according to any of the aspects and embodiments described herein. For example, as well as (or instead of) re-configuring the array of time delays defined by the plurality of unit cells, it would also be possible to adjust the device by re-configuring the amplitude (e.g. or intensity) values associated with the unit cells. Accordingly, each of the unit cells may have an associated amplitude (e.g. or intensity) value representing the relative amplitude (e.g. intensity), or change in amplitude (e.g. intensity), introduced by that unit cell to an incident acoustic wave, and wherein the array of unit cells may be re-configured to vary an amplitude (e.g. intensity) distribution of the array of unit cells in order to generate different acoustic outputs. That is, amplitude modulation may be performed across the surface of the array.

Alternatively, or additionally, a multi-frequency response may be provided by incorporating different types of unit cell that are configured for operating at different wavelengths into the array. Thus, the device may in embodiments be configured to operate at a plurality or a range of operating wavelengths.

For instance, in some embodiments, the array of unit cells may include a plurality of different unit cells that are configured to operate at different frequencies. For example, the array of unit cells may comprise a first set of unit cells configured to introduce a first set of desired phase delays to an incident acoustic wave at a first operating wavelength (i.e. to perform a first operation, or acoustic manipulation, at the first operating wavelength) and a second set of unit cells configured to introduce a second of desired phase delays to an incident acoustic wave at a second operating wavelength (i.e. to perform a second operation, or acoustic manipulation, at the second operating wavelength). The first and second set of unit cells may generally be arranged to perform the same operation (but for different incident frequencies). However, it would also be possible for the first and second set of unit cells to perform different operations, so that different frequency incident acoustic waves were manipulated in different ways (e.g. like in a prism). It will be appreciated that the array of unit cells may comprise any number and type of unit cells. Thus, the array of unit cells may also generally comprise a third or further set of unit cells configured to introduce a third or further set of desired phase delays to an incident acoustic wave (or to perform a third or further operation or acoustic manipulation) at third or further operating wavelengths.

In such cases, a selective "masking" or "covering" element (e.g. in the form of a masking layer comprising a number of open elements (areas) that allow acoustic waves to pass through and a number of closed elements (areas) that prevent acoustic waves from passing through) may be provided that is configured to be able to selectively cover at least some of the unit cells. For instance, the masking element may be configured to selectively cover one or more of the different sets of unit cells (whilst leaving one or more other of the sets of unit cells open). For example, where the array of unit cells comprises a first and second set of unit cells as described above, the masking element may be selectively positioned (or positionable) to cover either the first or second set of unit cells (whilst leaving the other set of unit cells open). In this way, the device can be effectively and rapidly switched between different operating frequencies. For example, where the masking element covers the first set of unit cells, so that only the second set of unit cells are open, the device will be optimised for operating at the second wavelength, and vice versa. Where three or more sets of unit cells are provided, the masking element may be operable to selectively cover multiple sets of unit cells at any given time, e.g. all but one of the sets of unit cells.

(The use of such a selective masking element may also be used more generally to adjust the operation of the device e.g. in accordance with the third aspect described above. For instance, the array of unit cells may generally comprise a plurality of different types of unit cells and the masking element may be used to select a subset of types of unit cells. That is, this approach is not limited to frequency switching but may more generally be used for switching between other operations. Thus, the array of unit cells may comprise a first set of unit cells configured to perform a first operation (e.g. at a first frequency) and a second set of unit cells configured to perform a second operation (e.g. at a second frequency). For instance, in embodiments, the first set of unit cells may perform a first acoustic manipulation at the first frequency whereas the second set of unit cells perform a second acoustic manipulation at the same first frequency. By using the masking element to select between the first and second sets of unit cells the device can thus be switched between the first and second acoustic manipulations. Naturally, the array of unit cells may also comprise third or further sets of unit cells allowing the device to be switched between further operations. Furthermore, it will be appreciated that the array of unit cells may generally comprise any number and types of unit cells. So, for instance, with an appropriate selection of unit cell types, it would be possible to provide a device that is capable of switching between different operating frequencies and different operating functions.) In other cases, a block may be formed by N different types of cells, each optimised to operate in a narrow-band centred on a single different frequency e.g. $(f_1, \Delta f_1)$ for the first cell, $(f_2, \Delta f_2)$ for the second cell . . . $(f_N, \Delta f_N)$ for the $N^{th}$ cell. In these cases, the cells may be designed to be much smaller than the smallest of the associated wavelengths (i.e. $\lambda_1, \lambda_2, \lambda_3$ etc.), and their frequencies to be sufficiently close together (e.g. with $f_2-f_1<\Delta f_1$), so that the whole block covers a larger bandwidth.

The device according to the present invention may thus be used to manipulate incident acoustic waves at the operating wavelength, $\lambda_0$, for which the, or at least some of the, unit cells have been optimised or configured. However, in embodiments, the device may also or alternatively be used to manipulate incident acoustic waves at other wavelengths. It will be appreciated that at other wavelengths the device may no longer be optimised for transmission and/or phase delay.

Where the device is optimised or configured for operation at an operating wavelength, $\lambda_0$, at least some of, or each of, the plurality of unit cells may have a dimension within the array, e.g. at the surface of the device or in the plane of the array (i.e. the surface or plane upon which an acoustic wave to be manipulated is incident), of half the operating wavelength (i.e. $\lambda_0/2$), or smaller. It has been found that limiting the size of the unit cells within the array to this dimension helps to provide better spatial resolution for generating or recreating desired acoustic waves. Where the dimension of the unit cells is half the operating wavelength (i.e. $\lambda_0/2$) or smaller, the device may also suitably be used for frequencies less than the operating wavelength at which the unit cells were optimised or configured for operating at. On the other hand, operating the device at frequencies higher than the operating wavelength (i.e. greater than $\lambda_0$) may result in the appearance of acoustic field artefacts and a loss of accuracy.

In general, it is contemplated that where the lateral dimension of the unit cells (i.e. the dimension of the unit cells that defines the array of unit cell) is fixed at some value, L, the device may suitably be used at a or all frequencies below a maximum frequency, $f_{max}=c/2L$.

It is contemplated that the device may be used in a single or mono frequency operation. However, it is also contemplated that the device may be used for "broadband" operation. For instance, a limited band of frequencies around a central operating frequency may be passed to the device. By appropriate design of the unit cells, for example such that the effective path length (and hence time delays) do not depend on frequency, at least in the frequency range of operation, the unit cells may transmit across the range of frequencies. The array of unit cells may be designed so as to effectively average the frequency response of the individual unit cells to allow the device to work over the frequency range. Alternatively, the different frequency response(s) of the unit cells may be exploited to produce a frequency dependent acoustic output. For example, the device may be configured to manipulate an incident acoustic wave containing a range of frequencies to generate a first acoustic output associated with a first frequency and a second acoustic output associated with a second frequency and so on. The device may thus be used to effectively split the different frequency components of the incident acoustic wave.

As described above, the unit cells may typically be configured for (optimal) operation at a single operating frequency. However, where a layered construction is used for the unit cells, this may allow for the implementation of various perturbation methods for increasing the frequency band where each unit cell (or array of unit cells) can operate. For instance, as described above, each unit cell may generally comprise a channel that introduces a time delay to an incident acoustic wave. By introducing vibrations or perturbations in the layers of a unit cell that cause corresponding variations in the length and/or shape of the channel it may be possible to maintain the transmission efficiency for the unit cell over a wider range of frequencies with minimal changes in the output. Typically, these will be relatively small (low amplitude) and high-frequency vibrations. Thus, in embodiments, where a unit cell (or array of unit cells) comprises a plurality of layers that are stacked together to define the structure of the unit cell (or array of unit cells), at least some of the layers may be caused to vibrate (or otherwise move continuously to and fro) relative to each other to adjust the structure of the unit cell. For instance, in some examples, at least one of the layers may be mechanically moved at a frequency higher than the operating acoustic frequency. In this case, the perturbation frequency may be at least twice as large as the highest acoustic frequency in order to help reduce artefacts. However, even if it is not possible or practical to mechanically move the layer(s) at this frequency, there may still be some benefits in using lower perturbation frequencies e.g. in terms of the fidelity of the acoustic output.

The array may be provided in the form of one or more layers of unit cells. A layer of unit cells (which may also be referred to as an "acoustic surface") preferably comprises a layer having a single unit cell thickness. The plurality of unit cells may thus be arranged in a layer (acoustic surface). The arrangement of the unit cells within a or each layer (acoustic surface) may be substantially flat or two-dimensional. That is, a or each layer (acoustic surface) may be substantially planar, with the array of unit cells within each layer arranged in a plane. However, it is also contemplated that the arrangement of unit cells within a or each layer (acoustic surface) need not be flat, and a layer may define a curved surface. For instance, the unit cells within the layer (acoustic surface) may be mounted on, or otherwise arranged to form, a curved surface. The curved surface may generally be convex or concave or otherwise profiled. Thus, the surface(s) of the device may generally be planar or curved.

In embodiments, the device may comprise a stack of two or more layers (acoustic surfaces), each layer (acoustic surface) comprising an array of unit cells and/or time delay values. That is, a device may be built up by stacking multiple layers of arrays of unit cells of the type described above. Where the device comprises a stack of two or more layers (acoustic surfaces), each layer (acoustic surface) may have a different spatial delay distribution and/or a different spatial configuration of unit cells.

Because time delays are additive, appropriately stacking multiple layers (acoustic surfaces) together may allow more complex transformations or combinations of transformations to be performed. For example, by stacking a 'steering' layer (surface) with a 'focussing' layer (surface), it is possible to perform 'steered focussing'.

Considered another way, multiple devices may be stacked together in order to build more complex devices.

In embodiments, the structure of the unit cells may be configured or designed to facilitate stacking. For instance, the unit cells may be designed to have nearly 100% transmission (or reflection) at the operating wavelength(s). (However, it is also contemplated in other embodiments, as mentioned above, that the transmission (reflection) efficiency of the unit cells may be controlled e.g. in order to adjust the frequency response of the unit cells.)

The unit cells may generally be impedance matched with the ambient medium to reduce reflections. For instance, where the device is operating in air, the unit cells may be impedance matched with air. However, it will be appreciated that the device may be operated in other ambient media, including liquids such as water, depending on the application.

It will be appreciated that using substantially flat or two-dimensional layers may facilitate stacking of the layers (acoustic surfaces). However, it will be appreciated that curved layers (surfaces) may equally be stacked, and that the device may therefore comprise a stack of two or more curved layers (surfaces), or a stack comprising a mixture of flat and curved layers (surfaces). In this way, the orientation of the unit cells may also contribute to the manipulation of the incident acoustic waves. By using appropriately shaped surfaces it may be possible to reduce the number of types of unit cells that are required to produce a given field with a desired precision.

The devices of the present invention, according to any aspects, are generally arranged to manipulate an incident acoustic wave. Generally, this is a spatial manipulation of the incident acoustic wave, i.e. the device acts to spatially modulate, shape, or otherwise control the incident acoustic wave. The manipulated acoustic wave is then provided as the acoustic output of the device.

For example, in embodiments, the spatial delay distribution of the array may be configured so as to focus an incident acoustic wave. In another example, the spatial delay distribution of the array may be configured so as to steer or direct an incident acoustic wave. As a further example, the spatial delay distribution of the array may be configured so as to introduce a phase delay of about $\pi$ radians (a "half-wave" delay) for incident acoustic waves at a particular frequency. However, it will be appreciated that by suitably varying the spatial delay distribution of the device, it is possible to realise a great number of different manipulations, so as to be able to generate or reproduce essentially arbitrarily complex acoustic outputs. In embodiments, the device according to any of the aspects described herein may be used in combination with an acoustic source in order to manipulate the acoustic waves generated by the acoustic source. It will be appreciated that the manipulation performed by the device may be essentially independent of the acoustic source. That is, the manipulation of the incident acoustic wave by the device is generally controlled by the distribution of time delays across the device, and not by the form of the incident acoustic wave. Advantageously, this means that the device does not need to draw any power from the acoustic source and that the device may thus be re-configured independently of the acoustic source. This separation of the acoustic source from the manipulation may help to simplify the power requirements for the acoustic source and/or for the device. By contrast, in conventional phased transducer arrays, because the sound modulation is performed by the transducers themselves, any switching of the transducers to re-configure the acoustic wave results in a loss of acoustic power. For instance, typically around 10-20% of the acoustic power may be lost when re-configuring a phased transducer array. The power requirements for a conventional phased transducer arrays are typically relatively complicated requiring a large number of high power channels, which can be expensive and difficult to control.

Because the manipulation may be essentially independent of the acoustic source, the form of the incident acoustic wave and hence of the acoustic source does not particularly matter and the devices according to the present invention may generally be configured to receive and manipulate any incident acoustic wave.

For instance, in embodiments, the devices according to the present invention in any of its aspects may be used to manipulate an acoustic wave that is incident normally to a surface of the device and is substantially uniform over the surface of the device. In this way, the power requirements for the acoustic source can be dedicated solely to providing acoustic wave strength, and need not perform any manipulation, which can be achieved solely using the devices according to the present invention. Thus, an assembly may be provided comprising an acoustic source for generating such acoustic waves combined with a device substantially as described herein in relation to the present invention.

However, in other embodiments, the devices may be used with arbitrary or pre-existing acoustic sources. For instance, the devices may be retro-fitted or added to existing acoustic sources in order to provide a desired manipulation. The device may thus be provided with a sleeve or other member for facilitating mounting of the device around the acoustic source. In this case, the devices according to the present invention may be used to further manipulate acoustic waves that have already been shaped. For example, a device according to the present invention may be used to further manipulate (e.g. steer or focus) an acoustic wave produced by a directional loudspeaker. In this way, the final acoustic output may be determined in part both by the acoustic source and the device according to the present invention.

In other embodiments, the devices of the present invention may be used in combination with a suitable sensor or detector as part of an imaging or sensing assembly. For instance, the device may be used to receive or sense an incident acoustic wave, and to direct the acoustic output onto or towards the sensor or detector for recording and/or analysis. In this case, the arrangement of time delays of the unit cells within the array may be appropriately selected depending on the desired application in a similar manner to that described above. For instance, the device may be configured to focus the incident acoustic wave onto a sensor or detector. However, it also contemplated that the device may be configured to perform various other manipulations depending on the application in order to help detect a desired property. For instance, the device may be configured to sum the contributions of the incident acoustic wave(s) at different spatial positions in the device according to the spatial delay distribution of the device. The device may thus be configured to act as a radar, or a sonar, wherein the device acts to capture acoustic waves from a specific position and/or direction and to transmit the capture acoustic waves onto a (fixed) sensor or detector.

The array of unit cells may generally comprise any suitable number of unit cells and the unit cells may generally be arranged within the array in any suitable manner. The array need not be a regular array and in general the unit cells may be arranged relative to one another in any suitable and desired arrangement. However, in embodiments, the array may be a two-dimensional array of M×N unit cells where M and N may each independently comprise any integer value. For instance, the values of M and/or N may each be selected from the list comprising 1, 2, 3, 4, 8, 16, 24, 100. As mentioned above, some of the elements of the array may comprise empty cells. In some embodiments, the array may comprise a regular rectangular or square array of unit cells. For example, the array may comprise an array of 16×16 unit cells, which may e.g. be suitable for creating a twin-trap. As another example, the array may comprise an array of 24×24 unit cells which may e.g. be suitable for creating a tactile focal point. As a further example, the array may comprise an array of 100×100 cells which may e.g. be suitable for creating three-dimensional figures made of levitated objects. It will be appreciated that the unit cells in the array need not be square-packed and that the array of unit cells may be arranged according to other suitable packing methodologies, such as a random or hexagonal packing. In embodiments, the array may comprise a three-dimensional arrangement of unit cells, for example, a plurality of unit cells arranged in one or more separate layers.

In general, the devices described herein may be configured to operate either in transmission or reflection. That is, the device may be configured so that when an incident acoustic wave is provided on a first side of the device, acoustic waves travel through and out of the device to provide an acoustic output on the opposite side of the device (i.e. in transmission). However, the device may alternatively be configured so that the acoustic output is provided on the same side of the device onto the incident acoustic wave is provided (i.e. reflection). For instance, when the unit cells comprise a central channel, the channel may be open, and extend between opposite sides of the unit cell so that acoustic waves are transmitted from one side of the device to the other. Alternatively, the channel may be closed at one end to cause acoustic waves to be reflected. It is also contemplated that in some examples the device may be used to transfer (incident) evanescent waves into a surface.

The device may comprise an acoustic waveguide for guiding the incident acoustic wave onto or towards the array of unit cells. In this way, the manipulation of the incident acoustic wave may be physically (as well as conceptually) removed from the acoustic source. This may be useful when it is desired to provide the acoustic output to a particular area without having to install a potentially bulky acoustic source in that area (i.e. for aesthetic or space-saving reasons).

The devices described herein may be provided as 'stand-alone' acoustic manipulation devices. However, it is also contemplated that the devices described herein may be incorporated as part of a larger structure. Accordingly, from another aspect there is provided a structure comprising a device substantially as described in relation to any of the aspects or embodiments herein. For example, a device comprising a plurality of unit cells may be provided on an outer surface of a structure to provide the structure with the ability to spatially modulate acoustic fields. This may be advantageous for instance for various noise control applications. For instance, an acoustic modulation device of the type described herein may suitably be incorporated into building materials such as house bricks or insulation for the purposes of noise reduction. The device may generally be provided either as a layer on top of the existing structure or formed integrally with the structure.

From another aspect there is provided a method of generating a spatially modulated acoustic field comprising: generating an acoustic input wave; and passing the acoustic input wave through a device substantially as described herein in relation to the present invention in any of its aspects or embodiments so as to manipulate the acoustic input wave to generate a desired acoustic output.

From a further aspect there is provided a method of acoustic imaging or sensing comprising: passing an acoustic input wave through a device substantially as described herein in relation to the present invention in any of its aspects or embodiments so that the device manipulates the acoustic input wave to generate an acoustic output; and detecting the acoustic output at a sensor or detector.

The methods according to these aspects may further comprise re-configuring the device to generate a different acoustic output. For instance, the device may be re-configured according to either of the first or second main embodiments of the first aspect described above.

The aspects described above primarily relate to the configuration of the device. However, also presented herein are methods of determining how the device may be configured (or re-configured) in order to generate a desired acoustic output.

In relation to the first aspect, these methods may thus be used to determine which, or how many, pre-configured unit cells need to be manufactured and/or provided to a user in order to meet the user's required specification. Similarly, the methods may be used to determine and generate electronic control signals required for controlling an array of re-configurable unit cells. Generally, the methods involve determining which time or phase delays, i.e. which time or phase delay values need to be introduced at which positions within the array in order to generate a desired acoustic output with a desired accuracy.

Thus, from a further aspect, there is provided a method of designing or configuring a device for manipulating acoustic waves comprising a plurality of unit cells arranged into one or more layers each layer comprising an array of unit cells, at least some of the unit cells being configured to introduce time delays to an incident acoustic wave at the respective positions of the unit cells within the array(s) of unit cells, such that the plurality of unit cells define an array of time delays to thereby define a spatial delay distribution for manipulating an incident acoustic wave to generate an acoustic output, the method comprising: determining a quantised delay distribution of a desired analogue acoustic field containing a set of discrete pairs of time delay values and spatial positions representing the distribution of time delays required in the device for generating the desired analogue acoustic field; mapping the quantised delay distribution of the desired analogue acoustic field to the positions and time delay values of the unit cells for the device; and selecting the time delays of the unit cells for (or within) the device based on the mapping.

Generally, the device that is being designed or configured according to this aspect may be a device of the type described above in relation to the previous aspects and embodiments of the present invention. For instance, the device may be a re-configurable device as described in relation to the first aspect. However, it will be appreciated that these methods may also advantageously be used to design or configure a fixed device wherein the array of time delays is not re-configurable in use.

For instance, in relation to the second aspect, these methods may be used to determine the required time delay values for each of the unit cells within the array (which may then in turn be used to determine the required structure for each of the layers that are then used to form the array).

The desired analogue acoustic field may be a theoretical or simulated field, or may be a real acoustic field. In the latter case, the real acoustic field may be sampled in order to determine a sampled phase distribution, and the sampled phase distribution may then be quantised appropriately in order to determine the distribution of time delays or phase delays required at the device to reproduce the field. The real acoustic field may be sampled at a certain distance from the device, and the sampled field may thus need to be first mapped onto the surface(s) of the device in order to determine the time delays and positions required at the device for reproducing the acoustic field. This mapping may be done, for example, using acoustic holography techniques. In other cases, or where the acoustic field is theoretical or simulated, the acoustic field may already be sampled at a surface of the device.

In any case, the result of the quantisation step is a quantised delay distribution containing a set of pairs of discrete spatial positions and time delay values representing the (discrete) time delay that is required at each discrete position in the device in order to best reproduce or generate the desired analogue acoustic field. Thus, the result of the quantisation step is that the desired analogue field is effectively quantised in both the spatial and time delay domains. The quantised phase distribution i.e. the determined pairs of spatial positions and time delay values may then be mapped onto the unit cells of the device. It will be appreciated that in order to reproduce the desired acoustic field it may be necessary to determine the phase delays required at each discrete position on the device. The quantisation step may thus be used to determine a quantised phase distribution of the desired analogue acoustic field containing a set of discrete pairs of phase delay values and spatial positions representing the distribution of phase delays required at the device (e.g. at the surface or in the plane of the device) for generating the desired analogue acoustic field. The quantised phase distribution may then be mapped to the phase delay values of the unit cells. The mapping may therefore take into account, or may determine the appropriate, frequency or frequencies of operation required to generate the desired analogue acoustic field.

During the quantisation, the amplitude/intensity for each of the unit cells may be fixed (e.g. at unity) so that the quantisation is performed solely in the spatial and time delay domains. However, it would also be possible to perform quantisation in the amplitude or intensity domain, as well as (or even instead of) in the time delay domain. Thus, in some cases, the quantisation may involve determining a quantised delay distribution of a desired analogue acoustic field containing a set of discrete pairs of time delay and/or amplitude or intensity values and spatial positions representing the distribution of time delays and/or amplitudes or intensities required in the device for generating the desired analogue acoustic field; mapping the quantised delay distribution of the desired analogue acoustic field to the positions and time delay and/or amplitude or intensity values of the unit cells for the device; and selecting the time delays and/or amplitude or intensity values of the unit cells for (or within) the device based on the mapping.

Accordingly, from another aspect, there is provided a method of designing or configuring a device for manipulating acoustic waves comprising a plurality of unit cells arranged into one or more layers each layer comprising an array of unit cells, at least some of the unit cells being configured to introduce time delays to an incident acoustic wave at the respective positions of the unit cells within the array(s) of unit cells, such that the plurality of unit cells define an array of time delays to thereby define a spatial delay distribution for manipulating an incident acoustic wave to generate an acoustic output, the method comprising:

determining a quantised delay distribution of a desired analogue acoustic field containing a set of discrete pairs of amplitude or intensity values and spatial positions representing the distribution of amplitude or intensity values required in the device for generating the desired analogue acoustic field; mapping the quantised delay distribution of the desired analogue acoustic field to the positions and amplitude or intensity values of the unit cells for the device; and selecting the amplitude or intensity values of the unit cells for (or within) the device based on the mapping.

Preferably, the quantisation is performed (at least) in the spatial and time delay domains.

In some cases, the time delays of the unit cells for (or within) the device may be selected directly based on the mapping of the quantised delay distribution to the positions and time delay values of the unit cells for the device. For instance, where it is possible to fabricate unit cells having essentially arbitrary time delay values, the time delay values for the unit cells may be set to the (closest) appropriate value based on the mapping.

However, it will be appreciated that the resolution of the desired analogue acoustic field, or particularly the resolution of the sampling, where such sampling is performed, may not match the resolution of the device. That is, the desired analogue acoustic field may be sampled and/or quantised at a first resolution in the spatial and/or delay domains, whereas the dimensions of the device in the spatial and/or delay domain may be different, in which case a direct or one-to-one mapping to the available positions and/or the available time or phase delay values may not be possible (so that some approximation or matching to the closest available value may be required). It will be understood that the resolution in the delay domain is essentially determined by the number of available time or phase delay values (e.g. the number of unique quanta).

Thus, in embodiments, the methods of this aspect may comprise a step of compressing the quantised delay distribution in the spatial and/or delay domains in order to generate a compressed delay distribution in the spatial and/or delay domains, wherein the resolution of the compressed delay distribution in the spatial and/or delay domains is such that the compressed delay distribution may be mapped directly to the desired positions and time (or phase) delay values of the unit cells for (or within) the device. It will be appreciated that a compression step may occur simultaneously, or as a part of the quantisation step.

The resulting compressed delay distribution may allow for a direct or one-to-one mapping between the elements of the compressed delay distribution and the desired positions and/or time (or phase) delay values for the unit cells within the device. That is, the resolution of the compressed delay distribution may match the achievable resolution of the device. The mapping step and/or the setting or selecting step described above may therefore use the compressed delay distribution.

In this way, the mapping from the quantised delay distribution to the device may take into account the spatial and/or delay resolution of the device. The compression may advantageously be used in two main ways.

In a first main embodiment of this aspect, the compression step may be used to generate a compressed delay distribution suitable for direct mapping onto the available unit cells. The desired positions and time or phase delay values in this case may thus be the available positions and time or phase delay values for a pre-existing set of unit cells. That is, the compression may be used to match the delay distribution of the desired acoustic field to an existing set of unit cells.

Thus, where the spatial delay distribution of the acoustic field is provided or sampled at a first resolution, the compression step is effectively used to change the resolution in order to match the available or existing unit cells.

In a second main embodiment of this aspect, instead of using the compression to map onto an available set of existing unit cells, the compression may be used itself to determine or optimise the types of unit cells that need to be provided in order to generate the desired analogue field. In this case, the desired positions and/or time or phase delay values are effectively determined from the compression step. For instance, the compression may be optimised based on the acoustic output and the accuracy desired by a user in order to manufacture or provide a bespoke set of unit cells. Thus, in embodiments, the method may further comprise providing as input an accuracy at which it is desired to reproduce the desired analogue acoustic field. The compression algorithm may then be run to determine the minimum number and type of unit cells required to produce the desired analogue acoustic field with the desired accuracy.

The method may thus comprise determining the minimum number of (unique) unit cells and/or time or phase delay values required to reproduce the desired analogue field with a desired accuracy based on the step of compressing the quantised delay distribution. This may be the minimum number of time or phase delay values from an existing set of available time or phase delay values (i.e. the method may comprise determining which unit cells from an existing set should be used). However, it is also contemplated that this may be a determination of the absolute minimum number of time or phase delay values required to reproduce the desired analogue field with the desired accuracy. That is, the method may comprise optimising the number and type of unit cells to provide the smallest set of unique unit cells or unique time or phase delay values required. For instance, the method may comprise determining a set of (typically non-uniformly distributed) phase delay values required for a particular application. A bespoke set of unit cells may thus be manufactured according to this optimisation or determination.

It will be appreciated that the minimum or optimum number of unit cells may alternatively be determined by various other suitable techniques, for instance, with multi-parameter optimisation techniques such as a least squares minimisation. The methods of this aspect may generally be used to configure or design either a single layer device, or a device comprising a stack of layers, each layer comprising an array of unit cells. Thus, the steps of mapping the quantised delay distribution to the positions and time delays of unit cells within the device may comprise either mapping the quantised delay distribution to the positions and time delay values of unit cells within a single layer, or may comprise mapping the quantised delay distribution to the positions and time delay values of unit cells within a plurality of layers. Similarly, the step of setting or selecting the time delay values of the unit cells within the device based on the mapping may comprise either setting or selecting the time values of the unit cells within a single layer, or may comprise setting or selecting the time delay values of the unit cells within each of a plurality of layers accordingly.

Naturally, where the methods are used to configure or design a single layer of unit cells, the quantised or compressed delay distribution may be mapped to the positions and time delay values of the unit cells within that layer. Typically, in this case, the mapping will be lossy i.e. some information from the quantised delay distribution will be lost during the mapping.

On the other hand, where the methods are used to configure or design a device comprising a stack of layers of unit cells, the compression step may be used to decompose the quantised delay distribution into a series of levels, each level containing a set of pairs of spatial positions and time delay values, such that each level may then be mapped to a respective layer of the device. For instance, the compression step may effectively decompose the quantised phase distribution into an algebraic sum of the base functions used in the compression algorithm. By using a stack of multiple layers, this sum can be performed physically as each layer can represent one of the terms (i.e. base functions) of the sum. In this way, with a suitable selection of the base functions (and unit cells), a theoretically lossless or at least low or lower loss mapping may be achieved by an appropriate stacking of multiple layers together.

Thus, the step of compressing the quantised phase distribution in the spatial and/or time delay domains may comprise generating a compressed delay distribution comprising two or more (such as three, or four) layers such that the compressed delay distribution may be mapped directly to the positions and time delay values of the unit cells within each of the two or more layers of the device.

In general, any suitable compression algorithm may be used to generate the compressed delay distribution.

However, the Applicants have recognised that the phase distribution for an arbitrary acoustic field may typically contain relatively sharp edges or boundaries between different phases. Thus, when compressing the delay distribution of an acoustic field, it has been found that it is advantageous to use a compression algorithm that preserves generic features such as edges. In particular, it has been found that wavelet transformations may suitably be used for compressing a delay distribution representing acoustic phases. For instance, the compression algorithm may decompose the delay distribution into a sum of one or more discrete wavelets (which form the base functions of the decomposition). By way of example, a Haar or Shannon wavelet decomposition may be used. The Haar wavelet (which is essentially a single cycle of a square-wave function) may be particularly suitable since it has been found that unit cells may be designed to provide a physical representation of the Haar wavelet function.

Indeed, in general, the techniques described herein may involve unit cells that are constructed or configured based on a compression algorithm that may be used in a step of compressing an acoustic phase distribution in the manner described herein. For instance, the unit cells may be configured based on the basis functions used by the compression algorithm, e.g. such that they substantially match the basis functions. That is, the time or phase delays introduced by the unit cells (or combinations of unit cells) may be configured or selected based on the form of the basis functions used in the compression algorithm (e.g. the Haar wavelet function, as mentioned above). This may facilitate and/or improve the accuracy of the step of mapping the quantised delay distribution onto the unit cells. In particular, by using unit cells that can be designed to match the basis functions of the compression, a lossless or low loss compression may be facilitated, as mentioned above. For instance, the unit cells within the layers of a multilayer device may be used to physically represent the various terms of the Haar wavelet decomposition.

Once the time or phase delay values required for generating the desired acoustic output (at the desired level of accuracy) have been determined using these methods, it is then possible to select, or to set, the appropriate arrangement of unit cells and/or time or phase delays for use within the array. For example, it is contemplated that the output of these methods may be provided as input to a 3D printer for manufacturing a kit of pre-configured unit cells having the required delays. Alternatively, the output of these methods may be used to design suitable photolithographic masks for forming a plurality of layers that can be stacked together to manufacture the unit cells. In other embodiments, the output of these methods may be provided to a processor or storage device and used to generate a control signal for controlling an array of re-configurable cells.

BRIEF DESCRIPTION OF THE DRAWINGS

Various embodiments will now be described, by way of example only, and with reference to the accompanying drawings in which:

FIG. 4A shows a perspective view of a unit cell of the type shown in FIGS. 2 and 3, and FIG. 4B shows a set of unit cells configured to introduce phase delays spanning the range 0 to $2\pi$ in discrete intervals of $\pi/8$;

FIG. 5 shows an example of a frame into which a plurality of unit cells may be mounted to form an array of unit cells;

FIG. 6 shows the transmission and reflection behaviour of unit cells of the type shown in FIGS. 2, 3, 4A and 4B that are configured to introduce phase delays of $\pi$ (upper panel) and $15\pi/8$ (lower panel);

DETAILED DESCRIPTION

The concepts described herein relate generally to a novel approach for spatially manipulating sound using acoustic metamaterials. Thus, a device for manipulating acoustic waves (hereinafter, a "sound modulation device") is provided. In particular, a plurality of unit cells each capable of encoding a particular time or phase delay, or plurality of time or phase delays, are arranged together in an array in order to construct an acoustic metamaterial layer (or, alternatively, a "meta-surface"). The time delay or phase distribution of the acoustic metamaterial layer may thus be quantised in the spatial domain according to the positions and sizes of the unit cells. The spatial distribution of the time or phase delays across the acoustic metamaterial layer generally determines how an acoustic wave incident on the metamaterial layer will be transformed or manipulated as it passes through and interacts with the unit cells of the metamaterial layer. The unit cells, or the arrangement of unit cells within the metamaterial layer, may be re-configured for performing various different acoustic transformations or manipulations.

Various non-limiting examples and embodiments will now be described to help illustrate these concepts.

Figure 1:
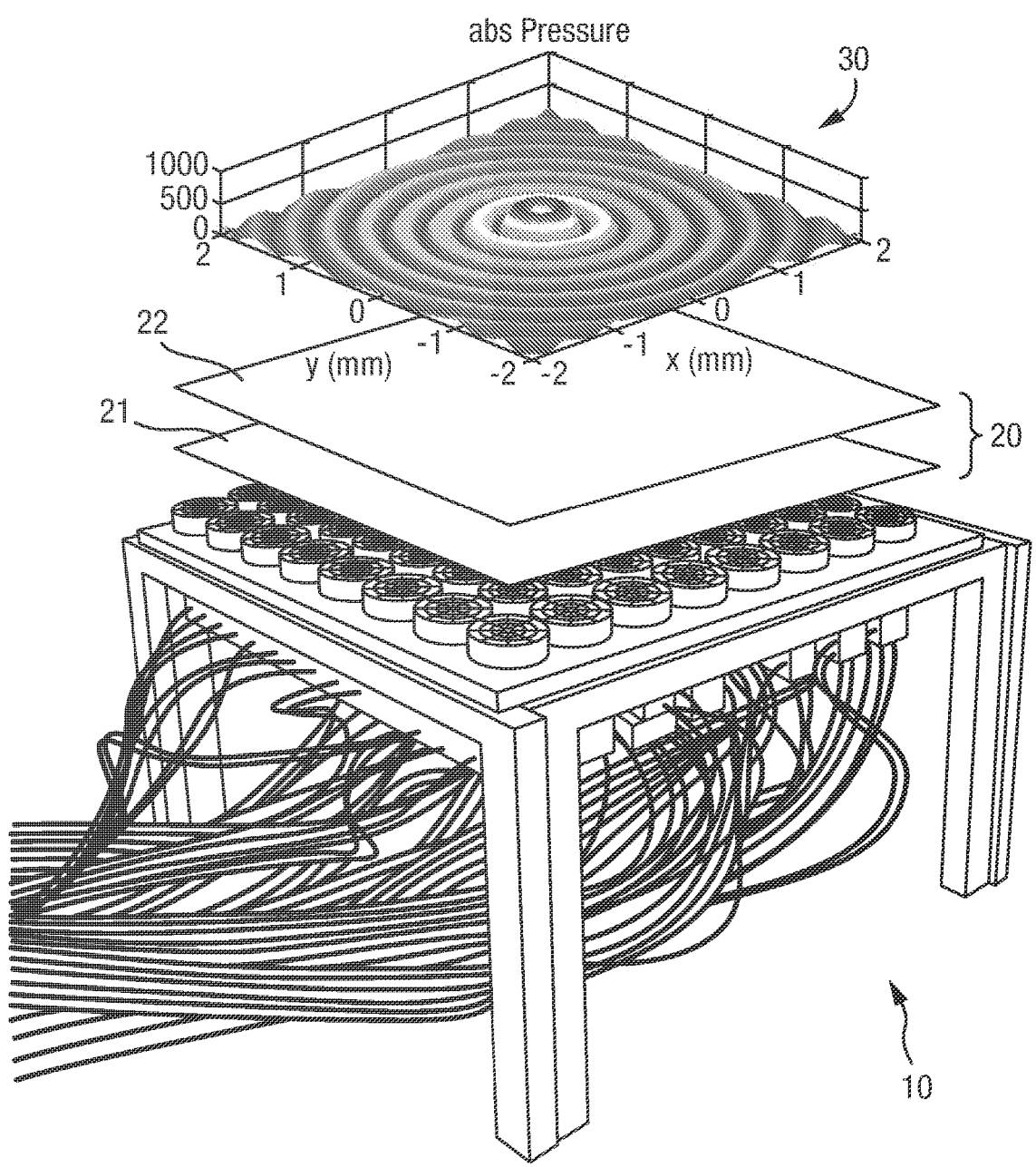
FIG. 1 shows schematically an assembly for modulating sound according to various embodiments of the present invention.

FIG. 1 shows schematically an assembly for modulating sound according to various embodiments of the present invention. The assembly comprises an acoustic source 10 which as shown in FIG. 1 may generally comprise a transducer or array of transducers driven in phase and a sound modulation device 20 for manipulating the acoustic wave generated by the acoustic source 10. The sound modulation device 20 may be positioned over the acoustic source 10 at a certain fixed distance from the plane of the acoustic source 10 so that the acoustic waves generated by the acoustic source 10 are passed towards and through the sound modulation device 20. However, it will be appreciated that the sound modulation device 20 need not be positioned directly over the acoustic source 10 in the manner shown in FIG. 1, and in embodiments desirably may not be, so long as the acoustic waves generated by the acoustic source 10 are directed towards and through the sound modulation device 20. For instance, a guiding member or waveguide may be provided for guiding the acoustic waves onto the sound modulation device 20. In this way the potentially relatively bulky acoustic source 10, and its associated power supply, may be kept physically separate from the spatial sound modulation device 20. This may be desirable for aesthetic reasons, or in view of size and/or space constraints in the region where the output of the spatial sound modulation device 20 is to be provided. Also, in this way a single acoustic source 10 could potentially be used with multiple sound modulation devices at different positions.

It will be appreciated that the acoustic source 10 itself does not itself need to perform any spatial modulation as this functionality may be completely devolved to the separate sound modulation device 20. That is, the spatial sound modulation device 20 can act independently to the acoustic source 10, and can act on the incident acoustic waves in whatever form they are provided. Thus, the acoustic source 10 may typically be arranged to generate substantially uniform acoustic waves normal to the surface of the spatial sound modulation device 20 so that the spatial modulation can be controlled completely by the sound modulation device 20. In other embodiments, the acoustic source may already provide a directional or focussed acoustic wave. In this case, the spatial sound modulation device may perform an additional manipulation on the field. In whatever form they are provided, the sound modulation device 20 acts to shape or otherwise spatially transform or manipulate the incident acoustic waves in order to generate a desired acoustic output field 30. By way of example, FIG. 1 shows the generation of a 'bottle' type acoustic field 30 suitable for acoustic levitation. However, as explained further below, the spatial sound modulation device 20 may be re-configured to generate different acoustic fields 30 as desired.

The sound modulation device 20 is generally composed of a plurality of unit cells each capable of encoding a particular time or phase delay. The positions of the unit cells (and their associated time or phase delays) thus define the spatial delay distribution for the sound modulation device 20, which is effectively quantised according to the positions and dimensions of the unit cells. By controlling the positions and/or delays of the unit cells within the sound modulation device 20, the sound modulation device 20 may be selectively configured to perform various manipulations or transformations of an incident acoustic wave. For example, the sound modulation device 20 may be configured to steer and/or to focus the acoustic waves. Thus, by changing the positions of and/or the time delays introduced by the unit cells within the sound modulation device 20, the spatial delay distribution of the sound modulation device 20 may be re-configured in order to perform a different function.

In embodiments, the sound modulation device 20 may be substantially flat and two-dimensional as shown in FIG. 1. That is, the spatial sound modulation device 20 may have substantially flat, parallel upper and lower surfaces. However, it is also contemplated that the sound modulation device 20, or at least an upper or lower surface thereof, may be curved or profiled. For instance, the upper or lower surface of the sound modulation device 20 may be substantially convex or concave. In this way, the shape of the surface may also in part contribute to the transformation applied to the incident acoustic waves.

In embodiments, the sound modulation device 20 comprises one or more layers, with each layer comprising a two-dimensional array of unit cells. Each layer may thus be configured to perform a particular spatial manipulation. Thus, as shown in FIG. 1, the sound modulation device 20 may comprise a stack of acoustic metamaterial layers. Although FIG. 1 shows a stack of substantially flat layers, it will be appreciated that curved or profiled layers may similarly be stacked. Similarly, multiple sound modulation devices 20 may be stacked together such that the output of one device is provided as input to the next and so on.

The inter-layer separation within the stack may be selected arbitrarily or e.g. based on the operating wavelength(s) or desired physical size of the device. A suitable inter-layer separation may be of the order of the wavelength(s) for which the device is used. For instance, where the device is operated at a wavelength $\lambda_0$, the inter-layer separation may suitably be within the range from about $\lambda_0/4$ to $2\lambda_0$. For example, suitable inter-layer separations may be $\lambda_0/4$, $3\lambda_0/4$ or $5\lambda_0/4$. Generally, the layers should be stacked sufficiently closely together such that the time delays introduced by the respective unit cells in each layer are added together as an acoustic wave passes through the layers of the stack.

Because the time delays introduced by each of the layers in a stack may combine additively, it will be appreciated that stacking multiple layers together, as shown in FIG. 1, allows further possibilities for controlling the spatial delay distribution of the sound modulation device 20 without necessarily increasing the area of the device, or the number or number of different types of unit cells within each layer. Stacking multiple layers in this way may thus allow more complex transformations or combinations of transformations to be realised, or to be realised with fewer unit cells or simpler control. For example, a stack of two or more layers may suitably be used to perform focussed steering, or to form a bottle shaped beam for acoustic levitation. For instance, the sound modulation device 20 may comprise a first layer 21 that is configured to perform a focussing of the incident acoustic waves and a second layer 22 that is configured to steer or otherwise shape the incident acoustic waves into the desired acoustic wave 30.

Naturally, the sound modulation device 20 may comprise any number of layers, and any type of layer configured to perform any suitable function. Indeed, an advantage of the concepts described herein is that the layers may each be re-configured as desired in order to perform different operations on the incident acoustic waves (i.e. to generate different desired acoustic output fields).

As discussed above, it will be appreciated that the manipulation of the acoustic wave may advantageously be performed solely by the sound modulation device 20. That is, the spatial manipulation or modulation may be independent of and disconnected from the acoustic source 10. The acoustic source 10 may thus be used solely for generating the incident acoustic waves, and may typically therefore generate a substantially uniform acoustic wave perpendicular to the surface of the sound modulation device 20. This means that the modulation does not need to draw any power from the power supply of the acoustic source 10. In this way the power requirements for the acoustic source and the modulation may be kept relatively simple (or low), e.g. compared to conventional phased transducer array approaches, and independent from each other.

This is in direct contrast to known approaches utilising phased transducer arrays, where the same elements i.e. transducers are used for generating the acoustic wave and for shaping it. These known approaches typically require relatively complex and expensive electronics for re-configuring the acoustic output field. Furthermore, any switching or re-configuring of the phased transducer array results in a loss of power. Since the spatial sound modulation techniques described in the present application allow the sound power to be disconnected from the modulator, the device may have much lower power requirements that conventional phased transducer arrays. By decoupling the manipulation from the acoustic source, the devices according to the present invention may also allow for a faster switching or re-configuration than conventional phase transducer arrays.

There are two main embodiments for allowing the re-configuration of the spatial sound modulation device 20.

In the first main embodiment, the unit cells are each pre-configured to encode a particular, fixed time delay. The unit cells effectively therefore become, in isolation, the building blocks of the acoustic metamaterial layers or meta-surfaces, whereby the individual unit cells can be assembled on-demand into arrays or layers having a desired delay distribution. For instance, the pre-configured unit cells may be interconnected together, or inserted into a frame, to form a two-dimensional array or metamaterial layer. The unit cells may then be released, or removed from the frame, and then re-configured into a different arrangement to perform a different transformation.

Because each of the unit cells forming the layer or meta-surface is pre-configured to encode a single, specific time delay, the array or layer of unit cells quantised in both the spatial and time delay domains. Various spatial delay distributions suitable for generating a great number of acoustic output fields may be encoded by selecting the appropriate unit cell (i.e. time delay) for each position within the array or layer. The accuracy at which the sound modulation device 20 can generate a desired arbitrarily complex acoustic wave may in general be increased by increasing the number of unit cells within the array and/or decreasing the size of the unit cells within the array (i.e. so that the spatial delay distribution is quantised with a higher resolution), or by increasing the number of different types of unit cells available (i.e. the number of available time delays and hence the resolution of the time delays) so that the time delay at each position may be chosen to better match that for the desired field.

The unit cells may take various suitable forms so long as they act to introduce a well-defined time delay to an incident acoustic wave. Generally, the unit cells may be designed to introduce a local phase shift at least within the range 0 to $2\pi$ for a selected operating frequency. In order to form a desired acoustic wave with the required accuracy, and in order to avoid spatial aliasing effects, the unit cells desirably hold sub-wavelength resolution. The unit cells should also be able to transmit sound effectively with minimal energy losses, particularly where it is desired to stack the unit cells or layers.

For instance, in embodiments, the unit cells may define a central channel through which acoustic waves pass from one side of the unit cell to the other. The central channel may further comprise various sub-wavelength structures or features that act to slow down the acoustic waves and/or increase the effective path length travelled by the acoustic waves through the channel thereby introducing a phase delay. For example, the channels may include a substantially labyrinthine, or meandered, structure, or a multi-slit, coil, helical, or Helmholtz resonator-type structure. One suitable structure is illustrated by way of example in FIG. 2 which shows in cross section an example of a labyrinth structure with meanders defined by four bars extending into an open channel.

The effective path length, $L_{eff}$, for acoustic waves travelling through the unit cell is given by $L_{eff}=h+\Delta L$, where h is the height on the unit cell, and $\Delta L$ is the additional path length introduced by the structure of the unit cell. This additional path length introduces a phase delay $\varphi = e^{jk.L_{eff}}$, where k is the wavenumber ($k=2\pi/\lambda$) of the acoustic wave.

The shape and/or dimensions of the unit cells may generally be selected to introduce a desired phase delay for acoustic waves of a particular wavelength. That is, the design of unit cells may be substantially optimised or configured for use with a particular operating wavelength, such that a desired phase delay is provided for incident acoustic waves at the operating wavelength, $\lambda_0$. In embodiments, the device may be designed for use substantially only at a single operating wavelength, such that there is little or no response or transmission at other wavelengths. In other embodiments it is contemplated that the device may be designed for use with a range of wavelengths, such as a range of wavelengths around a central operating wavelength. It is also contemplated that the device may be configured to operate at a number of different operating wavelengths.

Figure 2:
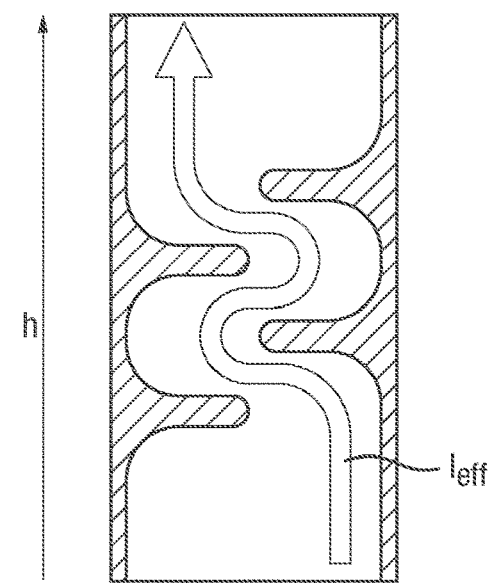
FIG. 2 shows schematically a unit cell construction for introducing a phase delay to an incident acoustic wave.
Figure 3:
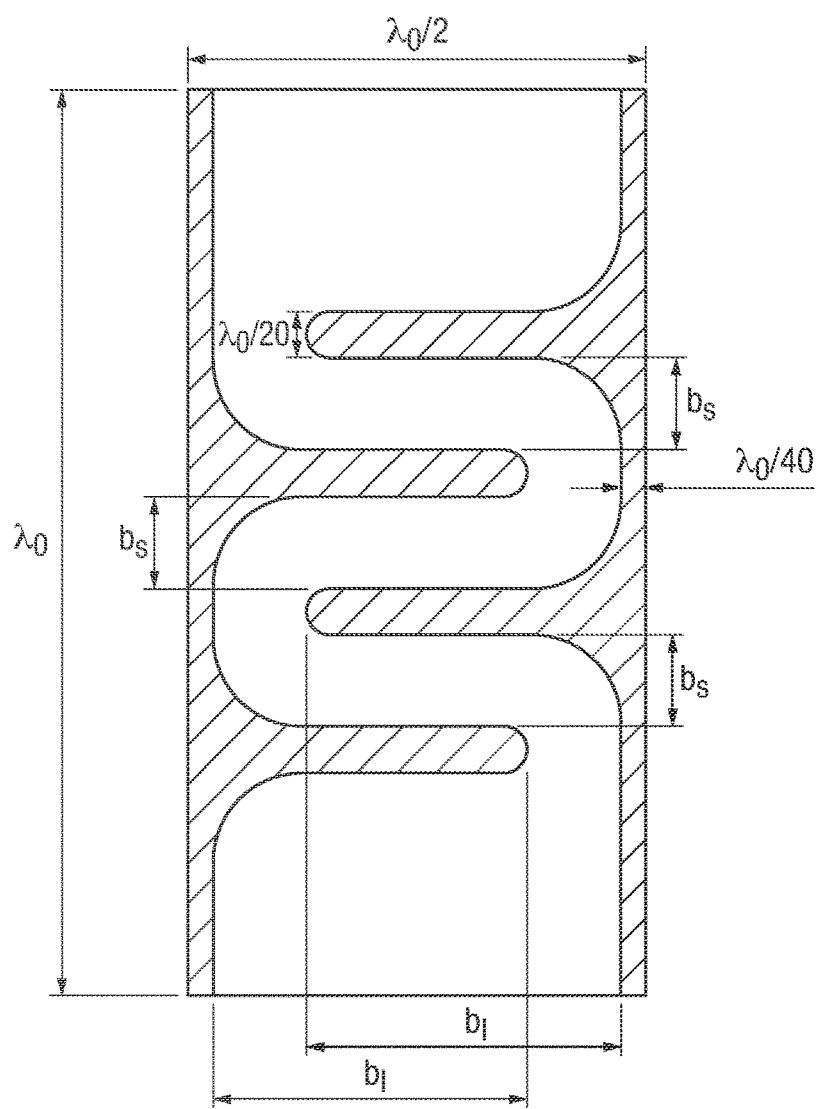
FIG. 3 illustrates how the unit cell construction shown in FIG. 2 may be designed to introduce different phase delays to an incident acoustic wave.

FIG. 3 illustrates how the exemplary unit cell construction shown in FIG. 2 may be designed to encode a range of different phase delays. The unit cells shown in FIG. 3 are generally in the form of a rectangular cuboid with a square base shape of side $\lambda_0/2$ and height of $\lambda_0$. Thus, the unit cells allow the acoustic metamaterial layers to be quantised with a resolution of $\lambda_0/2$. This may be a good compromise between ease-of-manufacture and the need to realise diffraction-limited fields without spatial aliasing. Indeed, it has been found that it may be advantageous to keep the size of the unit cells (in the plane of the metamaterial layers) smaller than the wavelength corresponding to the Nyquist frequency. Thus, when designing a device that is optimised or configured for use at an operating wavelength, $\lambda_0$, the unit cells may suitably have a dimension of $\lambda_0/2$, or smaller.

As shown in FIG. 3, and as mentioned above in relation to FIG. 2, the unit cells each comprise an open central channel having a structure that delays the incident wave, hence shifting the relative phase of the output. In particular, the open central channel is provided with a labyrinthine or meandered structure by a plurality of bars extending into the channel. The length of, $b_l$, and spacing between, $b_s$, the meanders may then be varied in order to provide a range of effective path lengths as shown in FIG. 3. In FIG. 3, the thickness of the walls relative to the configured operating wavelength, $\lambda_0$, is $\lambda_0/40$ and the thickness of the meanders is $\lambda_0/20$. However, these values may be selected as desired e.g. to achieve a desired strength or robustness, or based on manufacturing constraints.

FIG. 4A shows a perspective view of an example of a pre-configured unit cell of the type shown in FIG. 3 that is pre-configured to encode a phase delay of $5\pi/8$ for an operating wavelength $\lambda_0$. FIG. 4B shows in cross-section 16 different unit cells that are pre-configured to introduce phase delays spanning the range 0 to $2\pi$ in discrete steps of $\pi/8$. It can be seen from FIG. 4B how varying the lengths and spacing of the bars allows the phase delay to be adjusted.

The 16 different unit cells shown in FIG. 4B represent a set of 16 unique quanta. The illustrated set of unit cells are uniformly spaced in phase and FIG. 4B thus represents a uniform 4-bit control (i.e. 16=2⁴). It has been found that any focussed field can be reproduced with an error of less than 0.1 dB using such uniform 4-bit control. Using fewer quanta, or lower bit control, generally increases the error. For instance, the error may increase to about 1 dB for a uniform 3-bit control (8 quanta), or about 3 dB with uniform 2-bit control (4 quanta). The error may be determined by comparing the analogue field that is desired to be reproduced with the field generated by the spatial sound modulation device.

Although the example set of unit cells shown in FIG. 4B are uniformly spaced in the phase domain (in discrete intervals of $\pi/8$) it will be appreciated that a set of unit cells need not be uniformly spaced, and in embodiments, the set of unit cells may advantageously be non-uniformly spaced in the phase domain. For instance, by selecting an appropriate non-uniform set of quanta (i.e. phase delay values), practically any focussed field may be reproduced with similar error to the uniform 4-bit control mentioned above but using fewer quanta. For instance, it has been found that a non-uniform 3-bit control may provide similar results to a uniform 4-bit control. The optimum number and type of unit cells for reproducing a given field with a desired accuracy may be identified using digitisation techniques such as the wavelet transformation technique described below with reference to FIG. 12.

Furthermore, by stacking arrays or layers of unit cells together appropriately such that the phase delays combine additively, it may be possible to realise each layer with a lower bit rate, so that a smaller total number of unique unit cells is required. This advantage is particularly evident when the phase quantisation is non-uniform. Thus, whilst any diffraction limited acoustic wave can in principle be created using a single acoustic metamaterial layer, stacking multiple acoustic metamaterial layers facilitates the generation of arbitrary acoustic waves at high accuracy and/or using fewer types of unit cell.

As best shown in FIG. 3, the base portions of the bars defining the meanders may have 'shoulders' such that they gradually taper into the channel to the desired end thickness (e.g. $\lambda_0/20$). These 'shoulders' may help to increase robustness and stability during manufacture and/or may help contribute to impedance matching. In particular, the geometry of the unit cells may be selected so that the effective acoustic impedance of each unit cell is matched to that of the ambient medium within which the device is operating (e.g. air or water), thereby increasing the efficiency of transmission (and suppressing reflection).

The unit cells illustrated in FIGS. 4A and 4B were designed for operating at an operating wavelength of $\lambda_0=8.66$ mm (wavelength in air at 25° C.), i.e. an operating frequency of 40 kHz within the ultrasonic range. That is, the unit cell structures shown in FIG. 4B introduce the specified phase delays spanning 0 to $2\pi$ to incident acoustic waves provided at the operating frequency of 40 kHz. Operating within the ultrasonic range at 40 kHz may be particularly suitable for various applications using ultrasound, or ultrasonic carrier waves, including sound from ultrasound applications. Most current studies of acoustic metamaterials only explore the audible range around 20 kHz or below. However, it will be appreciated that the techniques described herein may be applied across a wide range of frequencies and the unit cells may in principle be designed for use with various suitable operating wavelengths. It will also be appreciated that the set of unit cells shown in FIG. 4B, even though designed for use with an operating frequency of 40 kHz, may still be used at other frequencies, but will then work in a different way, as explained below with reference to FIG. 6.

FIG. 5 shows a suitable frame within which the pre-configured unit cells may be inserted in order to form an acoustic metamaterial layer. By re-arranging the unit cells within the frame, the spatial phase distribution across the acoustic metamaterial layer may be re-configured as desired. The frame may for instance comprise a laser-cut grid structure. In the illustrated example, which is again configured for use with an operating wavelength of $\lambda_0=8.66$ mm, although may be suitably used or adapted for use with other operating wavelengths, the walls of the grid are about 1 mm thick. Each of the squares within the grid may receive up to four individual unit cells in a 2×2 assembly. However, it will be appreciated that the frame may take various suitable forms. For example, in embodiments, each of the positions within the frame may be arranged to receive a single unit cell.

FIG. 6 shows the reflection and transmission properties for two of the unit cells shown in FIG. 4B. Particularly, FIG. 6 shows the amplitude and phase frequency responses for unit cells that are pre-configured to introduce phase delays of $\pi$ (upper panel) and $15\pi/8$ (lower panel).

As shown, each of the unit cells has a transmission co-efficient of (or very close to) unity at the target operating wavelength of 40 kHz, and essentially zero reflectance, as expected. It will be appreciated that the unit cells do not therefore introduce unwanted energy losses, such that virtually all of the power from the acoustic source may be transmitted through the unit cell. This is particularly important where multiple unit cells or layers of unit cells are stacked together. Because of the very high (practically 100%) transmission of the unit cells, even when multiple layers of unit cells are stacked together, the stacked device may still transmit essentially all of the acoustic power. Furthermore, it has been found by measuring the phase response that the unit cells provide the desired phase delays for transmitted waves at 40 kHz.

Although the example unit cells shown in FIG. 6 are designed for operating at 40 kHz, it can be seen from FIG. 6 that the unit cells described above also transmit power at other frequencies, and particularly at lower frequencies. It will be appreciated that although the unit cell may transmit power across a range of frequencies, the phase response at different frequencies is not necessarily the same. Thus, although the device may be optimised for use at 40 kHz, the device may still be used at other frequencies, albeit potentially with some loss in transmission or with a change to the introduced phase value. However, so long as the actual operating frequency is known, it is possible to determine the phase delay that will be introduced and arrange the unit cells appropriately to generate a desired output at the selected frequency.

Furthermore, it can be seen from FIG. 6 that there are a number of peaks wherein the unit cells also have near total transmission. Indeed, since the additional phase delay depends on the product of the effective length, $L_{eff}$, and the wavenumber of the incident wave, k, and the phase is restricted to the interval [0,2$\pi$], there are a set of frequencies for which the unit cells have exactly the same transmission performance. In particular, the unit cells will have the same transmission performance at all frequencies, $f_j = f_0 - jc_0/L_{eff}$, wherein j=0, 1, 2 . . . is an integer, $f_0$ is the operating frequency and $c_0$ is the speed of sound.

This multi-frequency response of the unit cells may be exploited for certain applications, or in new types of acoustic devices, where it is desired to generate more complex acoustic waves containing multiple frequency components. For example, the multi-frequency transmission may be exploited to allow multiple carrier waves at different ultrasonic frequencies to be directed towards different places. This multi-frequency response may be facilitated by the symmetric structure of the unit cells. In other embodiments, asymmetric features or other structures may be provided within the unit cells in order to reduce the multi-frequency response. For example, the unit cells may be structured to act as a filter so that substantially only power at the operating wavelength is transmitted, where that is desired.

Figure 20:
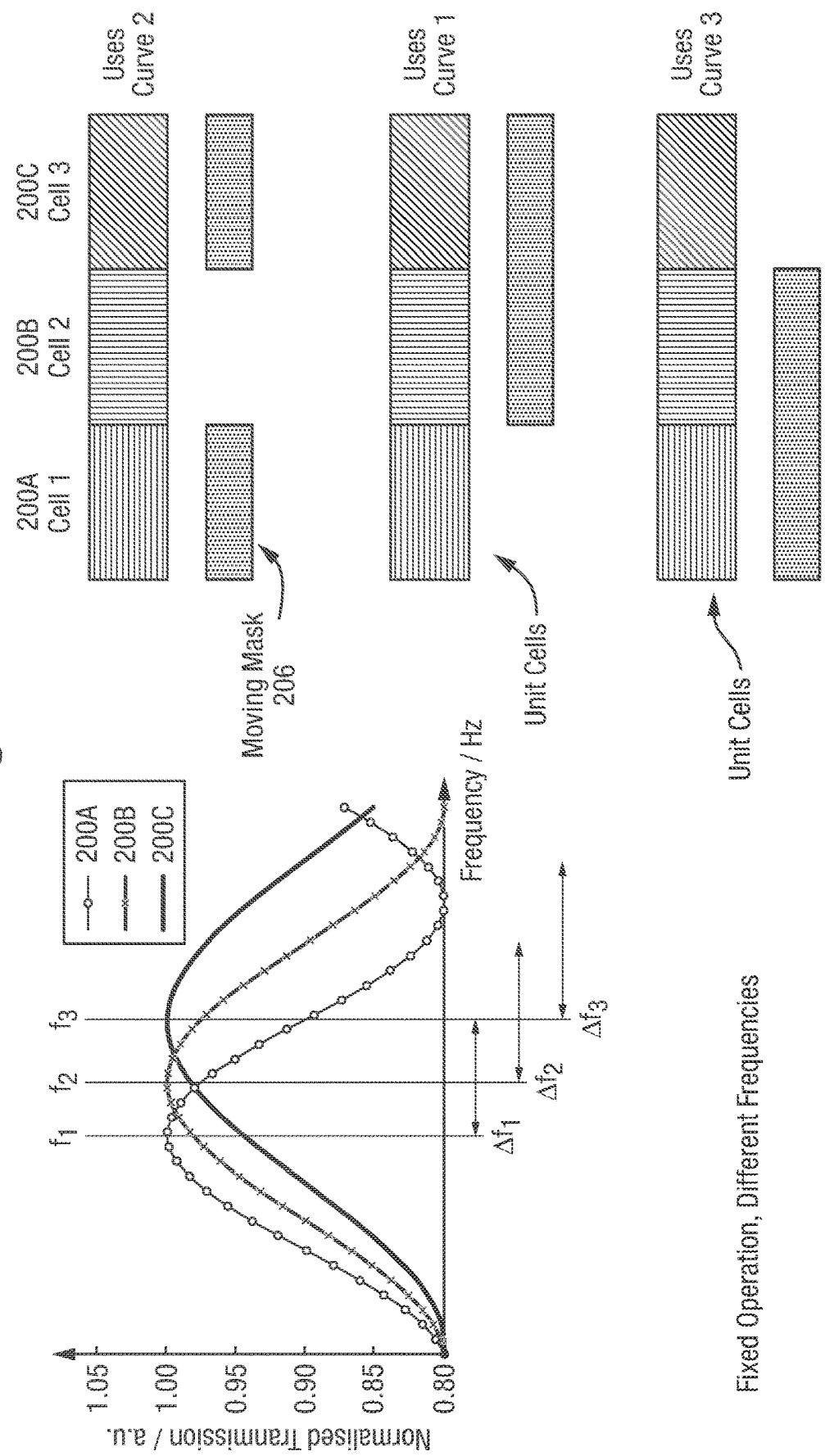
FIG. 20 shows schematically an example of a method for increasing the frequency band where a single acoustic surface can operate by providing a device that can be switched between different operating frequencies by selectively moving a masking element.

It is also contemplated that different unit cells within a particular sound modulation device or acoustic metamaterial layer may be configured to operate at different frequencies so as to provide a broadband sound modulation device. Where the sound modulation device is capable of operating over a range of frequencies, the incident acoustic wave may still be mono-frequency, but the frequency of the acoustic source may be varied in use without having to change the unit cells. It is also contemplated that the sound modulation device may be capable of simultaneously handling a range of different frequencies. One example of a device that is capable of handling multiple frequencies is shown in FIG. 20, described below.

It is emphasised again that FIGS. 2 to 6 merely illustrate one example of a suitable unit cell for introducing a time delay, and that the unit cells may generally take various forms including, but not limited to, other types of labyrinthine or meandered structures, multi-slit, helical or coiled structures, or Helmholtz resonator-type structures.

In a second main embodiment, the unit cells themselves are each re-configurable between a plurality of different time delay values. Thus, in embodiments, the unit cells may be fixed in position within the array or layer, but are re-configured in situ to encode a plurality of different phase delays. This is by contrast to the first main embodiment where the unit cells are fixed in phase, but may be re-positioned within the array. Thus, in the second main embodiment, the sound modulation device 20 may comprise one or more metamaterial layers 21,22 each comprising a two-dimensional array of re-configurable unit cells.

Naturally, it is also possible that in a given sound modulation device or metamaterial layer some of the unit cells may be both removable and re-configurable, or that some of the unit cells may be fixed in both position and phase. Furthermore, in embodiments, it is contemplated that a single sound modulation device or metamaterial layer may contain a mixture of unit cells according to the first and/or second main embodiments described above, and various combinations of unit cells are possible.

The general form of the re-configurable unit cells according to the second main embodiment may be similar to those described above. That is, the unit cells may have a generally labyrinthine or meandered structure, e.g. as shown in FIGS. 2 and 3, or indeed any other suitable structure for introducing an additional effective path length. However, rather than the unit cells having a fixed geometry, the re-configurable unit cells may be provided with one or more moveable or deformable elements. The moveable or deformable elements may be controllably moved or deformed in order to vary the shape of the channel extending through the unit cells, and hence to vary the effective path length and phase delay introduced by the unit cell.

In general, a re-configurable unit cell may be re-configurable between any number of states. Typically, however, the re-configurable unit cells are re-configurable between a finite set of discrete phase delay values. For example, the unit cell may contain a plurality of flaps, with each flap being independently controllable, such that the unit cell may be (re-)configured between a range of discrete states or phase values (i.e. for n flaps, there are $2^n$ possible states). That is, each of the flaps effectively provides a control bit. Where the unit cells within a metamaterial layer are re-configurable between a plurality of discrete states, the phase distribution across the sound modulation device or metamaterial layer is again quantised both in the spatial and phase domains. In this case, the quanta in the phase domain are defined by the available states of the plurality re-configurable unit cells.

In some embodiments the unit cells (or at least some of the unit cells) may be re-configured between only two states. That is, the unit cells may be re-configured between first and second states. For example, the unit cell may have only a single moveable or deformable element, or a plurality of moveable or deformable elements that are moved together.

Figure 7A:
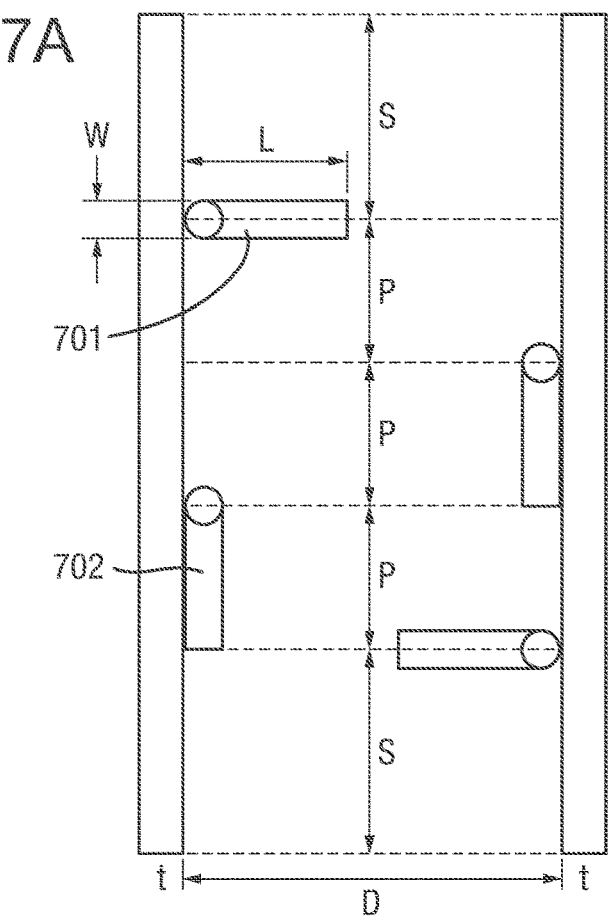
FIG. 7A shows schematically a re-configurable unit cell constructed according to some embodiments of the present invention.
Figure 7B:
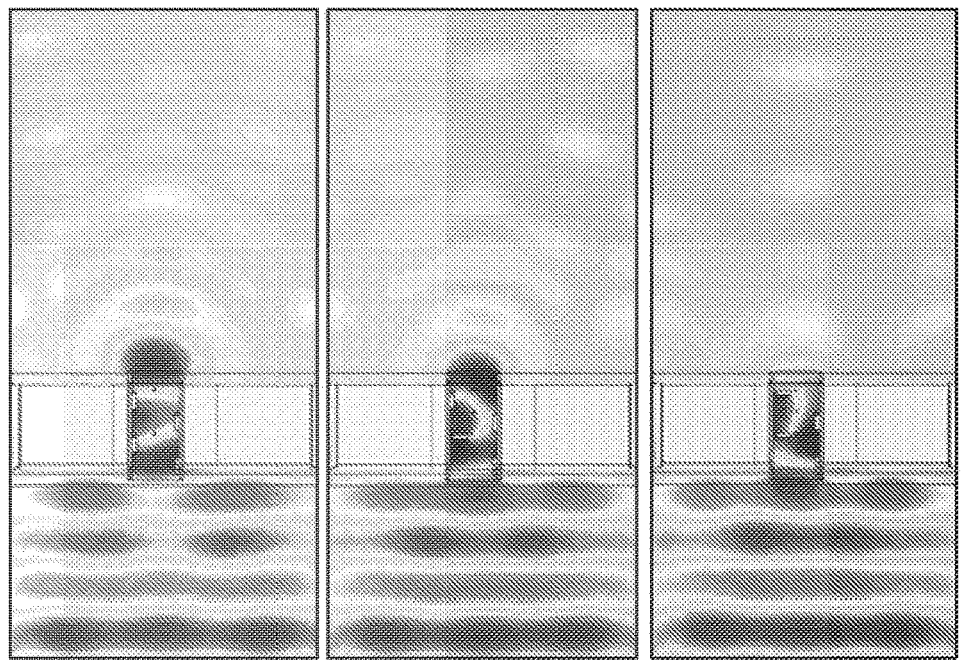
FIG. 7B shows schematically how the phase delay introduced by the re-configurable unit cell may be varied by re-configuring the unit cell between different positions.

FIG. 7A illustrates one example of a re-configurable unit cell according to the second main embodiment. As shown, the re-configurable unit cell comprises one or more flaps 701,702 that are moveable between ON and OFF positions such that when the flaps are ON, the flaps extend into the channel to create a meander or substantially labyrinthine structure that increases the effective path length for acoustic waves passing through the unit cell, and when the flaps are OFF, the acoustic waves experience a shorter effective path length or may pass straight through the unit cell. Thus, the unit cell may be controllable to change the position of the flap(s) 701,702, and hence change the effective path length (and the associated phase delay) for acoustic waves passing through the unit cell between a plurality of discrete states. FIG. 7B illustrates how the phase delay introduced to an acoustic wave normally incident on the unit cell of FIG. 7A may be varied by changing the positions of the flap(s) 701,702. Particularly, FIG. 7B shows the introduced phase delays when the flaps 701,702 are both OFF (left side panel), when one flap 701 is OFF whilst the other flap 702 is ON (center panel), and when both flaps 701,702 are ON (right side panel).

Advantageously, an electronic controller or control circuitry may be provided for controlling the re-configurable unit cells. The electronic controller or control circuitry may comprise or be connected to a processor and/or a storage device. The processor may generate the required control signals to re-configure the unit cells in order to provide a desired spatial phase distribution. Similarly, the storage device may store a number of profiles corresponding to various pre-determined spatial phase distributions which are then passed to the processor or electronic controller to generate the required control signals. The electronic controller or control circuitry may take into account the frequency of operation in order to determine which unit cells should be arranged where in the array in order to generate the desired spatial phase distribution. For instance, given a desired operating frequency, the control software may determine the required time delays and unit cells for generating the desired spatial phase distribution. In other embodiments, the control software may determine or control the operating frequency in order to generate the desired spatial phase distribution.

Figure 8:
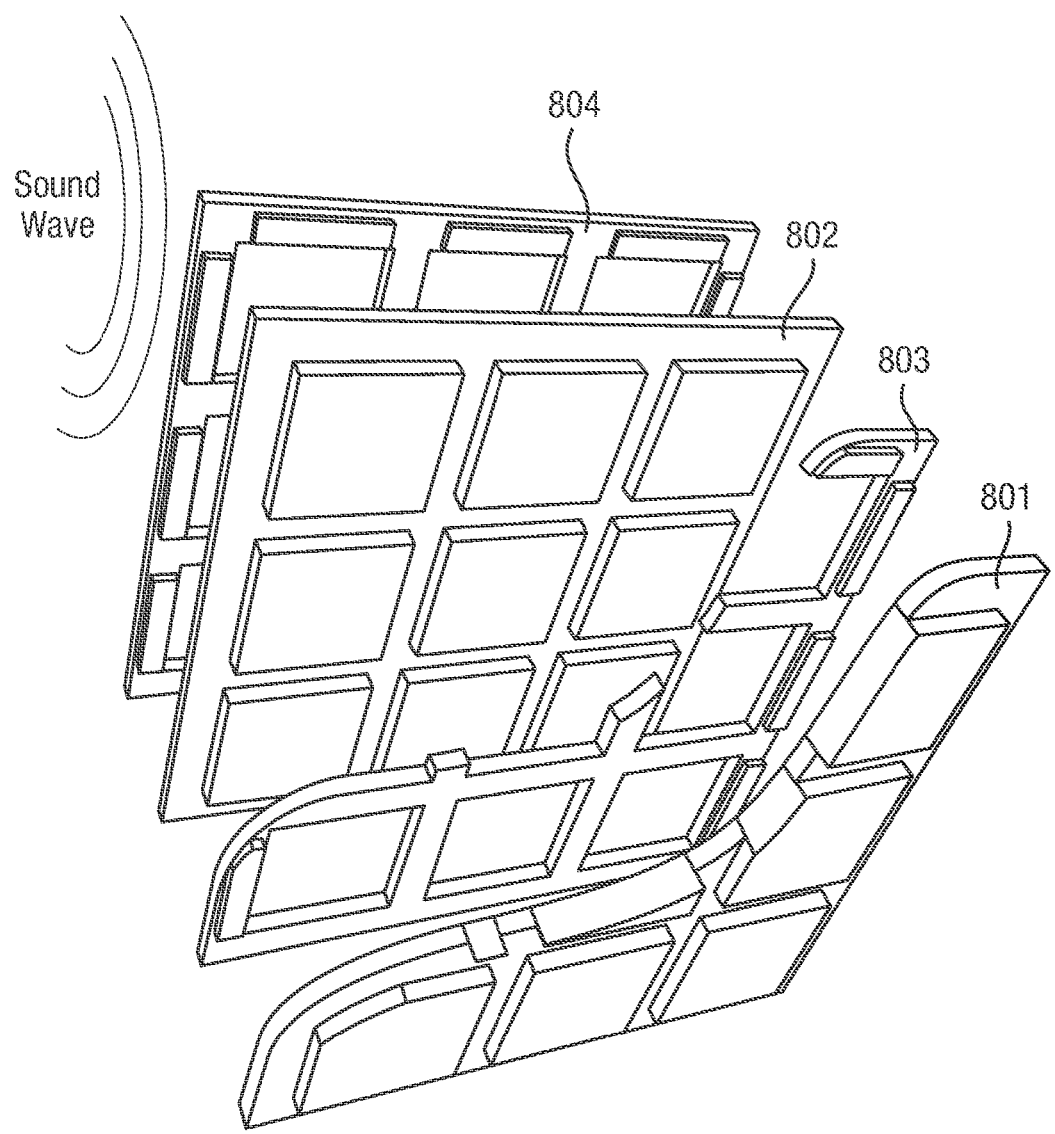
FIG. 8 shows schematically how a multi-layer device may be constructed.

It will be appreciated that the arrayed or layered structure of the sound modulation devices described herein lends itself to incorporation within existing stacked geometries known e.g. for LED or transistor devices, such that similar manufacturing techniques and control systems may be used. For instance, FIG. 8 shows a stacked device comprising two acoustic metamaterial layers 801,802 alternately arranged between a pair of thin film transistors defining electrodes 803,804 for providing control signals for controlling the unit cells within the acoustic metamaterial layers.

An electronically re-configurable unit cell e.g. of the type shown in FIG. 7A may be manufactured by coating the interior of the unit cells, or particularly the moveable or deformable elements thereof, with a dielectric material or a charged powder. Alternatively, the moveable or deformable elements may be formed from a dielectric or piezo-electric material. The unit cells may then be connected to electrodes for providing control signals for switching the unit cell between states. Another example of a possible technique for manufacturing a re-configurable unit cell employing a layered construction will be described below with reference to FIG. 14 and FIGS. 15A & 15B.

The unit cells within a metamaterial layer may in embodiments each be re-configured independently. In other embodiments the electronic controller or control circuitry may be arranged to control groups or sub-groups of unit cells together. This may help to simplify the electronic control requirements and particularly the arrangement of the electrodes and/or the complexity of the control signals. Alternatively still, actuation may come from a pneumatic or a microfluidic system.

It will be appreciated that by using a computer or other processor to control a set of re-configurable unit cells allows the acoustic wave to be re-configured essentially in real-time. Furthermore, because the spatial sound modulation device 20 may be independent of the acoustic source 10, the spatial sound modulation device 20 may be re-configured to generate a different acoustic wave without any loss of power. This provides a significant advantage over current phased transducer array technologies.

Although the discussion above has referred to unit cells each capable of encoding a particular phase delay or phase delays, in some embodiments, a plurality of unit cells may be fixed together to form a single block (or "sub-array") of unit cells. For example, a block may comprise a 2×2, or 3×3, array of unit cells, or generally an m×n array of unit cells. Furthermore, a block may comprise a stack of unit cells or arrays of unit cells. For instance, a block may comprise two or three arrays stacked together to form a three-dimensional block (e.g. a cubic array of 3×3×3 unit cells).

The block(s) may be configured to perform a certain specific function or transformation. That is, the unit cells within the block may be selected in order to provide a particular phase distribution. Thus, instead of re-configuring or removing unit cells individually, a block of cells may be re-configured or removed together. While it may be desired for the spatial resolutions of the unit cells within a block to remain at $\lambda_0/2$ or lower to reduce higher order diffraction effects, the use of blocks comprising a plurality of unit cells may facilitate the mechanical assembly and/or electronic control of the devices, helping to make the sound modulation device more cost-effective.

Common to both of the main embodiments described above is the concept of re-configuring the sound modulation device or the acoustic metamaterial layers in order to alter the spatial phase distribution. By appropriate selection of the phase delays at each position within the arrays or layers, it is possible to perform a variety of acoustic manipulations and to generate essentially arbitrarily complex (diffraction limited) acoustic waves.

For example, the spatial sound modulation device, or a layer thereof, may be arranged to perform a focussing transformation. That is, the device may be configured to focus an incident acoustic wave towards a focal point. The basic focussing transformation may be described by the analogue phase distribution $$\varphi(x, y) = \varphi_0 - \frac{2\pi}{\lambda_0}\left(\sqrt{r^2 + F_0^2} - F_0\right), \text{ where } r^2 = x^2 + y^2.$$

Figure 9:
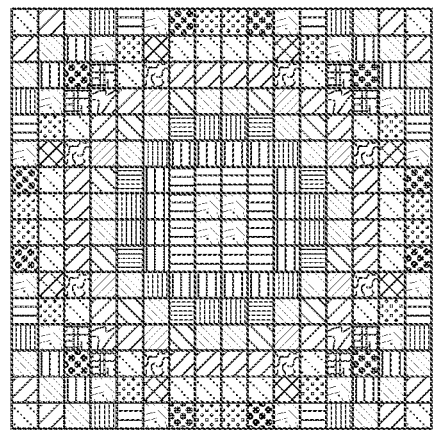
FIG. 9 shows schematically how a focussing transformation may be achieved according to the techniques described herein.

FIG. 9 illustrates an example of an acoustic metamaterial layer configured to provide a focussing transformation at 40 kHz. The metamaterial layer shown in FIG. 9 is formed of 16 different phase values, e.g. corresponding to the 16 phase values between 0 and $2\pi$ in steps of $\pi/8$ shown in FIG. 4B. However, it will be appreciated that the layer may equally use alternative arrangements of unit cells, that may be either pre-configured or re-configurable, and may be either uniformly or non-uniformly spaced in the phase domain. In whatever form they take, the unit cells or blocks of unit cells at each position (i,j), within a single metamaterial layer are selected or configured to have a phase value that most closely matches the desired phase as defined by the analogue phase distribution φ(x,y) above. For FIG. 9, that means the unit cells at each position are selected to have a phase value selected from the 16 available phase values that most closely matches the desired phase. The acoustic metamaterial layer thus contains a quantised representation $\varphi_{i,j}$ of the analogue phase distribution φ(x,y). To account for the presence of the frame, etc. the phases assigned to the unit cells may be taken as the phase according to the analogue phase distribution φ(x,y) corresponding to an imaginary point at the centre of each unit cell.

FIG. 9 also shows pressure plots illustrating the acoustic wave in the vertical plane moving away from the surface of the metamaterial layer and in the horizontal plane at a position 100 mm from the surface. It can be seen that the spatial sound modulation device performs as expected by focussing the acoustic wave.

It has been found that the size of the focal region perpendicular to the axis depends on the lateral dimensions of the acoustic metamaterial layer. In particular, the larger the lateral dimensions of the acoustic metamaterial layer, the tighter the focus.

As another example, the sound modulation device, or another layer thereof, may be arranged to perform a steering transformation. That is, the sound modulation device, or layer, may be arranged to steer or re-direct the incident acoustic waves to a different position away from the central axis of the device.

In embodiments, various transformations may be combined. For example, the focussing and steering transformations described above may be combined in order to perform a "steered focussing". As another example, a focussing transformation may be combined with a half-wave transformation in order to create a trap for acoustically levitating objects.

Figure 10:
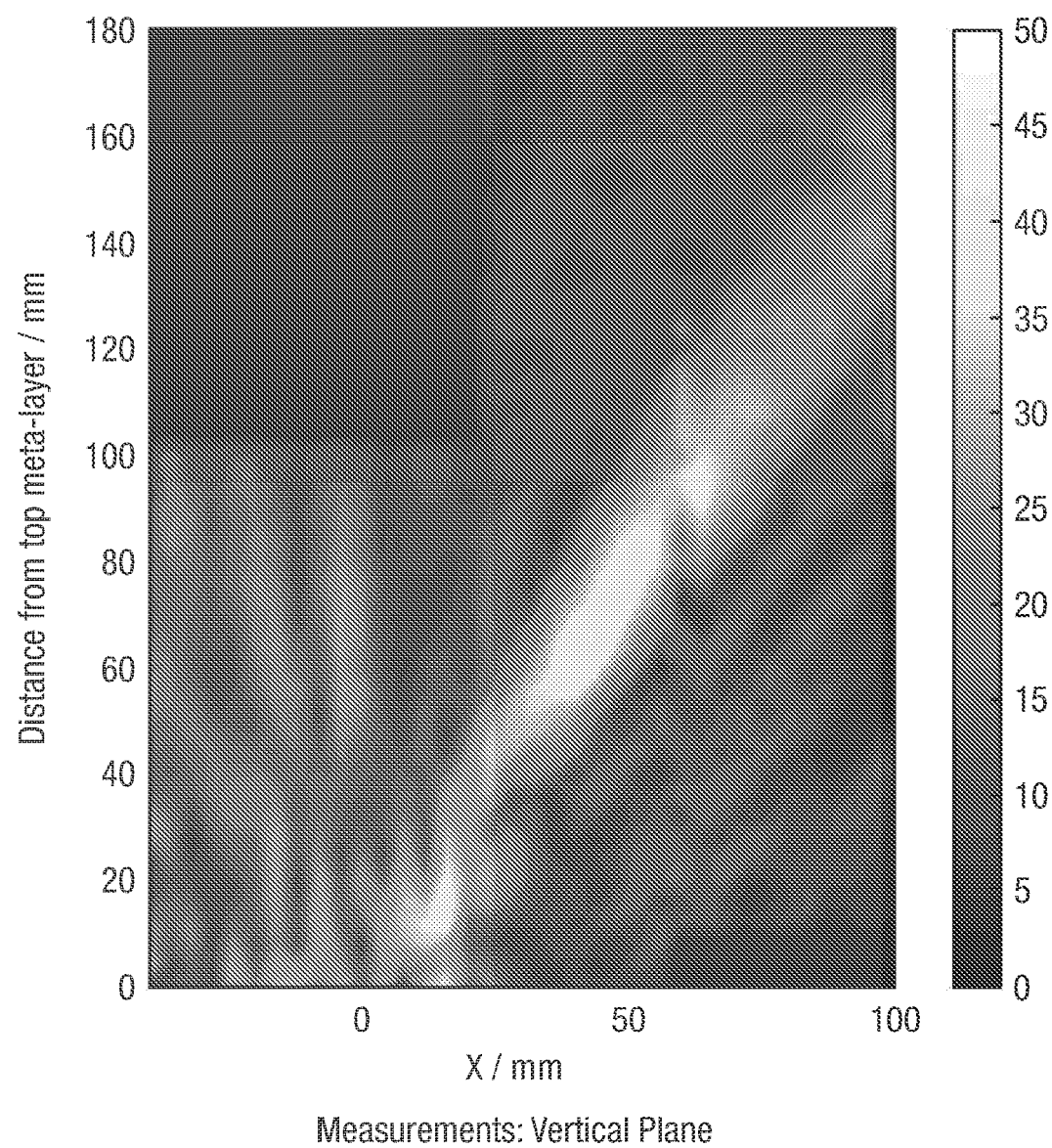
FIG. 10 shows schematically how a steering transformation may be achieved according to the techniques described herein.

Stacking two metamaterial layers together may allow steered focussing over larger angles away from the axis than may typically be possible with a single metamaterial layer, for instance, steered focussing outside the lateral boundaries of the sound modulation device. This is illustrated in FIG. 10 which shows how a focussing layer (like that shown in FIG. 9) may be stacked underneath a steering layer. FIG. 10 also shows the simulated and measured acoustic fields in the vertical plane moving away from the surface of the metamaterial layer.

Figure 11:
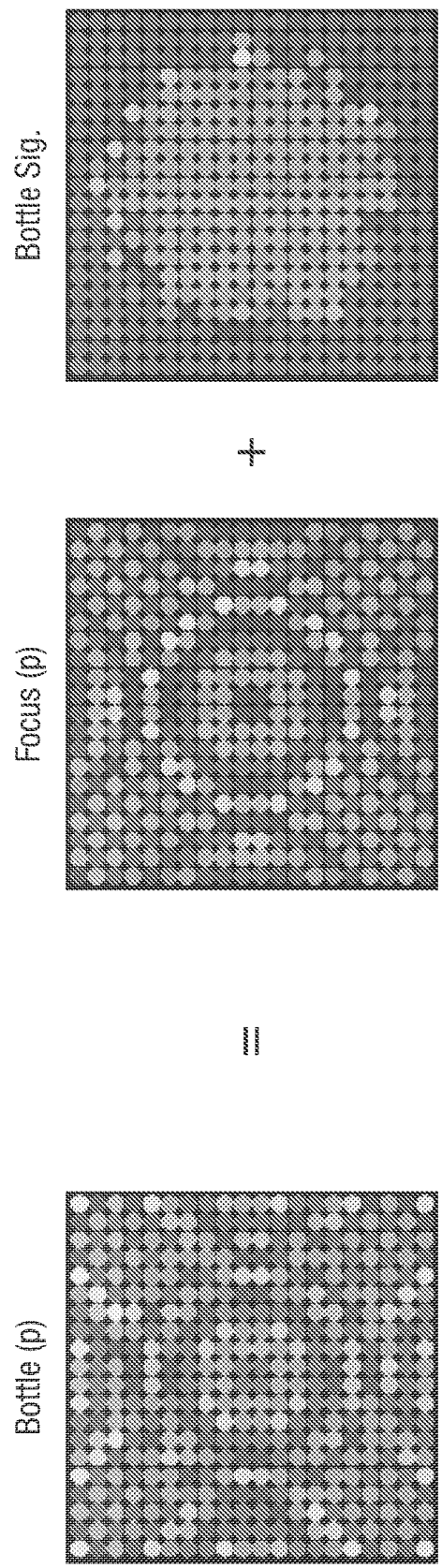
FIG. 11 shows schematically how different transformations may be combined according to the techniques described herein.

Thus, stacking multiple acoustic metamaterial layers together facilitates performing relatively complex manipulations of acoustic waves. Each metamaterial layer in the stack may generally be arranged to perform a certain transformation so that the stacking adds the transformations together. This concept is illustrated in FIG. 11 for the 'bottle beam' acoustic field shown in FIG. 1. This bottle beam may be used as a tractor beam or for acoustic levitation, where the inner diameter of the bottom annulus of the bottle controls the tightness of the acoustic trap. As shown in FIG. 11, the bottle beam field may be generated by stacking a first acoustic metamaterial layer that provides a bottle signature with a focussing acoustic metamaterial layer.

Also presented herein are techniques for, given a desired acoustic field, determining how the phase delays (e.g. unit cells) within the acoustic metamaterial layer(s) or the sound modulation device should be arranged in order to recreate the desired acoustic field.

It will be appreciated that real-life acoustic fields have a continuous spatial phase distribution, whereas the spatial phase distribution of the acoustic metamaterial layers according to the invention is quantised. According to the preferred embodiments described herein, the spatial phase distribution is quantised in both the spatial and phase domains. Thus, what is required is essentially a process of analogue-to-digital conversion (or "digitisation") with two parameters: one in the spatial domain, which depends on the size of the unit cells and of the number of unit cells within the metamaterial layer or array; and one in the phase domain, which governs the number of available unique phases provided by the unit cells.

Generally, a method for optimising the configuration or design of a metamaterial layer or stack of metamaterial layers to generate a given acoustic field may involve sampling and quantising the acoustic field to produce a quantised representation of the spatial phase distribution. The quantised representation may then be used to determine which phase delays should be used at which positions in order to recreate the original acoustic field. This method may be implemented via software. This process is generally illustrated in FIG. 12.

Figure 12:
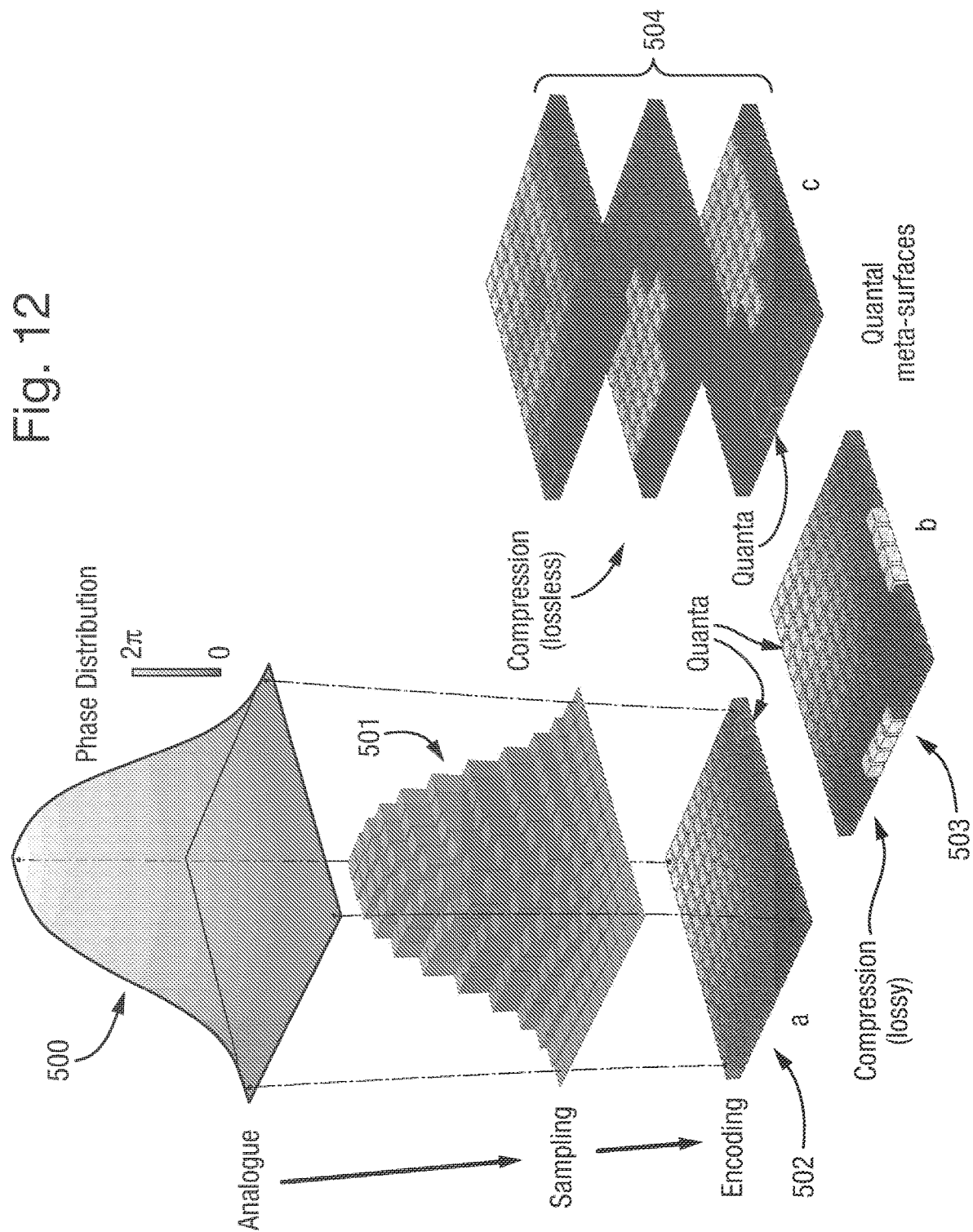
FIG. 12 illustrates an example of a compression scheme for designing a device that is capable of reproducing a desired analogue acoustic field.

In particular, FIG. 12 shows the process of digitisation for an analogue acoustic field 500 having a central focus.

The process starts with a first step of sampling the spatial phase distribution of the analogue acoustic field 500. The acoustic field 500 may be sampled at a certain distance from the plane of the sound modulation device, and acoustic holography techniques may then be used to obtain the sampled acoustic field phase distribution 501 in the plane of the sound modulation device.

The sampled acoustic field 501 is then quantised in the spatial and phase domains to generate a quantised spatial phase distribution 502. The phase delay and position values from the quantised spatial phase distribution 502 may then be mapped onto appropriate unit cells. Thus, it is possible to determine which unit cells (i.e. having which phase delays) should be used at which positions in order to reproduce the original acoustic field 500 with the desired accuracy.

In some cases, the quantised spatial phase distribution 502 may have a different resolution in the spatial and/or phase domain than that which is achievable based on the available unit cells. Thus, the process may include a final step in which the quantised spatial phase distribution 502 is compressed in the spatial and/or phase domains in order to map the quantised spatial phase distribution 502 to the available unit cells.

The result of this compression step is a compressed spatial phase distribution which may be directly mapped to the available unit cells. That is, the compressed spatial phase distribution may contain quanta having the same physical dimensions and range of phase delays as the available unit cells.

The digitisation technique illustrated in FIG. 12 is essentially based on the recognition that the phase distribution of the acoustic field may be treated as a two-dimensional 'image', except with the image representing the phase delay at each spatial position rather than e.g. a colour. Furthermore, because the techniques described herein involve a quantisation of the spatial phase distribution according to the size and phase(s) of the unit cells, mapping the phase 'image' onto a metamaterial layer essentially involves steps of digitisation and image compression, and various techniques for encoding and compressing the spatial phase distribution may be used analogously to conventional image compression techniques.

For example, one widely known compression algorithm is the JPEG standard of image encoding which is based on discrete cosine transforms. However, JPEG compression may not be particularly suitable for compressing acoustic spatial phase distributions as it cannot accurately capture abrupt changes in phase.

Preferably, therefore, a generic feature preserving compression technique is used that can accurately capture edges or abrupt changes in phases within the spatial phase distribution. In embodiments, the compression algorithm uses wavelet transformations such as the discrete wavelet transform. Wavelet transformations are specifically aimed at determining the lowest number of coefficients necessary for a specified reconstruction quality of localised features. Thus, wavelet transformations may be particularly suited for optimising or determining the optimum number of unit cells or re-configurable phases needed to recreate a given acoustic field.

Figure 13:
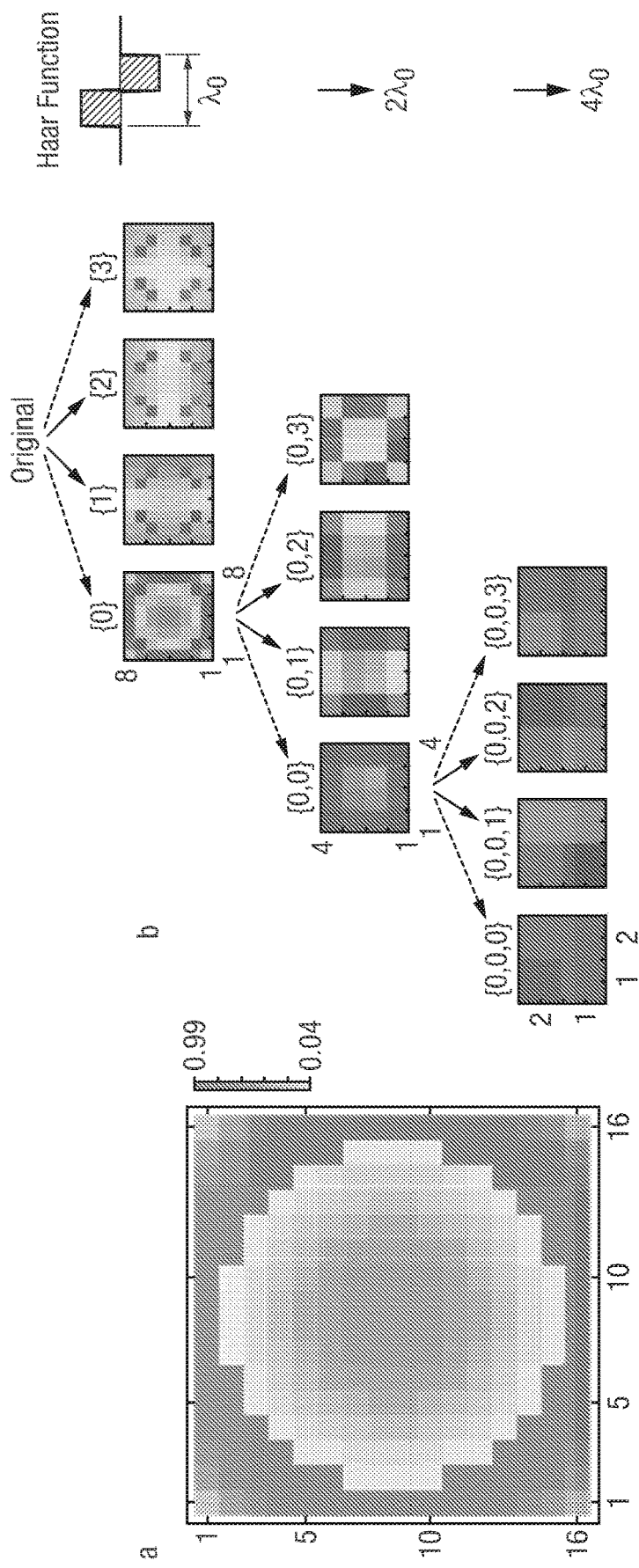
FIG. 13 illustrates an exemplary compression algorithm that may be used for compressing a quantised phase distribution to change the resolution in the spatial and phase domains to match those of a device according to embodiments of the present invention.

The basis functions for the wavelet transformation (or "wavelets") generally have an average value of zero, and the image i.e. the spatial phase distribution may be decomposed into a superposition of shifted and scaled representations of the original mutually orthogonal wavelets. In embodiments, the Haar wavelet is used as the basis function for the wavelet transformation. The Haar wavelet, as shown in FIG. 13, is a square wave over the $\lambda_0$-wide interval of definition. The Haar wavelet may thus be mapped onto unit cells. For instance, two adjacent unit cells having opposite phases may be described by a Haar function. That is, the unit cells may contain the same phase and spatial information as the Haar wavelet.

Because the Haar wavelet itself is discontinuous, it may be particularly suitable for handling 'images' with sharp edges such as the spatial phase distributions of an acoustic field. However, other suitable wavelets may also be used. For example, another suitable wavelet may be the Shannon wavelet i.e. the function, $S(x)=2(\sin 2\pi x - \cos \pi x)/(\pi - 2\pi x)$, over the $\lambda_0$-wide interval of definition.

The discrete wavelet transform represents an image over a plurality of different scales, selecting at each step (i.e. scale) the key features, with low spatial frequencies, and the residual features, with high spatial frequencies. In this way, a hierarchical tree of matrices is generated where the spatial resolution doubles at each step. That is, as illustrated in FIG. 13, each 'pixel' in the original 16×16 pixel image is decomposed into a series of four matrices ({0}, {1}, {2}, {3}) using a Haar function defined over an interval of one wavelength, $\lambda_0$. Each of these matrices is then further decomposed into a series of further matrices ({0,0}, {0,1}, {0,2}, {0,3}) using a Haar function over an interval of two wavelengths, $2\lambda_0$, and so on, down to a desired level K. In FIG. 13 the matrix stops after three decompositions. Thus, the final level of the hierarchy in FIG. 13 is a set of 2×2 matrices.

Once the tree of matrices is obtained, the compression procedure works by computing wavelet decomposed spatial phase distribution $\varphi^{DWT}_K$ up to a level K, with the coefficients below a certain threshold value δ set to zero, and finally computing the inverse transform. The inverse transform contains a number of unique phases dependent on the threshold values chosen. The threshold values thus determine the compression level for the image. As information is reduced by the thresholding step, this is a lossy process, and the inverse transform in general contains less information and a smaller number of required phases than the original quantised spatial phase distribution 502.

The phases are generally are not uniformly distributed either spatially or in the phase domain. Thus, given a particular set of unit cells, i.e. a particular set of available phase delay values, it is necessary to match the closest possible unit cell to the phase delay value given by the inverse transform. Alternatively, once the inverse transform is computed, and the required phases identified, the unit cells may be pre-configured to match the required (typically non-uniformly distributed) phases. The accuracy at which the field can be reproduced naturally thus depends primarily on the compression step i.e. to what extent the available unit cells are capable of accurately matching the quantised spatial phase distribution 502.

FIG. 13 depicts a 4-bit encoding of the image (i.e. using 16 unique quanta). In general, the number of unique quanta needed to realise the inverse transform decreases with increasing values of δ. For example, 8 unique quanta (3 bits) are sufficient for a compression rate at 4:1, whereas only 6 unique quanta are needed for a compression rate at 4.6:1, and only 4 unique quanta (2 bits) may be sufficient for a compression rate at 8:1. Suitable threshold values may be determined through optimisation based on the error in approximating the continuous phase distribution.

It has been found that a uniform 4-bit quantisation is sufficient to realise practically any arbitrarily complex acoustic field with an accuracy of 0.1 dB. 4-bit quantisation may e.g. be achieved either using a single acoustic metamaterial layer with $2^4=16$ unique phase delays/unit cells, or by stacking two acoustic metamaterial layers each having 8 unique phase delays/unit cells. At higher bit rates, the difference between the resulting field and the one obtained with 4-bit quantisation is typically too small to be significant, depending on the application. It has been found that a non-uniform 3-bit quantisation may also be sufficient for realising practically any arbitrarily complex acoustic field with an accuracy of 0.1 dB. In some applications, uniform 3-bit or 2-bit quantisation may be sufficient depending on the required precision.

As shown in FIG. 12, the phase distribution may be compressed using the wavelet transformation onto a single layer of unit cells 503. This compression is inherently lossy. However, a theoretically lossless compression is also possible. For instance, using the Haar function as a parent wavelet, at the first level of the wavelet hierarchy this is a signal of amplitude 1 over the range 0 to $\lambda_0/2$ and of amplitude −1 over the range $\lambda_0/2$ to $\lambda_0$. As illustrated in FIG. 13, the original 4-bit image may be decomposed into a quantised spatial phase distribution: $\varphi_{i,j} = \{0\} \times H_{\lambda_0} + \{1\} \times H_{\lambda_0} + \{2\} \times H_{\lambda_0} + \{3\} \times H_{\lambda_0}$, where {0}, {1}, {2} and {3} are the matrices shown in FIG. 13 and $H_{\lambda_0}$ is the spatial representation of the Haar function. However, since phase delays are additive, this sum can be performed physically by stacking four different acoustic metamaterial layers, with each acoustic metamaterial layer representing one of the matrices {0}, {1}, {2} and {3} corresponding to the first level of the wavelet hierarchy.

FIG. 12 also illustrates the theoretically lossless (or at least low loss) compression technique, where the compression results at first level in a three branch tree representing the structure of the decomposition. The quantised spatial phase distribution 502 may thus be matched to a stack of three acoustic metamaterial layers 504.

For the scheme shown in FIG. 13, each coefficient of the wavelet transform then applies to a 2×2 array. In terms of unit cells, this means that in each 2×2 array, the first two unit cells should have a phase given by the corresponding coefficient of the wavelet transform and the other two unit cells will have an opposite phase. These 2×2 arrays may comprise the blocks of unit cells described above, or may comprise independent unit cells.

The output of the digitisation process is thus a phase map showing which unit cells i.e. which phase delays should be introduced at which positions in order to best reproduce the original acoustic field. Thus, for pre-configured unit cells, the digitisation process essentially provides a parts list (i.e. the number and type of unit cells required) and assembly instructions for constructing the acoustic metamaterial layer or sound modulation device. Where the unit cells are re-configurable, the output may be provided to the electronic controller and used to define appropriate electronic control signals for re-configuring the unit cells.

Although FIGS. 12 & 13 illustrate an example wherein quantisation is performed in the spatial and phase delay domains (only) it will be appreciated that quantisation may also (or alternatively) be performed in the spatial and amplitude/intensity domains. For instance, it has been found that the frequency response of the unit cells may vary with transmission. The transmission efficiency of the unit cells may thus also be used to adjust the acoustic output (e.g. frequency response) device. Thus, instead of (or as well as) quantising the phase distribution in the phase delay domain, a step of quantising the phase distribution in the amplitude (or intensity) domain may also be performed.

In general, the unit cells described herein may suitably be formed using various microfabrication techniques. The channel topology may thus be designed to be suitable for microfabrication. In some examples, the unit cells may suitably be manufactured from a thermoplastic material. For instance, where one or more bars are provided as shown in FIG. 3, the bars may be extruded or pulled out from the walls of the unit cells. In some embodiments, the unit cells may suitably be manufactured by 3D printing.

However, a preferred manufacturing approach, at least for some applications, is to utilise a layered construction, wherein a three-dimensional unit cell is constructed by stacking together a plurality of relatively thin two-dimensional layers.

Figure 14:
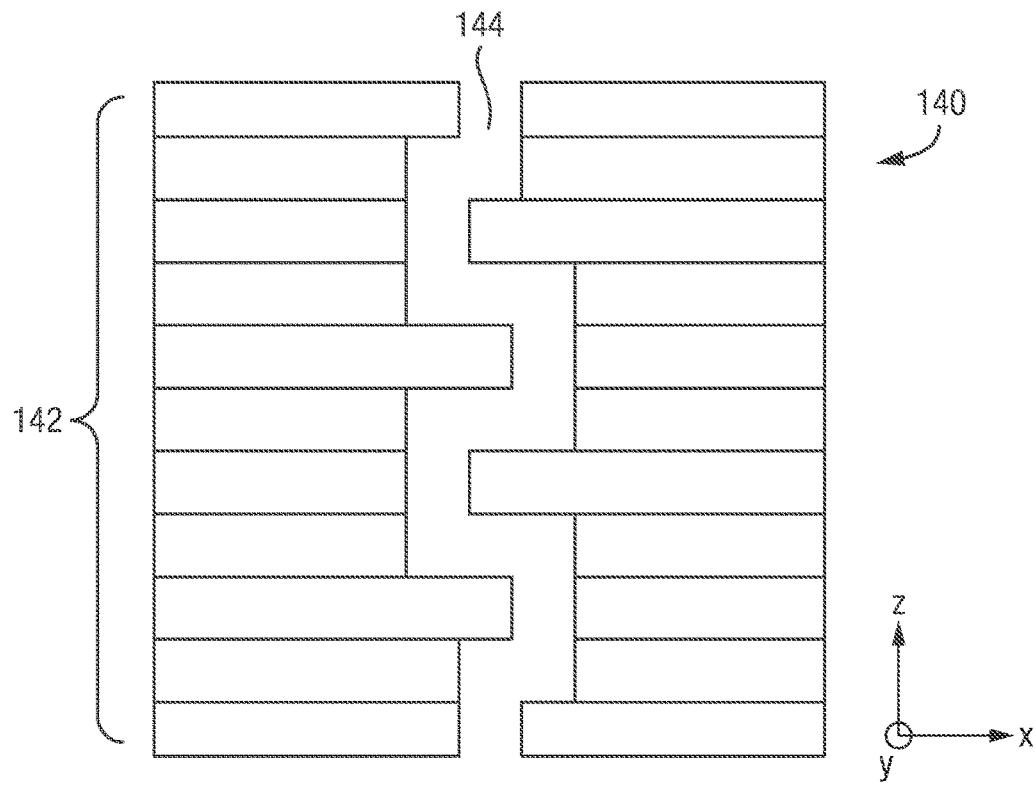
FIG. 14 shows schematically an example of a unit cell construction wherein the unit cell is formed by stacking a plurality of 'horizontal' layers together.

FIG. 14 illustrates an example of this preferred unit cell construction wherein a unit cell 140 is constructed from a plurality of layers 142 that are stacked together. As shown, in FIG. 14, the layers extend parallel to the surface of the unit cells within the device (in the x-y plane as shown). Each of the layers comprises an opening and the layers are arranged so that the respective openings are aligned and overlapping to define an open central channel 144 in the form of a folded physical path extending through the unit cell 140 (in the z-direction). Thus, the unit cell 140 appears geometrically like a rectangular cuboid with a square base-shape.

The internal structure of the unit cell 140 includes a central open channel 144 that acts to delay an incident acoustic wave (hence introducing a relative time or phase delay). The open channel 144 thus includes a folded physical path along which the acoustic waves propagate. The open channel 144 may generally be filled with either the surrounding fluid (e.g. air or water depending on the application), or a different fluid, if desired, e.g. to further modify the properties of the incident acoustic wave. However, in both cases, the time delay may be (primarily) determined by the structure of the unit cell 140 and the properties of the fluid within the open channel 144 do not significantly change during use.

The layers may be fabricated using various suitable MEMS techniques. For instance, a pattern may be determined for each layer indicating the required shape and position of the opening, and the layers may then be constructed individually by etching or otherwise removing material in this area. MEMS fabrication techniques are in general very well developed and are capable of defining very high resolution features, e.g. at (sub) micron level. For instance, the layers may be patterned by suitably etching away material to define the openings. This may be performed using high precision laser cutting, chemical etching or photolithography. The use of a layered construction may thus provide a highly scalable approach for fabricating large numbers of unit cells with high precision and resolution suitable for operation over a wider range of frequencies than might be possible e.g. with current generation 3D printing techniques. Furthermore, MEMS techniques are typically currently much faster and cheaper than traditional additive manufacturing techniques such as 3D printing.

Figure 15A:
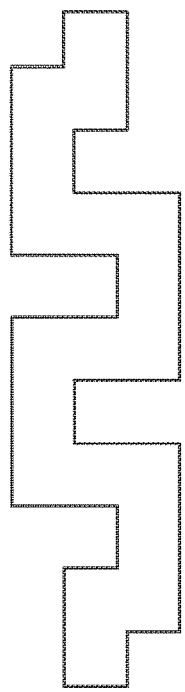
FIGS. 15A and 15B show schematically how the layered unit cell construction illustrated in FIG. 14 may be used to construct unit cells that introduce different phase delays to an incident acoustic wave.
Figure 15B:
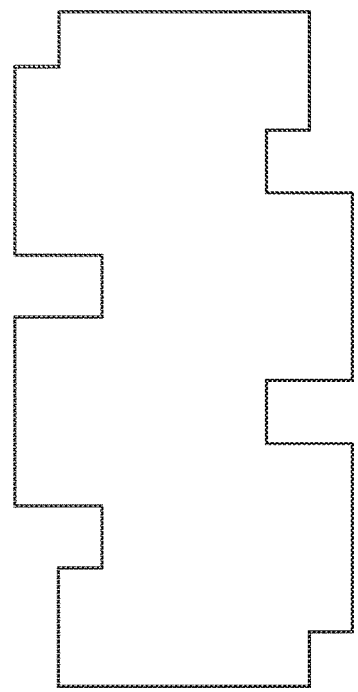

FIGS. 15A and 15B illustrate how by changing the shape and position of the opening(s) in the layers it is possible to generate different unit cell structures encoding different time delays. For instance, by varying e.g. the width of the channel and the width of the opening of the channel, the resulting phase may be shifted to cover a $2\pi$ span. This may be done during the manufacture, i.e. to fabricate multiple different pre-configured unit cells each encoding a specific time delay. However, it is also contemplated in embodiments that the layers within a unit cell may be slid relative to one another in use (e.g. under electronic control) in order to provide a re-configurable unit cell. That is, because the unit cell is formed from a plurality of individual layers, it is possible to shift the individual layers relative to one another in order to dynamically adjust the structure of the unit cell to vary the time (or phase) delay that is introduced. This adjustment may also be used to increase the frequency band where each unit cell can operate. For instance, by introducing small vibrations in the layers that compose the unit cell, and thereby causing small variations in the length of the channel, it is possible (with appropriate unit cell designs) to maintain the transmission efficiency of the unit cell over a wider range of frequencies without significantly impacting the output phase of the unit cell. In order to avoid artefacts, the layers may be physically vibrated at frequencies at least twice as high as the acoustic operating frequency of the device (i.e. based on the Nyquist criterion). However, it has been found that the fidelity of the acoustic output may still be improved with lower vibration frequencies than this. (This effect is generally analogous to creating displaced images in modern 3D televisions.)

Figure 16:
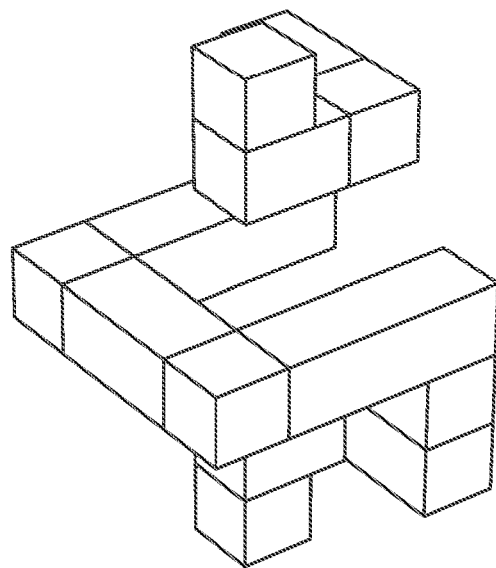
FIG. 16 shows schematically a layered unit cell construction comprising a three-dimensional channel.

The unit cell shown in FIG. 14 has an open channel 144 that is folded essentially in only two dimensions (i.e. in the x-z plane as shown). The channel thus extends continuously through the cell (i.e. in the z-direction). However, it is also possible using the layered construction to create unit cells having more complex three dimensional geometries. FIG. 16 shows an example of an open channel that is folded in three dimensions that may suitably be constructed by providing suitably patterned layers. As shown, the open channel in FIG. 16 is now also folded in the third (y) direction to create a fully three-dimensional meandered structure. This may provide various advantages both from an acoustic and manufacturability perspective. For instance, the number of layers in the stack required to produce a certain time delay may be reduced, allowing the thickness of the unit cell to be reduced further, e.g. to (ultra) sub wavelength thicknesses.

In general, the layers may extend either in the plane of the device (i.e. in the x-y plane as shown in FIG. 14), or perpendicularly thereto (in the x-z or y-z planes). For instance, it can be seen that the three-dimensional channel shown in FIG. 16 may be constructed by slicing the unit cell in any of these planes, and then fabricating suitable layers that can be stacked together to define the three-dimensional unit cell.

Figure 17:
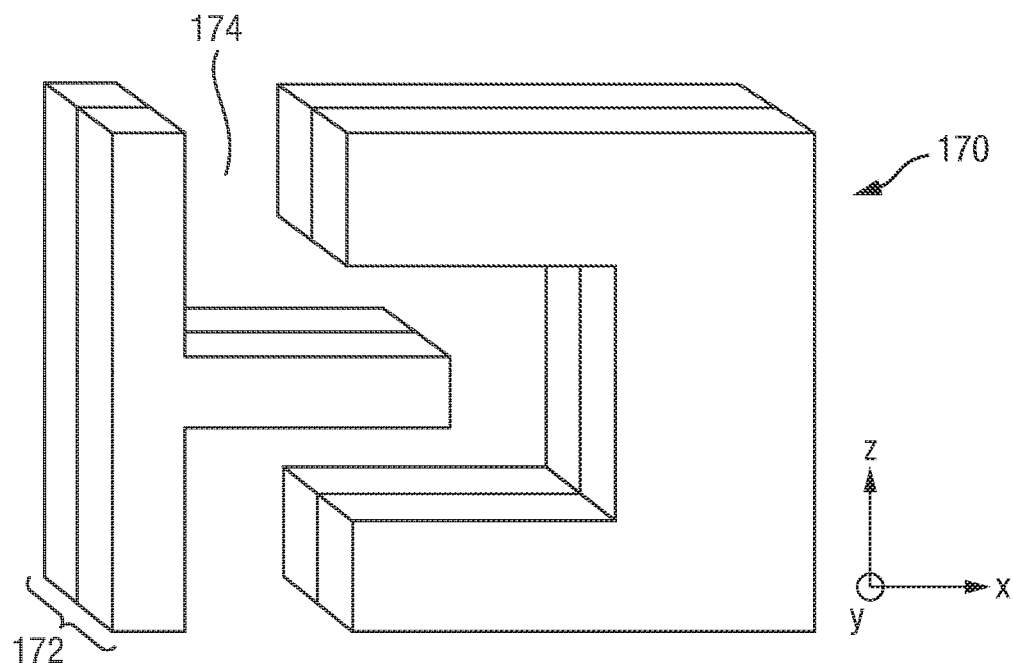
FIG. 17 shows schematically a layered unit cell construction wherein the unit cell is formed by stacking a plurality of 'vertical' layers together.

FIG. 17 shows another example of a unit cell construction wherein the unit cell 170 comprises a plurality of layers 172 that are stacked perpendicularly to the plane of the unit cells within the device (i.e. the x-z plane as shown). In this case, the channel structure 174 is patterned directly onto each of the layers 172, with the layers then being stacked together to extrude the pattern in the third (y) direction. Although illustrated in FIG. 17 as a relatively simple rectangular pattern, it will be appreciated that this approach may allow for more complex channel structures to be defined, e.g. including curved or rounded portions. By contrast, the parallel stacking shown in FIG. 14 is fundamentally limited to substantially rectangular features which are defined by the thicknesses of the layers (although it would e.g. be possible to introduce a taper to some of the openings).

Figure 18:
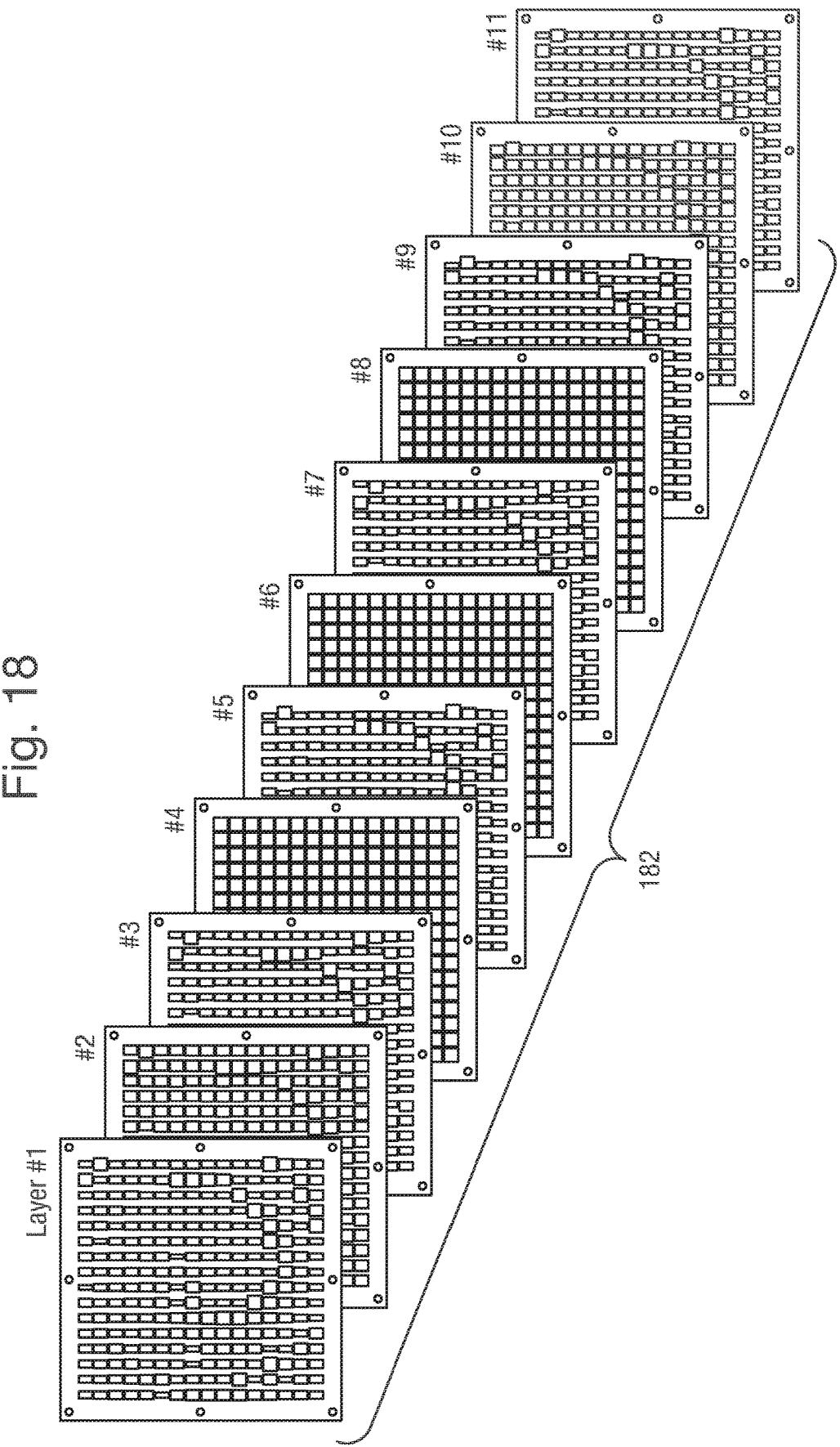
FIG. 18 shows schematically how an acoustic surface comprising a plurality of unit cells may be constructed by stacking together a plurality of layers.

FIGS. 14 to 17 all show examples of single unit cells that may be constructed from a plurality of layers stacked together. However, the layered construction may also advantageously be used to construct a single acoustic meta-surface comprising a plurality of unit cells. FIG. 18 shows an example of this. In particular, FIG. 18 shows a set of eleven layers 182 that may be stacked together to define an acoustic meta-surface. As shown, each layer comprises a pattern representing a portion or slice of the unit cell at that position within the array. The layers 182 can thus be stacked together to assemble a meta-surface comprising an array of unit cells.

It will be appreciated that constructing a single acoustic meta-surface from a plurality of layers may provide even further advantages from a manufacturing perspective as now it is only necessary to fabricate one set of layers for the entire device (surface) rather than multiple sets for each unit cell. For instance, a suitable lithography mask can be designed for each of the layers 182, and these can then each be manufactured on demand in a single step before being stacked together.

The layered construction also offers a large amount of flexibility on the structure of the unit cells. For instance, by using a layered construction, e.g. as shown in FIG. 18, it is possible to essentially arbitrarily set the time (or phase) delay values for each of the unit cells within the array. Thus, there may be a much enhanced 'palette' of phase delay values that may be used for reconstructing an analogue acoustic field.

Figure 19:
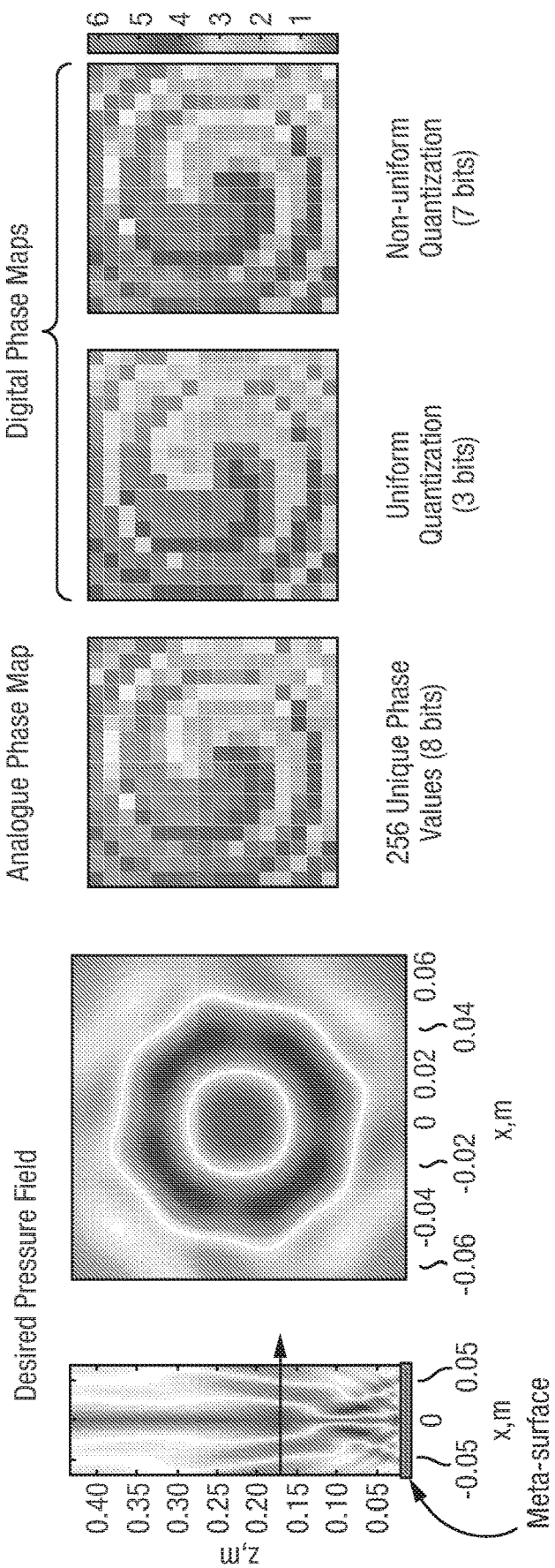
FIG. 19 illustrates an example of a non-uniform quantisation that may be achieved using a multi-layered acoustic surface.

FIG. 19 illustrates an example of an improved non-uniform quantisation that may be achieved in this way. For instance, as shown, the desired acoustic field may generally be represented as an 8-bit phase map. In cases where the number of available unit cells is limited (e.g.) to a set of 8 uniformly spaced quanta, so that only a 3-bit quantisation is possible, naturally some detail is lost from the analogue phase map. For most applications, as described above, this is acceptable, as the error is often low enough to not be readily perceptible (e.g. about 1 dB or less). However, for applications where higher precisions are desired, a higher bit rate quantisation might be desired. The layered construction described above allows a larger number of unit cells having different phase delays to readily be fabricated. Thus, instead of choosing a uniform quantisation based on a finite number of available phase delay values, it is possible to use precisely the needed value (or at least rounded to the nearest available) from a wider pool (or 'palette') of phase delay values.

As described above, a unit cell may typically be configured for optimal operation at a certain (single) frequency. However, in some cases, it may be desired to provide a device that is capable of handling multiple different frequencies. FIG. 20 shows one example of a device capable of doing this. As shown, the device generally comprises a number of different types of unit cells that have different transmission characteristic (see the inset graph). Particularly, in the example shown in FIG. 20 (although other arrangements are of course possible) the device comprises three different types of unit cells 200A, 200B, 2000 that are respectively configured for optimal operation at frequencies $f_1$, $f_2$, $f_3$. In FIG. 20 each of the first 200A, second 200B and third 300C unit cells are configured to perform the same operation, but at different frequencies. In order to provide a multi-frequency response, a moveable masking element 206 is provided that selectively covers the different types of unit cells. For instance, as shown, in a first position, the masking element 206 may be used to cover the first 200A and third 200C unit cells so that acoustic waves that have passed through the first and third unit cells are blocked, whilst leaving the second 200B unit cell exposed so that acoustic waves that have passed through the second unit cell 200B are transmitted past the masking element 206 and generate the acoustic output. The masking element 206 may then be moved between different positions in which the first 200A and third 200C unit cells are exposed (whereas the other unit cells are covered) in order to switch the device between the operating frequencies $f_1$, $f_2$, $f_3$.

Figure 21:
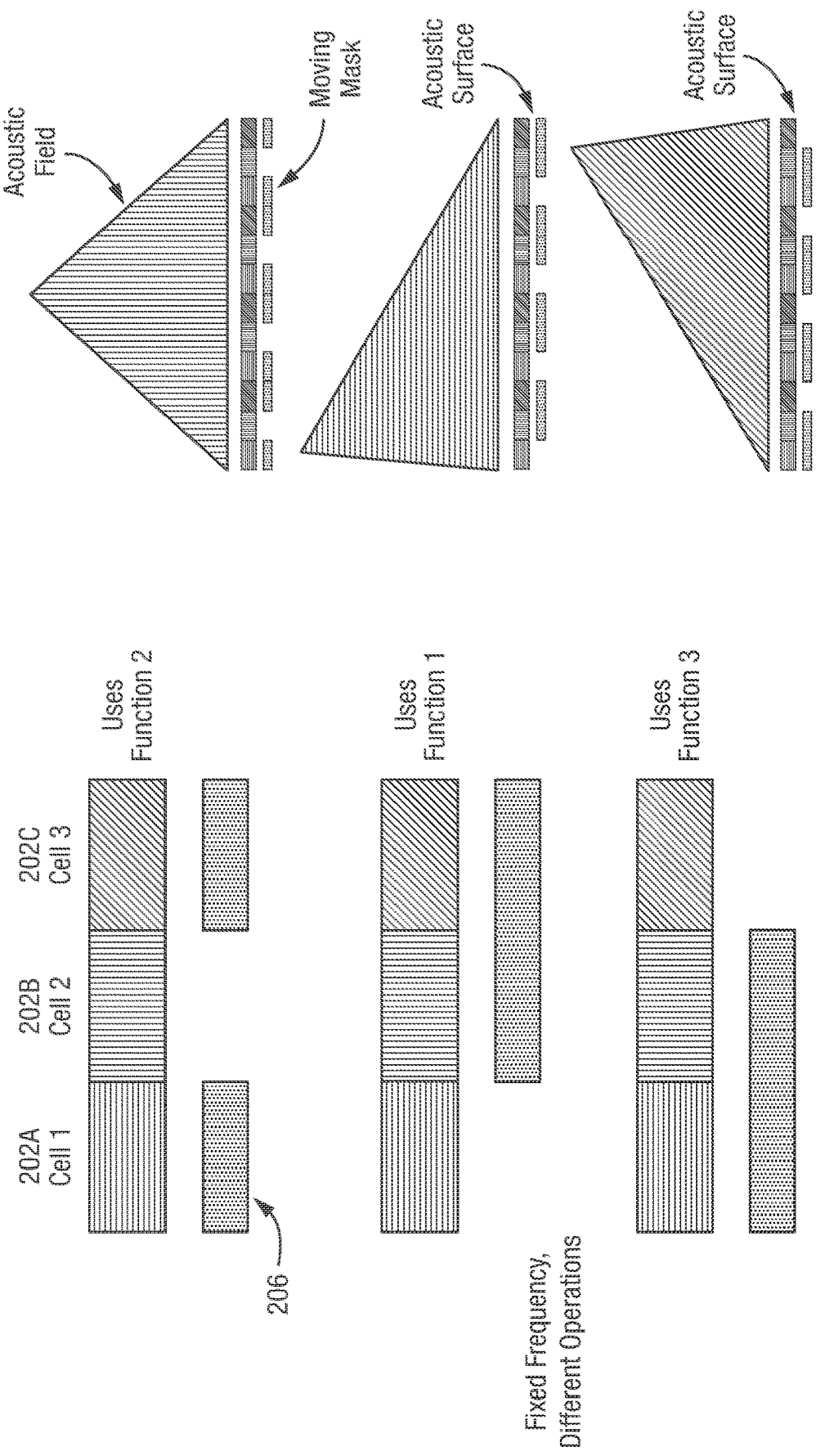
FIG. 21 shows a device that can be switched between different functions by selectively moving a masking element.

It will be appreciated that various other suitable arrangements utilising a masking element 206 may be possible. For instance, FIG. 21 shows a similar arrangement but wherein the three types of unit cells 202A, 202B, 202C are now configured to operate at the same frequency but to perform different operations at that frequency. Thus, as shown, by selectively covering different of the types of unit cells, so that only one type of unit cells are left open, the device may be rapidly switched between different functionalities by simply moving the mask 206. Thus, as shown, by moving the mask between the different positions, wherein the different types of unit cells are exposed, the device may be switched between a first function wherein the acoustic field is focussed centrally, a second function wherein the acoustic field is steered to the left and a third function wherein the acoustic field is steered to the right.

It will be appreciated that the techniques and devices for spatially modulating sound described herein may found application in a variety of contexts.

For example, in embodiments, the techniques described herein may be used to realise a directional sound system such as an 'audio spotlight' used with digital signage, or displays, or kiosks for targeted advertising or announcements. A directional sound system may also be employed on consumer electronic devices e.g. for providing wireless audio devices.

Alternatively, the directional sound system may utilise the sound from ultrasound effect such that the acoustic output is effectively carried by a modulating ultrasonic wave (e.g. at 40 kHz).

A device for use in these contexts may comprise a sleeve for mounting onto an existing speaker in order to provide focussing and/or steering. For instance, a device may be mounted onto an existing directional or focussed speaker in order to provide additional steering.

As another example, the techniques may be used for wireless power transfer such as ultrasonic charging. Existing techniques for wireless ultrasonic charging using a phased transducer array require extremely high operating powers in order to provide a sufficiently strong focussed beam, and may not therefore be practical or safe. As explained above, because the power requirements for the modulator are separated from the power requirements of the source, the techniques described herein may operate at significantly lower powers than phased array techniques.

A further example would be using the acoustic wave for interactions with other objects, for instance, in the field of haptic control e.g. for consumer electronic devices, or for acoustic levitation or tractor beams. Similarly, the techniques may be used in virtual reality applications.

The techniques may also find a variety of application in the medical and industrial sectors. For instance, there are a variety of therapeutic and diagnostic techniques involving spatial sound modulation. One example of this would be High Intensity Focussed Ultrasound for ablating tissue. Another example would be targeted drug delivery. A typical industrial application may be in the field of non-destructive testing, or for waste manipulation.

Although FIG. 1 shows a transmitting device, it will be appreciated that the devices substantially as described herein may also be used as part of a receiver or sensor assembly, for example, for acoustic sensing or imaging applications. Typical acoustic sensing or imaging applications may include medical imaging, or proximity sensing (e.g. in a motion or position sensor). In this case, the device may be used to transform an incident acoustic wave (or field) into a form that is more suitable for sensing or imaging purposes.

Similarly, although FIG. 1 shows a device that operates in transmission, it will be appreciated that the devices substantially as described herein may also be operated in reflection.

Figure 22:
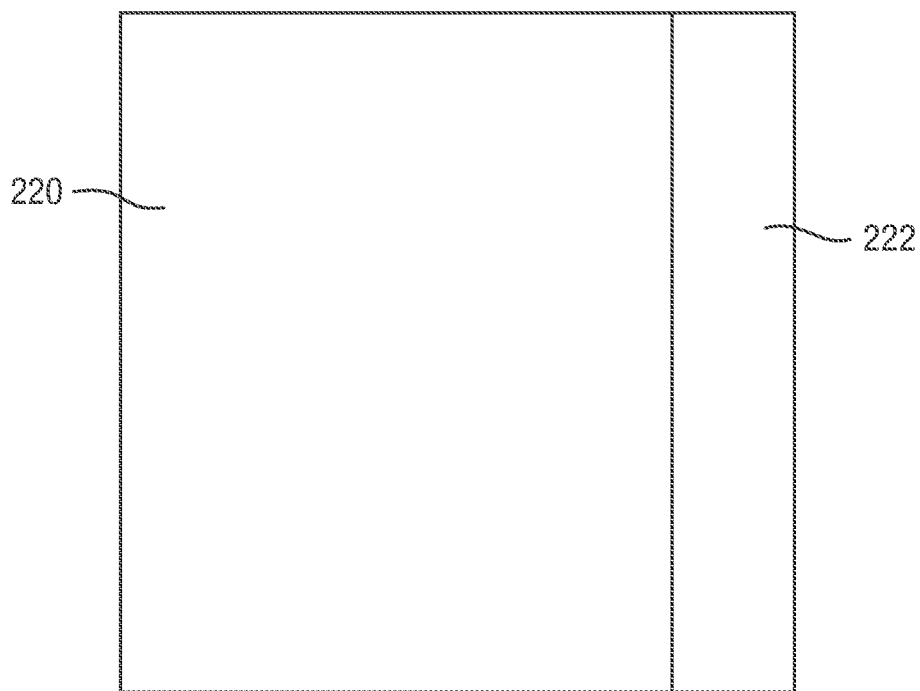
FIG. 22 shows an example of a structure incorporating an acoustic manipulation device of the type described herein.

Also, although FIG. 1 shows a stand-alone acoustic manipulation device it will be appreciated that the devices (and unit cell structures) substantially as described herein may also be incorporated as part of a larger structure. In this way, the structure is provided with the ability to spatially modulate acoustic fields. This may be advantageous for instance for a variety of noise control applications. For example, such devices could be incorporated into building materials (such as house bricks or insulation). FIG. 22 shows an example of a structure 220 having an acoustic manipulation device 222 incorporated into its surface in order to provide noise control (e.g. noise reduction). The device 222 may be provided as an external layer onto the surface of the structure 220 or may be formed integrally with the structure (e.g. by forming suitable unit cell structures in the structure, e.g. on the exterior surface thereof).

In general, the devices described herein may be used in any medium, depending on the application. For instance, the devices may be used in air, or may be used in a liquid medium e.g. in the context of medical or industrial imaging.

Although the techniques presented herein have been described with reference to particular embodiments, it will be understood by those skilled in the art that various changes in form and detail may be made without departing from the scope of the invention as set forth in the accompanying claims.

The invention claimed is:

1. A device for manipulating an incident acoustic wave to generate an acoustic output, the device comprising:
a plurality of unit cells arranged to define an acoustic surface, at least one unit cell of the plurality of unit cells being configured to introduce a respective delay to an incident acoustic wave at a respective position of the at least one unit cell within the acoustic surface, such that said plurality of unit cells define a spatial delay distribution for manipulating an incident acoustic wave to generate an acoustic output,
wherein the at least one unit cell comprises an internal channel that is structured to determine the delay for the at least one unit cell, and
wherein the plurality of unit cells defining the acoustic surface are mounted on, or otherwise arranged to form, a curved surface.

2. The device of claim 1, wherein the at least one unit cell comprises a Helmholtz-resonator type structure.

3. The device of claim 1, wherein unit cells of the plurality of unit cells are open at least at one end to allow surrounding fluid to pass into or through the unit cells.

4. The device of claim 1, wherein the plurality of unit cells are arranged such that the spatial delay distribution of at least some of the unit cells provides a pre-determined manipulation of the incident acoustic wave at least at a first wavelength comprising one or more of: (i) focusing the incident acoustic wave; (ii) steering or directing the incident acoustic wave; and (iii) introducing a phase delay of $\pi$ radians to the incident acoustic wave.

5. The device of claim 1, wherein the plurality of unit cells are arranged such that the spatial delay distribution of the plurality of unit cells provides noise reduction.

6. The device of claim 1, wherein the plurality of unit cells are arranged such that the device is configured so as to sum contributions of the incident acoustic wave, or a plurality of incident acoustic waves, at different spatial positions in the device according to the spatial delay distribution of the device.

7. The device of claim 1, comprising two or more layers of unit cells, each layer of the two or more layers of unit cells comprising multiple unit cells defining a respective acoustic surface.

8. The device of claim 7, wherein each of the two or more layers of unit cells has a different spatial delay distribution and/or a different spatial configuration of unit cells so that each layer of unit cells performs a different manipulation on an incident acoustic wave.

9. The device of claim 1, further comprising an acoustic waveguide for guiding the incident acoustic wave onto or toward the plurality of unit cells.

10. The device of claim 1, wherein the plurality of unit cells comprises two or more different types of unit cells with the different types of unit cell encoding a different delay.

11. The device of claim 1, wherein the device can be adjusted to control the acoustic output.

12. The device of claim 1, wherein the device can be physically re-configured to change the physical arrangement of unit cells to control the acoustic output.

13. The device of claim 1, wherein the internal channel is structured so as to increase the effective path length for an acoustic wave travelling through the at least one unit cell to thereby determine the delay for the at least one unit cell.

14. The device of claim 1, wherein the internal channel has a substantially labyrinth or meandered structure.

15. A device for manipulating an incident acoustic wave to generate an acoustic output, the device comprising:
a plurality of unit cells arranged to define an acoustic surface, at least some unit cells of the plurality of unit cells being configured to introduce delays to an incident acoustic wave at respective positions of the unit cells within the acoustic surface, such that said plurality of unit cells define a spatial delay distribution for manipulating an incident acoustic wave to generate an acoustic output, the plurality of unit cells comprising a first set of unit cells configured to perform a first acoustic manipulation on an incident acoustic wave at a first operating wavelength and a second set of unit cells configured to perform the same acoustic manipulation on an incident acoustic wave at a second operating wavelength, wherein the plurality of unit cells defining the acoustic surface are mounted on, or otherwise arranged to form, a curved surface.

16. A system comprising:

an acoustic source; and a device for manipulating acoustic waves generated by the acoustic source, the device comprising:

a plurality of unit cells arranged to define an acoustic surface, at least some of said unit cells being configured to introduce delays to an incident acoustic wave at respective positions of the unit cells within the acoustic surface, such that said plurality of unit cells define a spatial delay distribution for manipulating the incident acoustic wave to generate an acoustic output, wherein, for at least some unit cells of said plurality of unit cells, the unit cell comprises an internal channel that is structured to determine the delay for the unit cell; and wherein the plurality of unit cells defining the acoustic surface are mounted on, or otherwise arranged to form, a curved surface.

17. The system of claim 16, wherein the delay introduced by the at least some unit cells is determined by a Helmholtz-resonator type structure within the unit cell.

18. The system of claim 16, wherein unit cells of the plurality of unit cells are open at least at one end to allow surrounding fluid to pass into or through the unit cells.

19. The system of claim 16, wherein the plurality of unit cells are arranged such that the spatial delay distribution of at least some of the unit cells provides a pre-determined manipulation of the incident acoustic wave at least at a first wavelength comprising one or more of: (i) focusing the incident acoustic wave; (ii) steering or directing said incident acoustic wave; and (iii) introducing a phase delay of $\pi$ radians to the incident acoustic wave.

20. The system of claim 16, wherein the plurality of unit cells are arranged such that the spatial delay distribution of the plurality of unit cells provides noise reduction.

* * * * *